United States Patent
Gkoulalas-Divanis et al.

(10) Patent No.: US 11,106,813 B2
(45) Date of Patent: Aug. 31, 2021

(54) CREDENTIALS FOR CONSENT BASED FILE ACCESS

(71) Applicant: International Business Machines Corporation, Armonk, NY (US)

(72) Inventors: Aris Gkoulalas-Divanis, Waltham, MA (US); Corville O. Allen, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 16/577,046

(22) Filed: Sep. 20, 2019

(65) Prior Publication Data
US 2021/0089671 A1    Mar. 25, 2021

(51) Int. Cl.
*G06F 21/62* (2013.01)
*G06F 16/10* (2019.01)
*G06F 21/31* (2013.01)

(52) U.S. Cl.
CPC ......... *G06F 21/6218* (2013.01); *G06F 16/10* (2019.01); *G06F 21/31* (2013.01); *G06F 2221/2141* (2013.01)

(58) Field of Classification Search
CPC ...... G06F 21/6218; G06F 21/31; G06F 16/10; G06F 2221/2141; G06F 21/6245
See application file for complete search history.

(56) References Cited

U.S. PATENT DOCUMENTS

| | | | |
|---|---|---|---|
| 7,603,358 B1* | 10/2009 | Anderson | G06F 21/6218 |
| 7,681,042 B2 | 3/2010 | Khulusi et al. | |
| 7,996,373 B1* | 8/2011 | Zoppas | G06F 21/556 |
| | | | 707/694 |
| 8,468,244 B2 | 6/2013 | Redlich et al. | |
| 8,782,762 B2 | 7/2014 | Krishnan et al. | |
| 9,092,637 B2 | 7/2015 | Mathew et al. | |
| 9,680,508 B1 | 6/2017 | Cousins | |
| 10,043,035 B2 | 8/2018 | LaFever et al. | |

(Continued)

OTHER PUBLICATIONS

Anonymous, "Leverage storage devices' antivirus interface to gain knowledge about file access frequency", Oct. 1, 2015, IP.com, IPCOM000243569D, 5 pages.

(Continued)

*Primary Examiner* — Aravind K Moorthy
(74) *Attorney, Agent, or Firm* — Levine's Tech Consulting, LLC; Frank E. Levine

(57) ABSTRACT

An approach is disclosed for providing built-in consent permissions for users, groups, processes, and programs accessing a part of a filesystem. The method includes integrating a consent access control into a plurality of files in a filesystem. A first request from a first requestor to access information from a first file in the filesystem is received. A first access policy for the first requestor is determined. The first access policy includes a first selective data conversion. A second request from a second requestor to access information from the first file in the filesystem is received. A second access policy including a second selective data conversion for the second requestor different from the first access policy for the first requestor is determined. An access control mode that enables or inhibits enforcement of the built-in permissions is provided.

17 Claims, 42 Drawing Sheets

(56) References Cited

U.S. PATENT DOCUMENTS

| | | | |
|---|---|---|---|
| 10,235,534 B2 | 3/2019 | Barday et al. | |
| 2004/0059808 A1* | 3/2004 | Galloway | H04L 29/06 709/224 |
| 2004/0230795 A1* | 11/2004 | Armitano | H04L 63/10 713/165 |
| 2005/0102530 A1* | 5/2005 | Burrows | G06F 21/6218 726/1 |
| 2007/0156670 A1* | 7/2007 | Lim | G06F 9/468 |
| 2008/0228770 A1 | 9/2008 | Halcrow et al. | |
| 2009/0031145 A1* | 1/2009 | Nishiyama | H04N 1/32432 713/193 |
| 2009/0178107 A1* | 7/2009 | Karjoth | G06F 16/24564 726/1 |
| 2009/0246289 A1* | 10/2009 | Superko | G01N 33/92 424/523 |
| 2009/0324196 A1* | 12/2009 | Ueda | G11B 20/00086 386/252 |
| 2010/0306548 A1* | 12/2010 | Kravitz | H04L 9/3263 713/182 |
| 2011/0162065 A1* | 6/2011 | Kawara | G06F 21/6218 726/17 |
| 2012/0017260 A1* | 1/2012 | Narain | G06F 13/362 726/1 |
| 2012/0131030 A1* | 5/2012 | Miyakawa | G06Q 10/00 707/758 |
| 2012/0259877 A1* | 10/2012 | Raghunathan | G06F 21/6254 707/757 |
| 2012/0265976 A1* | 10/2012 | Spiers | G06F 9/45533 713/2 |
| 2013/0152174 A1* | 6/2013 | Raley | H04L 63/0823 726/4 |
| 2013/0332729 A1* | 12/2013 | Ito | H04L 9/002 713/165 |
| 2014/0041044 A1* | 2/2014 | Hymel | G06F 21/10 726/27 |
| 2014/0047551 A1* | 2/2014 | Nagasundaram | G06F 21/606 726/26 |
| 2014/0095878 A1* | 4/2014 | Shimano | H04L 9/0825 713/171 |
| 2014/0130150 A1* | 5/2014 | Moshchuk | H04L 63/1408 726/22 |
| 2014/0181116 A1* | 6/2014 | Wang | G06F 16/137 707/741 |
| 2014/0289001 A1 | 9/2014 | Shelton | |
| 2014/0325640 A1* | 10/2014 | Aggarwal | G06F 21/31 726/18 |
| 2015/0039886 A1* | 2/2015 | Kahol | H04L 9/0894 713/165 |
| 2015/0254456 A1* | 9/2015 | Jacquin | G06F 21/6245 726/1 |
| 2015/0264088 A1* | 9/2015 | Shimizu | G06F 21/6218 726/1 |
| 2015/0278024 A1 | 10/2015 | Barman et al. | |
| 2016/0070758 A1* | 3/2016 | Thomson | G16H 10/60 707/781 |
| 2016/0085979 A1* | 3/2016 | Fukasawa | G06F 21/629 726/17 |
| 2016/0088065 A1* | 3/2016 | Faitelson | G06F 9/54 709/217 |
| 2016/0292195 A1* | 10/2016 | Smith | G06F 16/221 |
| 2017/0075919 A1* | 3/2017 | Bose | G06F 21/6245 |
| 2017/0091469 A1* | 3/2017 | Leemet | G06F 16/116 |
| 2017/0104835 A1 | 4/2017 | Goel et al. | |
| 2017/0124342 A1* | 5/2017 | Panchapakesan | H04L 63/10 |
| 2017/0140658 A1* | 5/2017 | Aluvala | H04L 65/4076 |
| 2017/0149793 A1* | 5/2017 | Spertus | H04L 41/069 |
| 2017/0230848 A1* | 8/2017 | Brouillette | H04W 12/02 |
| 2018/0004978 A1* | 1/2018 | Hebert | G06F 21/6254 |
| 2018/0027006 A1* | 1/2018 | Zimmermann | H04L 63/0245 726/11 |
| 2018/0062921 A1* | 3/2018 | Jones | H04L 45/563 |
| 2018/0133145 A1* | 5/2018 | Meltzer | A61K 9/006 |
| 2018/0189504 A1 | 7/2018 | Ghafourifar et al. | |
| 2018/0191727 A1* | 7/2018 | Baldwin | G06F 16/176 |
| 2018/0367540 A1* | 12/2018 | Miranda | H04L 63/0478 |
| 2019/0012471 A1 | 1/2019 | Garcia et al. | |
| 2019/0065711 A1* | 2/2019 | Seo | G06F 9/451 |
| 2019/0114404 A1* | 4/2019 | Nowak | H04W 12/06 |
| 2019/0205869 A1* | 7/2019 | Nair | G06Q 20/383 |
| 2019/0236284 A1* | 8/2019 | Hersans | H04L 63/12 |
| 2019/0347181 A1* | 11/2019 | Cranfill | G06F 21/6218 |
| 2019/0354720 A1* | 11/2019 | Tucker | G06F 21/6254 |
| 2020/0019715 A1* | 1/2020 | Malliah | H04L 9/0891 |
| 2020/0065509 A1* | 2/2020 | Ojha | H04L 63/1466 |
| 2020/0073864 A1* | 3/2020 | Jo | G06F 16/2379 |
| 2020/0074105 A1* | 3/2020 | Gordon | H04L 9/088 |
| 2020/0092596 A1* | 3/2020 | Moore, Jr. | H04L 67/18 |
| 2020/0125294 A1 | 4/2020 | Parker | |
| 2020/0125753 A1* | 4/2020 | Yang | G06N 20/00 |
| 2020/0145417 A1* | 5/2020 | Larish | H04L 63/0876 |
| 2020/0175186 A1* | 6/2020 | Guabtni | H04L 67/10 |
| 2020/0304516 A1* | 9/2020 | Lazar | H04L 63/101 |
| 2020/0314041 A1* | 10/2020 | Faitelson | G06F 21/6209 |
| 2020/0320041 A1* | 10/2020 | Fitzer | G06F 16/183 |
| 2020/0320219 A1* | 10/2020 | Barouch | H04L 9/0894 |
| 2020/0320406 A1* | 10/2020 | Antonatos | G06N 5/04 |
| 2020/0394318 A1* | 12/2020 | Bahrami | G06F 21/31 |

OTHER PUBLICATIONS

Anonymous, "Holistic, Policy-Driven, Access Control for Smarter Healthcare", Feb. 22, 2011, IP.com, IPCOM000204388D, 6 pages.

Zhang, A et al, "Consent-based access control for secure and privacy-preserving health information exchange", Security and Communication Networks, Security Comm. Networks 2016; 9:3496-3508, Jul. 7, 2016, 13 pages.

Russello, G. et al, "Consent-based Workflows for Healthcare Management", 2008 IEEE Workshop on Policies for Distributed Systems and Networks, Department of Computing, 9 pages.

Lennon, S, "Towards an Access Control and Consent Strategy for an Electronic Healthcare Record (EHR) in Ireland: What can we learn from the experience of other nations?", 2014, 155 pages.

Essa, Youssef, et al., "IFHDS: Intelligent Framework for Securing Healthcare BigData", Journal of Medical Systems, 43:124, Mar. 27, 2019, 13 pages.

Anonymous, "Data Privacy Tag to Certify Data Records in Compliance with Established Privacy Laws", Oct. 29, 2013, IP.com, IPCOM000232272D, 7 pages.

IBM, "A Mechanism for Providing Privacy Functionality to Users", Oct. 14, 2003, IP.com. IPCOM000019967D, 3 pages.

EDPS, "Guidelines on the Protection of Personal Data in IT Governance and IT Management of EU Institutions", Mar. 23, 2018, 36 pages.

EDPS, "EDPS Opinion on Personal Information Management Systems", Oct. 20, 2016, 17 pages.

IAB Europe, "Transparency & Consent Framework FAQ", Jun. 21, 2018, 24 pages.

Anonymous, "Method and System for Enabling a User to Manage Personal Data used by an Application Provider in compliance with General Data Protection Regulation", Jul. 27, 2018, IP.com, IPCOM000254749D, 5 pages.

Anonymous, "Method and Apparatus for Composing Information to Achieve Global Compliance", Jun. 19, 2012, IP.com, IPCOM000219078D, 4 pages.

Anonymous, "System to Define and Enforce Patient Medical Document Sharing Consents", Jan. 5, 2010, IP.com. IPCOM000191462D, 5 pages.

EDPS, "Preliminary Opinion on Privacy by Design", May 31, 2018, EDPS, 34 pages.

Anonymous, "A Method and System for Securely Storing and Sharing Patients' Healthcare Data While Providing Incentives to Patients", Mar. 3, 2011, IP.com, IPCOM000204563D. 5 pages.

IBM, "Description, Enforcement and Presentation of Privacy Policies based on Contextual Integrity", Jul. 21, 2005, IP.com, IPCOM000126489D, 9 pages.

(56) References Cited

OTHER PUBLICATIONS

Rand Arroyo Center and Rand Health, "Patient Privacy, Consent, and Identity Management in Health Information Exchange", 2018, 107 pages.
Office of Health Policy, U. S. Department of Health and Human Services, "Building the Data Capacity for Patient-Centered Outcomes Research: The 2018 Annual Report", 2018, 105 pages.
Habibi, R., "Consent based privacy for eHealth systems", Lakehead University, 2012, 130 pages.

* cited by examiner

Built-in Legal Framework File System (LFFS)
100

*FIG. 1*

OS enforced file access based on user consent metadata 102

File metadata 110
Special-purpose file system, specifically engineered for storing personal and sensitive data utilizing metadata containing a privacy state and an owner consent-based access policy, along with an operating system that provides special-purpose commands that can be executed on the file system to achieve privacy-preserving data management.

User 1 files 140 | User 1 defaults 145

User 2 files 160 | User 2 defaults 165

User n files 180 | User n defaults 185

User 1 130 (CPU, CPU, CPU, Mem., Disk, GPU)

User 2 150 (CPU, CPU, CPU, Mem., Disk, GPU)

User n 170 (CPU, CPU, CPU, Mem., Disk, GPU)

File access 195
CL 511
⋮
CL 3
CL 2
CL 1
CL 0

Data read or written to each file are brought into cache lines (CL) and processed according to metadata and operations applied.
190

File Specific Metadata
400

| |
|---|
| Owner, contact info, (e.g. email) 410 |
| Access rights (granularity for access to the data per user, group, or process) 420 |
| Consent information: data owner, status of consent, consent expiration date (if any), details of consented access / use of data, e.g., data can be used for study at user specified granularity. 430 |
| Auditing information: detailed records with complete file access information, when accessed, who accessed the file, what command was executed, what info was retrieved, all locations where the file is available (e.g., when the file is copied, edited and saved elsewhere in the disk, etc.). 440 |
| Users of the system who can access the file and the type of access they are allowed, including support for partial access (i.e., view part of the information stored in the file) or view of information at a different granularity, or after noise addition / transformation / obfuscation has been applied. 450 |
| Retention period for the data, after which the data are automatically removed from the filesystem by the OS. 460 |
| Information about each copy of the original file created (when first placed on disk in this filesystem) to ensure that all copies of the file are linked together (e.g., to support data erasure if requested by the data owner) 470 |
| Personally identifiable information (PII) discovery and mapping details 480 |

*FIG. 4*

Home Node (Page table example 4)
2900

| Type 2920 | Description 2940 | Auxiliary Information 2960 | Notes 2980 |
|---|---|---|---|
| 0x0 | Directory Entry Not Valid | | |
| 0x1 | Pointer to next level of page table | pointer | Points to the next level of page table representing a finer division of virtual address space |
| 0x2 | Multi-node Home | List of blocks Home nodes | Area is homed by more than two nodes |
| 0x3 | Blocked across all nodes | Block Size | Single entry represents full object. Starting location of NDE used to look up directory. |
| 0x4 | Cyclic across all nodes | | Single entry represents full NDE. Starting location of NDE used to look up directory. |
| 0x5 | Block Cyclic across all nodes | Block Size | Single entry represents full NDE. Starting location of NDE used to look up directory. |
| 0x7 | Block Cyclic across specified nodes | Block Size Num. of Nodes List of Nodes | Single entry represents full NDE. Starting location of NDE used to look up directory. List of nodes may be a pointer to another level of directory containing virtual nodes |
| 0x8 | Single Node Home | Node | Area is homed by a single node |
| 0x9 | Two Node Home Split | Split point Nodes | Area is split between two nodes |

*FIG. 29*

Recovery After Node Failure

FIG. 41

File Metadata Infrastructure (FMDI) APIs  4100

File Metadata Infrastructure (FMDI) Management  4110

| API | Description |
|---|---|
| fmOpen() | Open a File Metadata Infrastructure (FMDI) |
| fmClose() | Close a File Metadata Infrastructure (FMDI) |
| fmQuery() | Query information about a File Metadata Infrastructure (FMDI) |
| fmMap() | Allocate VA space to a File Metadata Infrastructure (FMDI) |
| fmMapAll() | Allocate VA space to a File Metadata Infrastructure (FMDI) |
| fmFree() | Free VA space from a File Metadata Infrastructure (FMDI) |
| fmChngVA() | Change properties of a File Metadata Infrastructure (FMDI)' VA space |
| fmSetHome() | Set backing store for a File Metadata Infrastructure (FMDI)' VA space |

File Metadata Infrastructure (FMDI) Mapping  4120d

| API | Description |
|---|---|
| fmExpose() | Make VA range remotely accessible |
| fmPrivate() | Make VA range private to node |

File Metadata Infrastructure (FMDI) Access  4130

| API | Description |
|---|---|
| fmGet() | Read from an MDE |
| fmPut() | Write to an MDE |
| fmAtomic() | Perform atomic op on an MDE |
| fmTouch() | Touch an MDE into cache |
| fmTouchForStore() | Touch an MDE into cache for modification |
| fmFlush() | Flush an MDE from cache |
| fmSync() | Set order of remote operations |

FIG. 42

File Data Operations APIs  4200

File Masking  4210

| API | Description |
|---|---|
| fdMask() | Data Masking |
| fdPseudo() | Data pseudonymization |
| fdAnon() | data anonymization |
| fdEncr() | Encrypt a file or folder |
| fmMapAll() | Allocate VA space to a File Metadata Infrastructure (FMDI) |
| fmFree() | Free VA space from a File Metadata Infrastructure (FMDI) |
| fmChngVA() | Change properties of a File Metadata Infrastructure (FMDI)' VA space |
| fmSetHome() | Set backing store for a File Metadata Infrastructure (FMDI) VA space |

File privacy vulnerabilities  4220

| API | Description |
|---|---|
| fdVulndisc() | Identify privacy vulnerabilities |
| fdRisk() | Calculate privacy risk exposure assessment |
| fdReport() | Identify and report privacy vulnerabilities |

File Data Manapulations  4230

| API | Description |
|---|---|
| fdStudy() | Collect data for a research study |
| fdCopy() | Copy files according to consent criteria |
| fdView() | View data based on query and consent |
| fdAnalyze() | Perform analytic analysis on data in a file |
| fdCreate_study() | Create a study |

CREDENTIALS FOR CONSENT BASED FILE ACCESS

BACKGROUND

The present invention relates to a computing environment, and more particularly to a computer program, method, and system for providing built-in consent permissions for users, groups, processes, and programs accessing a part of a filesystem.

SUMMARY

According to one embodiment of the invention, there is a method that is disclosed for providing built-in consent permissions for users, groups, processes, and programs accessing a part of a filesystem. The method includes integrating a consent access control into one or more files in a filesystem. A first request from a first requestor to access information from a first file in the filesystem is received. A first access policy for the first requestor is determined. The first access policy includes a first selective data conversion. A second request from a second requestor to access information from the first file in the filesystem is received. A second access policy including a second selective data conversion for the second requestor different from the first access policy for the first requestor is determined. An access control mode that enables or inhibits enforcement of the built-in permissions is provided.

According to one embodiment of the invention, there is provided an information handling system including at least one processor executing instructions implementing steps of the method that provides a filesystem access infrastructure that enforces a consent-based file access.

According to one embodiment of the invention, there is provided a computing program product executing instructions having the steps of the method that provides a filesystem access infrastructure that enforces a consent-based file access.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein:

FIG. 1 shows a diagram depicting a schematic view of a system having support of a Built-in Legal Framework File System (LFFS) overview;

FIG. 4 shows examples of file specific metadata;

FIG. 29 shows a diagram of using metadata entries (MDEs) to represent a home node with a page table embodiment example 4;

FIG. 41 shows a table of example metadata APIs;

FIG. 42 shows a table of example file operations APIs;

DETAILED DESCRIPTION

Figure 2:
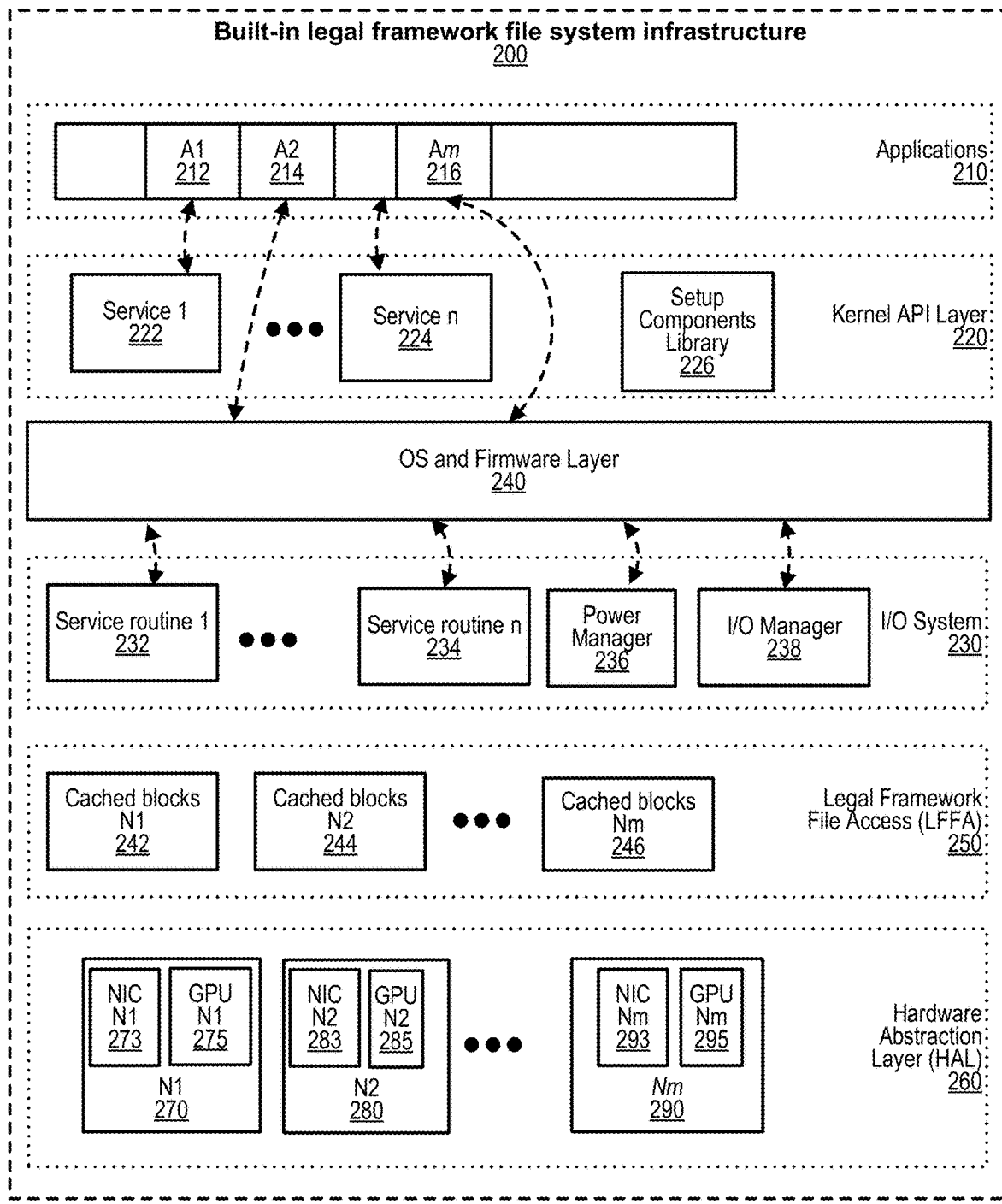
FIG. 2 shows a schematic view of a Built-in legal framework file system infrastructure.

FIGS. 1-15 and 20 describe an approach that provides embodiments that integrates user consent for data usage into credential-based access control of files. The system expands the read-write-execute permissions of the file with consent required permissions for user and group credentials, where a basic read is encoded in the file metadata for users and groups, while write and execute leverage a consent management check based on user, program. and usage. The consent usage is dynamically determined based on the file metadata, the sensitivity of the data, subject, and owner. The consent usage is then enforced by the file management system by a set of delegation calls and internal enforcement.

In an embodiment, the system expands the access according to consent operations: consent read (CR), consent write (CW), and consent execute (CX) which can be combined to denote consent-based permissions. The consent-base permissions are checked by a designated consent policy management system, which may be embedded in the file management system, an external third-party system in the operating system (OS), or in an executable, that is, a running program. The consent information may include data owner, status of consent, consent expiration date (if any), details of consented access, and usage of the data file—e.g., the data file can be used by one or more specified software programs. This enables verification of the consented access and either prevention of usage if not allowed or enforcement of a legal framework when allowed. When the usage is allowed, enforcement may align with a legal framework for data subjects. In some embodiments, parts of the filesystem, such as directories, or even the entire filesystem can operate in a normal mode (POLICY_OFF) or in policy enforcement mode (POLICY_ON). In POLICY_OFF mode, files are processed by the filesystem without taking into consideration consent/policy information. For example, files can be copied to a directory as in a regular filesystem and can be viewed by users who have basic permissions (as in Unix).

In some embodiment, when POLICY_ON mode is set in an area of the filesystem, the corresponding policies—as specified in the files which must be automatically enforced by the OS. This is achieved by having the OS monitoring the corresponding area to check the permissions of any user, process, or program that tries to access the files in this area and applying any necessary data transformations on-the-fly to these files before returning the corresponding information to the system user. For example, in POLICY_ON mode, a process may want to read from a given file, say File2, which is stored in a protected directory. The OS checks the policy associated with File2, by retrieving policy metadata for File2. The OS may perform all the necessary actions to the data (as specified in this policy) before providing them to the process. As an example, if the policy of File2 requires the data to be pseudonymized in order to be provided to process, then the OS will pseudonymize the data on-the-fly (no actual data changes) and send the output to the process. Similarly for users: If a given user, say user X, wants to read File2 in POLICY_ON mode, then the OS gets information about the purpose of the read and the purpose of the read is compatible to the one specified in File2's policy, the system performs the necessary actions to the data before providing them to user X. In order to automatically separate files into those that are consent based from those that are not consent based, the files may be placed in dedicated directories or folders. The system supports turning on or off consent for individual directories or parts of a filesystem (e.g., mount points possibly containing multiple directories). FIGS. 1-42 describe embodiments that provides a native filesystem that inherently provides support for at least one data privacy laws. There is an abundance of data privacy laws worldwide, such as, but not limited to, General Data Protection Regulation (GDPR), Health Insurance Portability and Accountability Act (HIPPA), Personal Information Protection and Electronic Documents Act (PIPEDA), and Food and Drug Administration (FDA) which pertain to the handling of sensitive and personal data. These laws cover both security and privacy related aspects regarding the collection of individuals' consents for the use of their data. Requirements include the storage and the retention period of personal data, the allowable access and use of the data, support of rectification, update, erasure of the data, and movement of the data including data transfers. The requirements may also include the identification and reporting of data breaches, the applicable technology to allow for data reuse in order to support secondary usages through data de-identification, pseudonymization and/or data anonymization.

In prior practice, these legal requirements are handled separately, with the burden being placed on security and privacy experts who need to coordinate and take the best decisions to achieve compliance. For example, with respect to the collection of individuals' consents for the use of their data, the data controller must collect consent, or this needs to be done through a dedicated process. The various requirements, set forth by a legal framework, are addressed independently using different approaches, sometimes completely manually and other times with the help of some software solutions. With respect to the storage of personal data, software to allow disk-based encryption is typically used, while data retention is usually manually enforced based on records related to data collection. To achieve appropriate access and use of the data, the data are typically moved into silos that can be accessed by few individuals based on their credentials. Rectification, updates, and/or erasure of the data is typically done manually upon a data subject's request. The movement of the data, such as, data transfers are typically also invoked manually, based on human decisions. The identification and reporting of data breaches is typically performed after manual examination with the help of security-based software or via penetration testing and reporting. The applicable technology to allow for data reuse in order to support secondary purposes is usually performed based on human expert decisions to offer data de-identification, pseudonymization or anonymization, followed by software to enforce the corresponding transformations on the data.

In view of the deficiencies of the prior practice, instead of requiring specialized tailored support, embodiments of the filesystem support disclosed herein achieves compliance to various privacy legal frameworks by having the system inherently implementing all the necessary security and privacy controls for enforcing a privacy legal framework, such as GDPR. In an embodiment, the "data controllers" are the people or person(s) who are using the OS/filesystem and have access to the personal data of all individuals. In some embodiments, the persons whose personal data are stored in the OS/filesystem, the "data owners" should be able to edit their own personal data (data rectification), renew or remove their consent for the use of their own personal data, etc.

In an embodiment, the data controller only needs to provide the personal data of the individuals to the system, which in turn supports only compliant processing of these data, as provisioned by the legal framework, which disallows any actions that may lead to non-compliance. The special-purpose filesystem is specifically engineered for storing personal and sensitive data, along with an operating system that provides special-purpose commands (replacing those offered by typical modern operating systems) that can be executed on this filesystem to achieve privacy-preserving data management and use. The filesystem may be encrypted using state-of-the-art encryption technologies, as required by the supported legal framework, and would only be permitted to be read by the operating system (OS).

FIG. 1 depicts a schematic diagram of a system having support of a Built-in Legal Framework File System (LFFS) 100. The system supports Operating System (OS) enforced file access based on user consent metadata 102. The file metadata 110 is included in a special-purpose file system, specifically engineered for storing personal and sensitive data utilizing metadata containing a privacy state and an owner consent-based access policy, along with an operating system that provides special-purpose commands that can be executed on the file system to achieve privacy-preserving data management. Each user may have user owned data with user files and defaults. In FIG. 1, User1 130 has User 1 files 140 and User 1 defaults 145, User2 150 has User 2 files 160 and User 2 defaults 165, . . . , User n 170 has User n files 180 and User 1 defaults 185. Data read or written to each file are brought into cache lines (CL) and processed according to metadata and operations applied 190. File access 195 brings in file records (user data) into local cache line(s) to process the data. Although FIG. 1 depicts multiple users with separated support, a system could be tailored to a single user or a single provider with only one set of defaults for the single provider. In an embodiment, the "data controllers" are the people or person(s) who are using the OS/filesystem and have access to the personal data of all individuals. For example, a provider of medical services, such as, a hospital or a medical laboratory may collect information from multiple individuals and apply a single policy to all the records while separating access to the records based own the individuals to which the records apply.

FIG. 2 depicts a schematic view of a Built-in legal framework file system infrastructure 200. The infrastructure shows various applications 210 including A1 212, A2 214, . . . , Am 216. The applications may directly utilize a Kernel API Layer 220 having various services, such as, Service 1 222, . . . , Service n 224. These services could be, for example, file access routines, such as open a file and read a file that may be included in an OS and Firmware Layer 240. The infrastructure may include installation support, such as, may be provided by a Setup Components Library 226. In an example embodiment, device driver installation files, such as, .inf files may use this layer. In some embodiments, the I/O System 230 may be part of the Kernel API Layer 220 which utilizes routines that are dedicated to the Built-in legal framework file system infrastructure 200. Some of the Service may be directly part of the file system infrastructure 200 and some may be supplemental to the infrastructure, such as providing support for Power Manger 236, and generic I/O Manager 238. Alternatively, the application may be executing in a runtime environment such as a Java Virtual Machine (JVM) which utilize the libraries. The Built-in legal framework file system infrastructure 200 may by layered on a Hardware Abstraction Layer (HAL) 260.

In an embodiment, the Applications 210, Kernel API Layer 220, and I/O System 230 may be distributed across the Nodes with specialized support in Network Interface Controllers in each node, NIC N1 273 for N1 270, NIC N2 283 for N2 280, . . . , NIC Nm 293 for Nm 290. The OS and Firmware may cache blocks of data in different nodes, such as, cached blocks N1 242, cached blocks N2 244, . . . , cached blocks Nm 246 in the system memory of the respective node. The libraries in the Kernel API layer 220 may also make calls to the Legal Framework File Access (LFFA) layer 240. In some embodiments, the LFFA layer 240 may directly interfaced with local hardware on the node. In other embodiments, there may be an additional abstraction layer, such as a Hardware Abstraction Layer (HAL) 260. In any case, the LFFA 240 may take advantage of local hardware, such as, GPU N1 275 on N1 270, GPU N2 285 on N2, GPU Nm 295 on Nm 290 which may be available on the nodes to perform such operations like encryption and decryption. In addition, there may be special purpose routines and/or hardware to assist with updating and maintaining metadata, recording auditing information, detecting expiration, tracking copies of files, and processing updates related to user consent.

Applications on modern large-scale distributed computer systems are typically constructed using multiple processes. The resources needed by each process, including its memory, are controlled by an operating system. The operating system also has the responsibility for isolating the resources of the processes from other processes, especially those outside its control. As a result, applications resort to the use of messaging techniques in order to communicate between its component processes. Messaging techniques are also used for communication between different applications within a workflow, though, more commonly, file systems are used for such communication, especially when the communicating applications within the workflow are not concurrent. The LFFA 240 may be used for communicating sensitive data between an application using multiple processes which could be distributed on different nodes.

Figure 3:
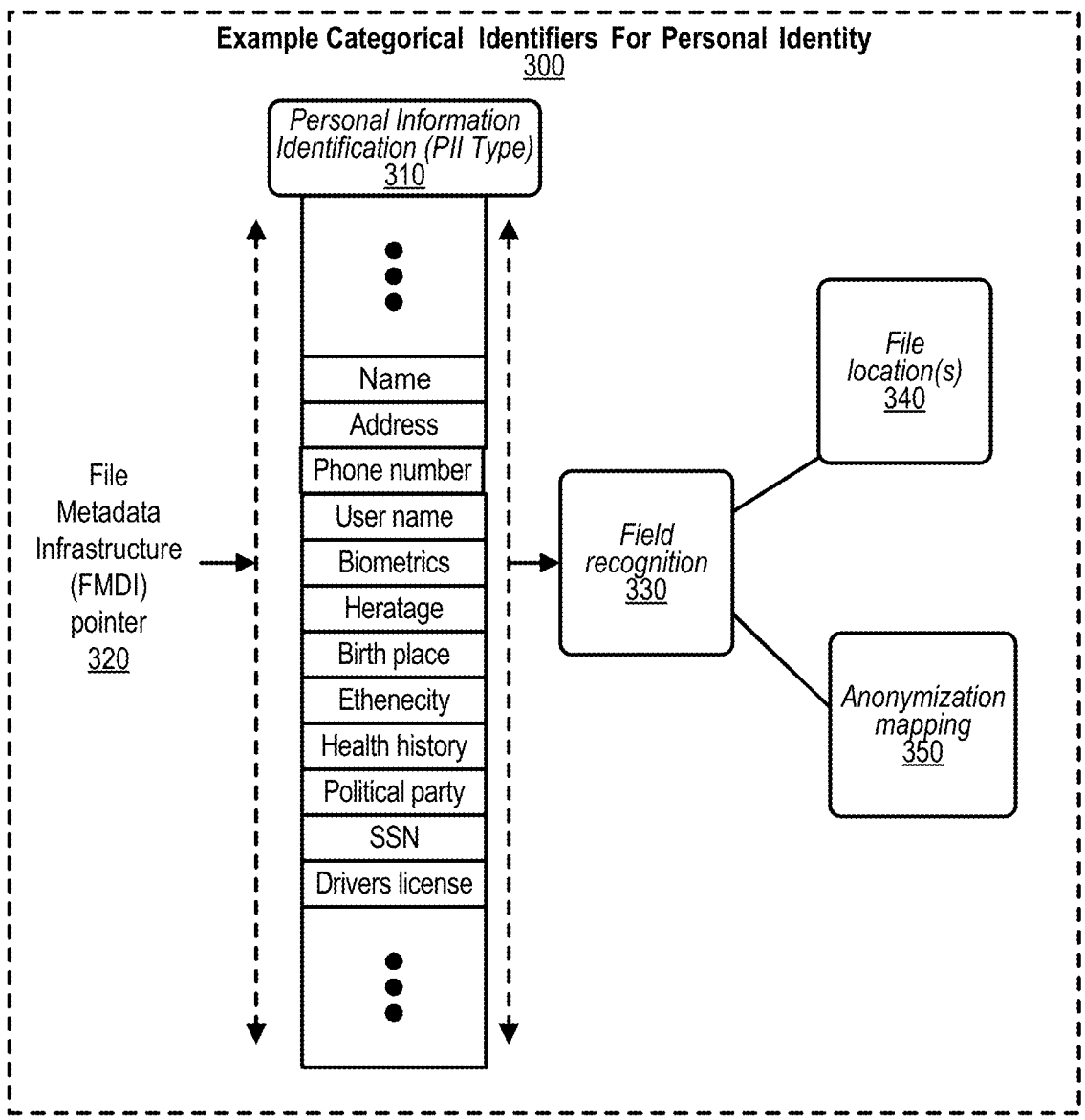
FIG. 3 shows examples of categorical identifiers for personal identity (PII) data.

FIG. 3 depicts examples 300 of categorical identifiers for personal identity (PII) data 310. In an example embodiment, a file metadata infrastructure (FMDI) pointer 320 points to a structure that identifies a Personal Information Identification Type (PII) 310 utilizing a field recognition 330 with file location(s) 340 and if needed, an anonymization mapping 350. Many different types of categories may be supported, such as, but not limited to, not sensitive, sensitive personal based on discovery, mild sensitive personal, medium sensitive personal, highly sensitive personal, business sensitive, business confidential, and the like. There are many ways that the information may be classified and/or identified. In some embodiments the fields may be known based on a template in a form, a user classification, a scan using regular expression, and etc. Having personal information available in one or more files related to a single person may change or affect the sensitivity of the information in the files. For example, being able to identify the specific person for which the information refers may be considered highly sensitive depending on how the data is used. Information in the metadata identifies how user data may be used and tracks copies of user data.

FIG. 4 depicts metadata information that may be tailored to an individual file, file specific metadata 400. In some embodiments that information may be the same across the entire filesystem, such as, when the data is owned by a provider of a medical service. In some embodiments, the metadata may be based on user consent information. This may include access rights 420, which may include granularity for access to the data per user, group, or process. Consent information 430, which may include data owner, status of consent, consent expiration date (if any), details of consented access/use of data, e.g., data can be used for study at user specified granularity. Auditing information 440 which may include detailed records with complete file access information, when accessed, who accessed the file, what command was executed, what info was retrieved, all locations where the file content is available (e.g., when the file is copied, edited and saved elsewhere in the disk, etc.). Users of the system who can access the file and the type of access they are allowed 450. This may include support for partial access (i.e., view part of the information stored in the file) or view of information at a different granularity, or after noise addition/transformation/obfuscation has been applied. Retention period for the data 460. After the retention period, the data is automatically removed from the filesystem by the OS. Information about each copy of the original file created 470. This information is tracked when the contents are first placed on disk in the filesystem to ensure that all copies of the file are linked together (e.g., to support data erasure if requested by the data owner). Personally, identifiable information (PII) 480 which includes discovery and mapping details. In an embodiment, all access to file data is audited, such that, when a selected file is accessed, the auditing information records information related to accessing the selected file, who accessed the selected file, when the selected file is accessed and any actions performed on the selected file. The consent information includes a purpose for which the personal data can be used, a date that an authorization was given by the data owner, and a date of the expiration. The selected file is deleted automatically after the date of the expiration. The system may automatically adjust the metadata based on current contents in the file and a current consent information of the data owner.

Figure 5:
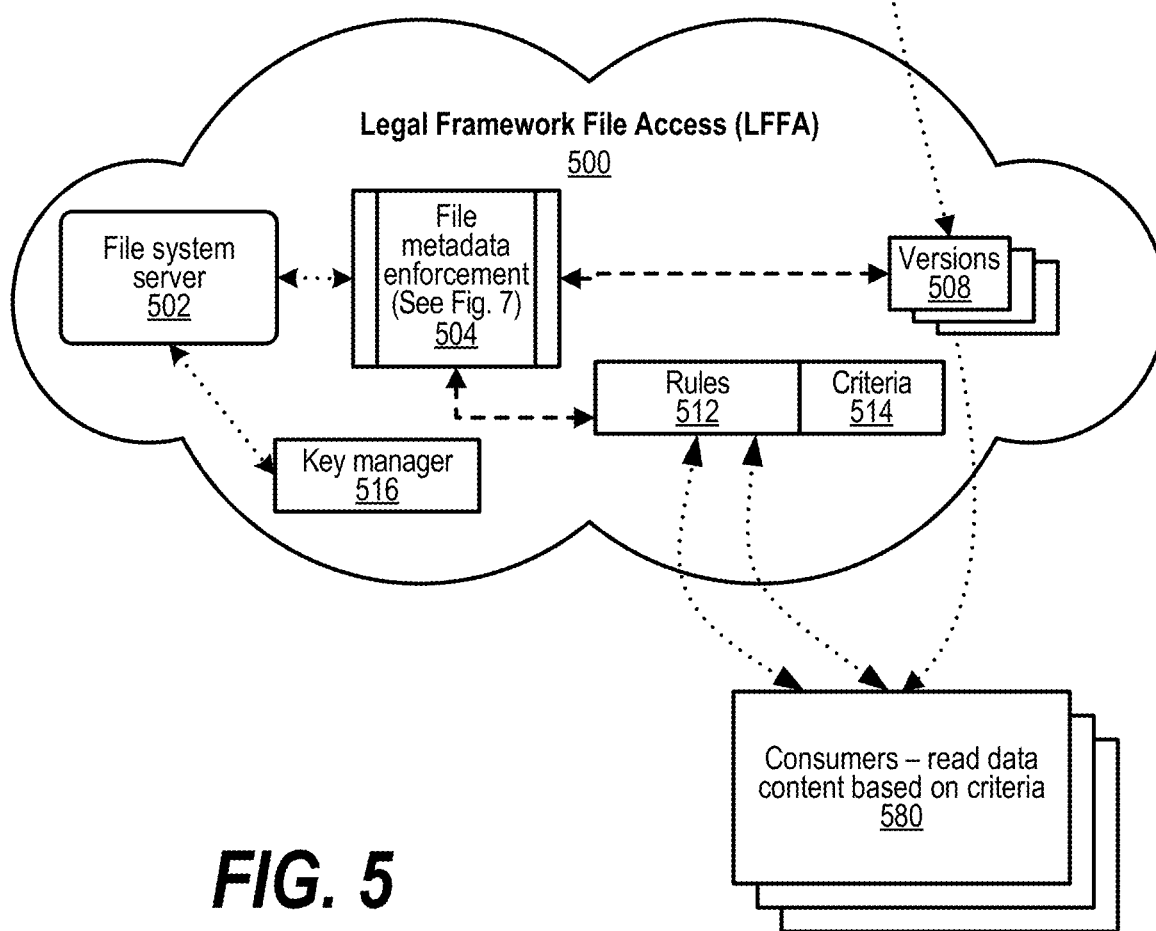
FIG. 5 shows a schematic view of a legal file framework overview utilizing legal framework file access (LFFA)

FIG. 5 depicts a schematic view of a Legal File Framework Overview of Legal Framework File Access (LFFA) 500. There are many existing Legal File Frameworks that are currently defined and approved or planned to be to be approved. Examples of Privacy Laws 510 include but are not limited to General Data Protection Regulation (GDPR), Health Insurance Portability and Accountability Act (HIPPA), Personal Information Protection and Electronic Documents Act (PIPEDA), and Food and Drug Administration (FDA).

When new version of data are added to the system, producers provide, publish, or create versions 508 of data 560. In an embodiment, a producer sends a request to add new data to a file system server 502. When the server 502 receives the request, the server 502 is responsible for ensuring data is encrypted as appropriate by utilizing a key manager 516. Proper usage of keys is important for separating access to data. There are many approaches for creating keys to be used to encrypt and decrypt data. In some embodiments, the strength of the keys and the complexity of preventing access to the keys may be chosen based on the sensitivity of the data. In some embodiments, the contents of the file are scanned for PII to determine the sensitivity of the data in the file. In some embodiments, the maximum classification of sensitivity found in the file may be used for the entire file, for example, a social security number in the file may be assessed as very sensitive. Different embodiments may use different rules, for example, there may be different levels of encryption based on a sensitivity of portions of the file, such as, by a mapping of field types to a level of sensitivity. As an example, the type of field may be known by a template of a document used to create the file. Then using information about the sensitivity of the data, the file system server 502 may ensure predefined process file metadata enforcement 504 is configured to properly process each of the various file access routines (see FIG. 7 and corresponding text for processing details) by setting up rules 512 and criteria 514 which allow consumers 580 to read data content based on and the rules 512 and the criteria 514.

Figure 6:
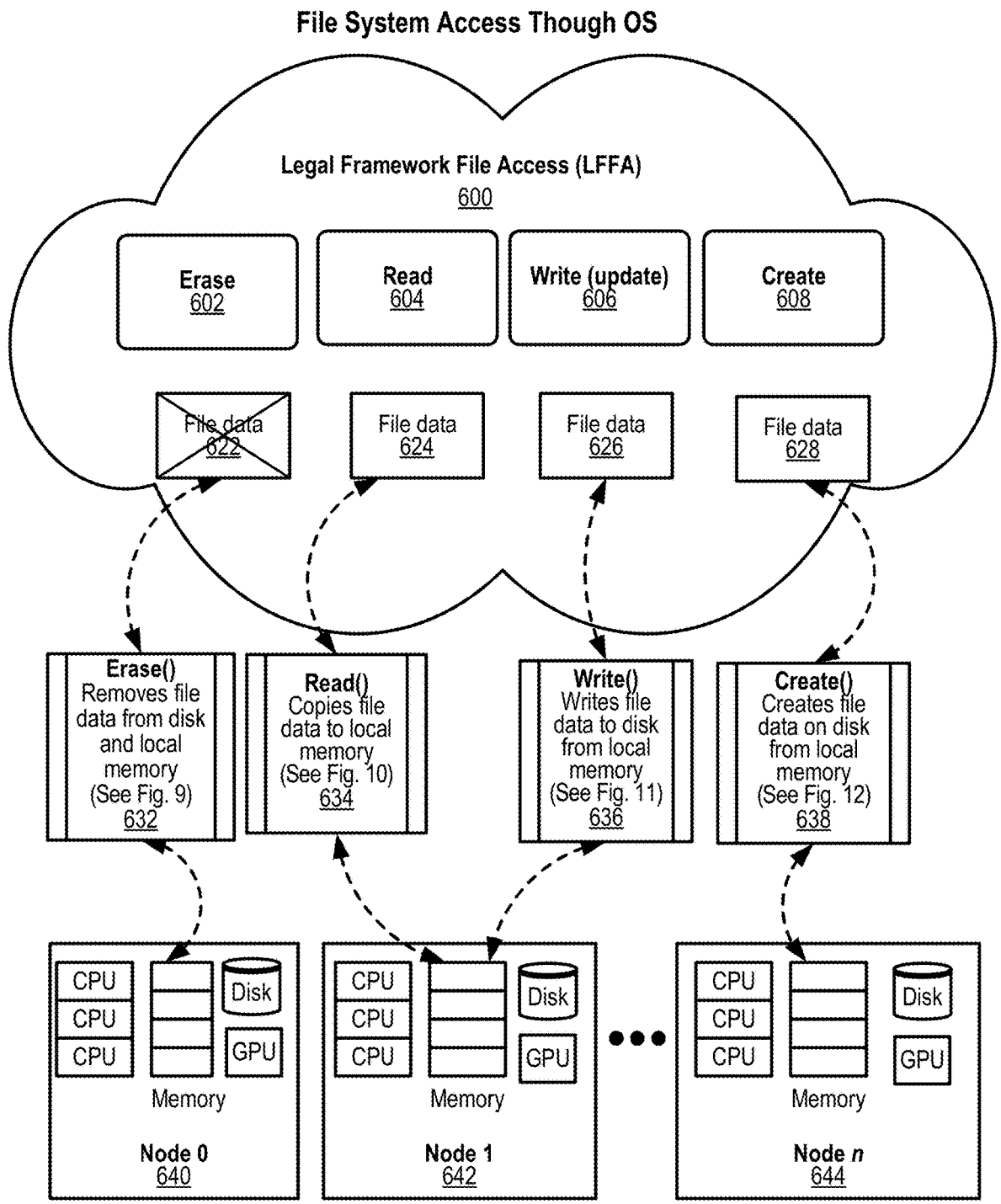
FIG. 6 shows a flow of data for file system access though OS utilizing LFFA.

FIG. 6 depicts a schematic view of file system access through the OS where access is through the Legal Framework File Access (LFFA) 600 layer. Basic file operation including erase 602, read 604, write (update) 606, and create 608 are shown with an indication of a flow of the data (contents) to memory of the files accessed by the file operation. In this schematic view, the predefined erase 602 operation takes place on Node 0 640 where file data 622 is removed from disk and local memory 632 (see FIG. 9 and corresponding text for processing details). In order to identify all the contents to be erased, the file may need to be decrypted. Decryption may be supported by the file read operations in the hardware or may be a separate step, for example, by a file handler that utilizes the GPU for decryption. The Read 604 operation takes place on Node 1 642 where file data 624 is copied to local memory in Node 1 642 (see FIG. 10 and corresponding text for processing details). Again, the file may need to be decrypted. Decryption may be supported by the file read operations in the hardware or may be a separate step, for example, supported by a file handler that utilizes the GPU for decryption. The write (update) 636 also takes place on Node 1 642. The updated file data 626 may also be the file data 624 read which may have been updated or may be new data added to the file. In any case, encryption may be required before writing the data to disk from local memory 636 (see FIG. 11 and corresponding text for processing details). Encryption may be supported by the file write operations in the hardware or may be a separate step supported by a file handler that utilizes the GPU for encryption. The create 638 operation takes place on Node n 644 where file data 628 is in local memory in Node n 644 (see FIG. 11 and corresponding text for processing details). Again, the file may need to be encrypted. Encryption may be supported by the file write operations in the hardware or may be, for example, a separate step supported by a file handler that utilizes the GPU for encryption.

Figure 7:
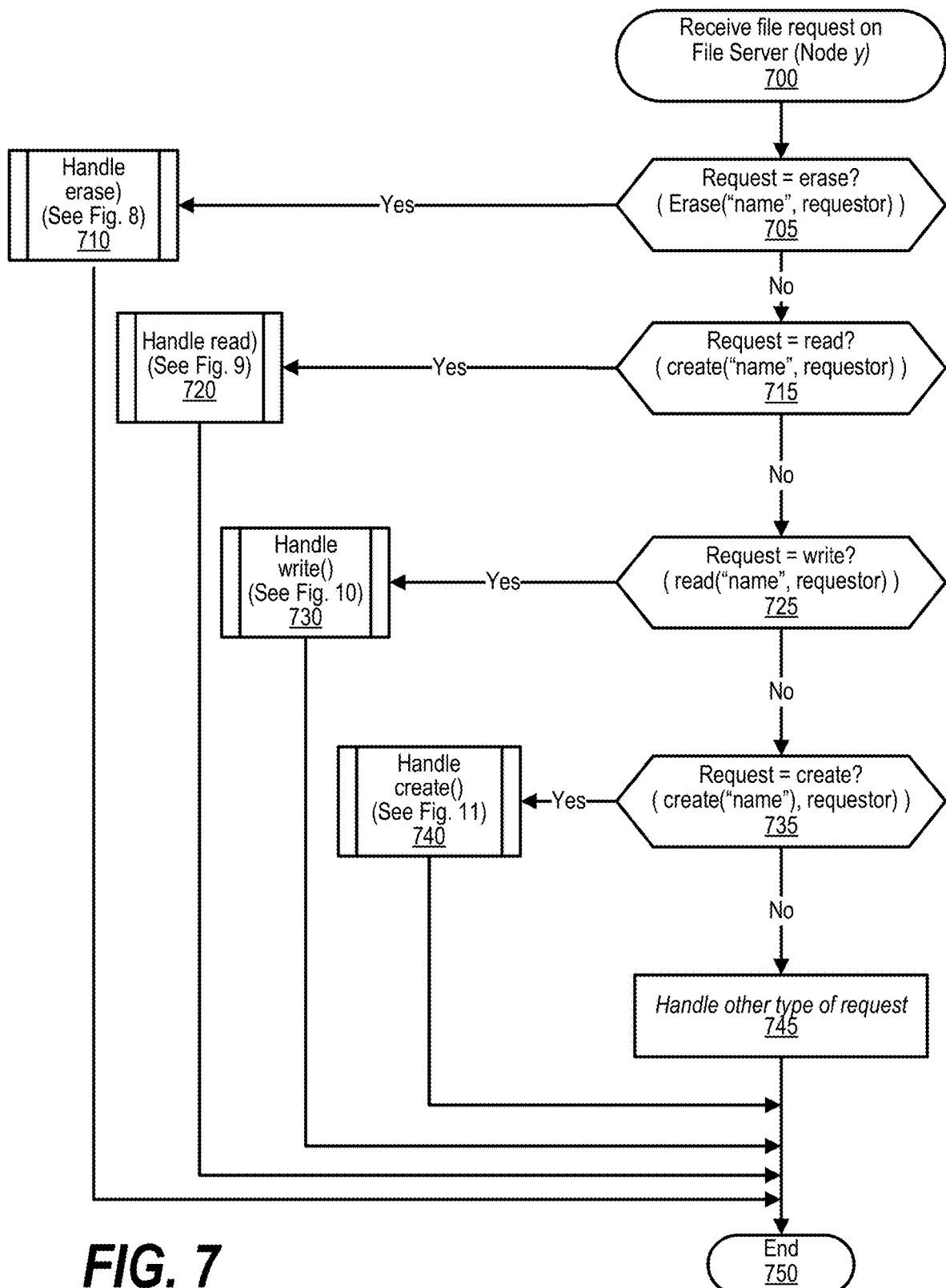
FIG. 7 shows a flowchart depicting steps taken to handle a received file request.

FIG. 7 processing commences at 700 and shows the steps taken by a process that receives a file request on Node Y and handles the file request. The process determines as to whether request=erase (decision 705). If request=erase, then decision 705 branches to the 'yes' branch. On the other hand, if not request=erase, then decision 705 branches to the 'no' branch. At predefined process 710, the process performs the handle erase) routine (see FIG. 8 and corresponding text for processing details). The process determines as to whether request=read (decision 715). If request=read, then decision 715 branches to the 'yes' branch. On the other hand, if not request=read, then decision 715 branches to the 'no' branch. At predefined process 720, the process performs the handle read) routine (see FIG. 9 and corresponding text for processing details). The process determines as to whether request=write (decision 725). If request=write, then decision 725 branches to the 'yes' branch. On the other hand, if not request=write, then decision 725 branches to the 'no' branch. At predefined process 730, the process performs the handle write( ) routine (see FIG. 10 and corresponding text for processing details). The process determines as to whether request=create (decision 735). If request=create, then decision 735 branches to the 'yes' branch. On the other hand, if not request=create, then decision 735 branches to the 'no' branch. At predefined process 740, the process performs the handle create( ) routine (see FIG. 11 and corresponding text for processing details). At step 745, the process handles other type of request. FIG. 7 processing thereafter ends at 750.

Figure 8:
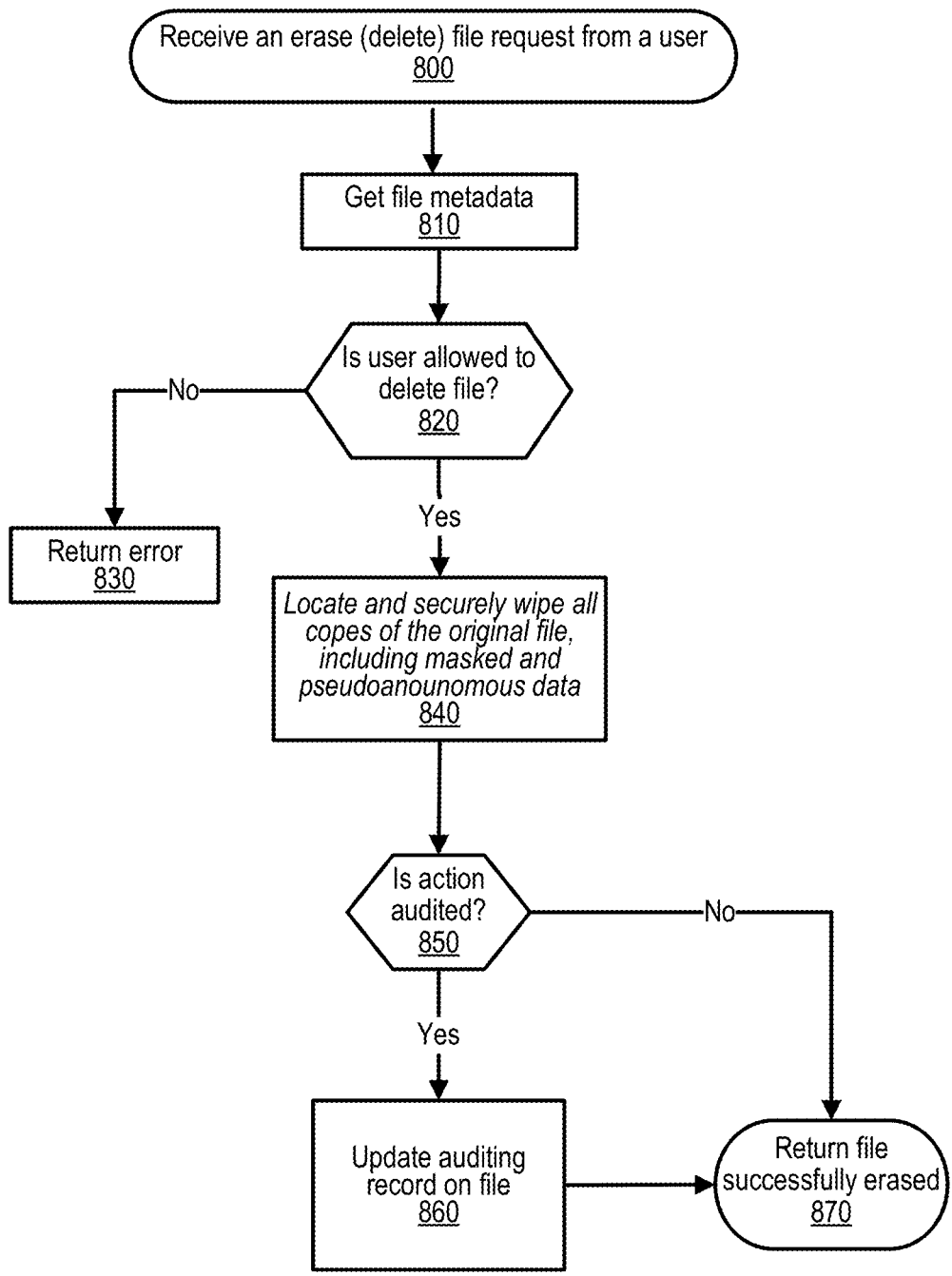
FIG. 8 shows a flowchart depicting steps taken to handle a received erase (delete) file request from a user.

FIG. 8 processing commences at 800 and shows the steps taken by a process that receive an erase (delete) file request from a user. The process gets file metadata at step 810. The process determines as to whether is user allowed to delete file (decision 820). If is user allowed to delete file, then decision 820 branches to the 'yes' branch. On the other hand, if not is user allowed to delete file, then decision 820 branches to the 'no' branch. FIG. 8 processing thereafter returns an error to the calling routine (see FIG. 7) at step 830. When user is allowed to delete the data, the process locates and securely wipes out all copes of the original file, including masked and pseudo anonymous data at step 840. The process determines as to whether action is audited (decision 850). If action is audited, then decision 850 branches to the 'yes' branch. On the other hand, if action is not audited, then decision 850 branches to the 'no' branch. At step 860 the process updates the auditing record on file. FIG. 8 processing ends and returns file successfully erased at step 870.

Figure 9:
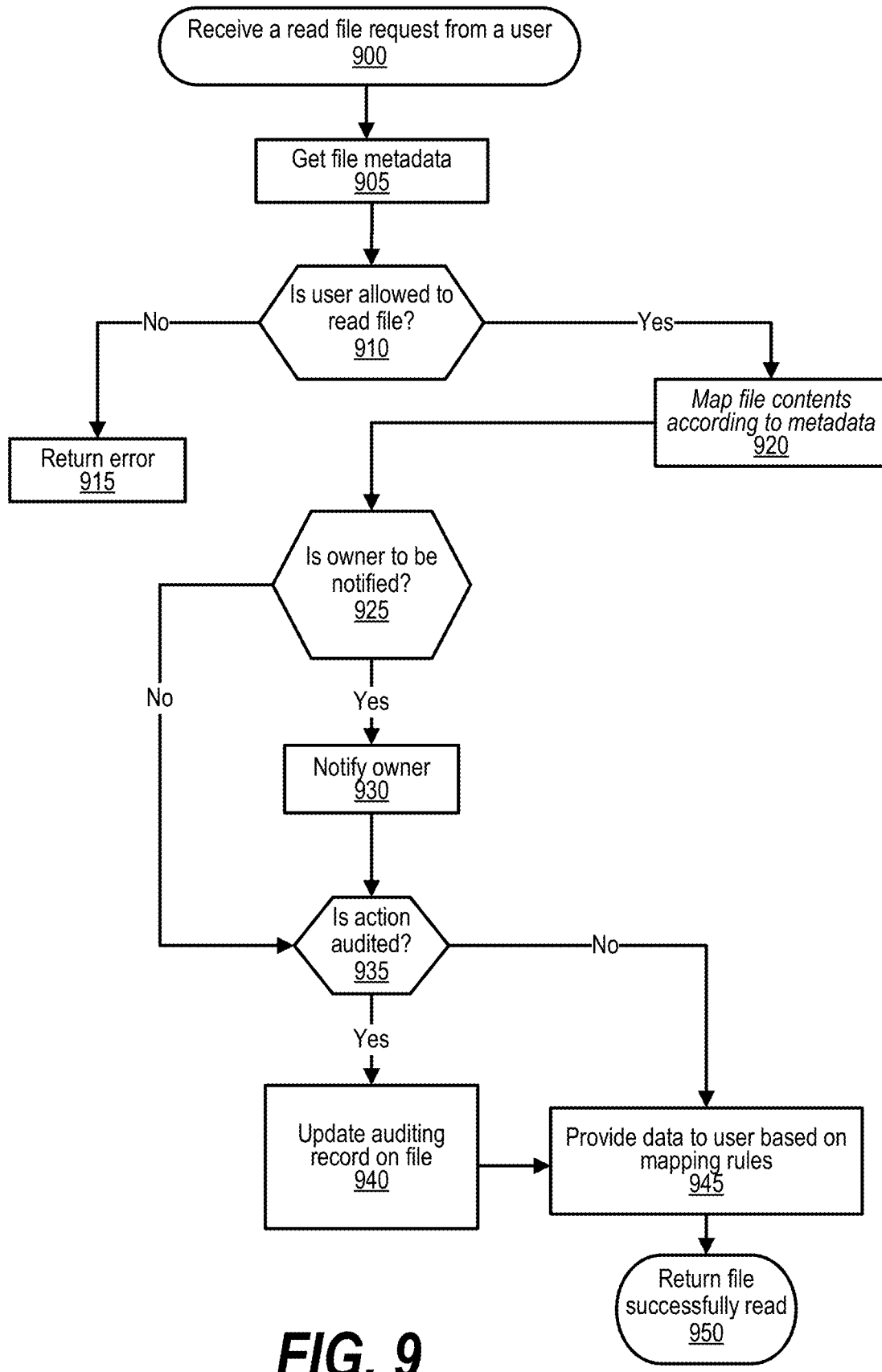
FIG. 9 shows a flowchart depicting steps taken to handle a received read file request from a user.

FIG. 9 processing commences at 900 and shows the steps taken by a process that receives a read file request from a user. At step 905, the process gets file metadata. The process determines as to whether is user allowed to read file (decision 910). If is user allowed to read file, then decision 910 branches to the 'yes' branch. On the other hand, if not is user allowed to read file, then decision 910 branches to the 'no' branch. FIG. 9 processing thereafter returns an error to the calling routine (see FIG. 7) at 915. The process maps file contents according to metadata at step 920. The process determines as to whether is owner to be notified (decision 925). If is owner to be notified, then decision 925 branches to the 'yes' branch. On the other hand, if not is owner to be notified, then decision 925 branches to the 'no' branch. At step 930, the process notifies owner. The process determines as to whether is action audited (decision 935). If is action audited, then decision 935 branches to the 'yes' branch. On the other hand, if not is action audited, then decision 935 branches to the 'no' branch. At step 940, the process updates auditing record on file. At step 945, the process provides data to user based on mapping rules. FIG. 9 processing thereafter ends by returning file successfully read at 950.

Figure 10:
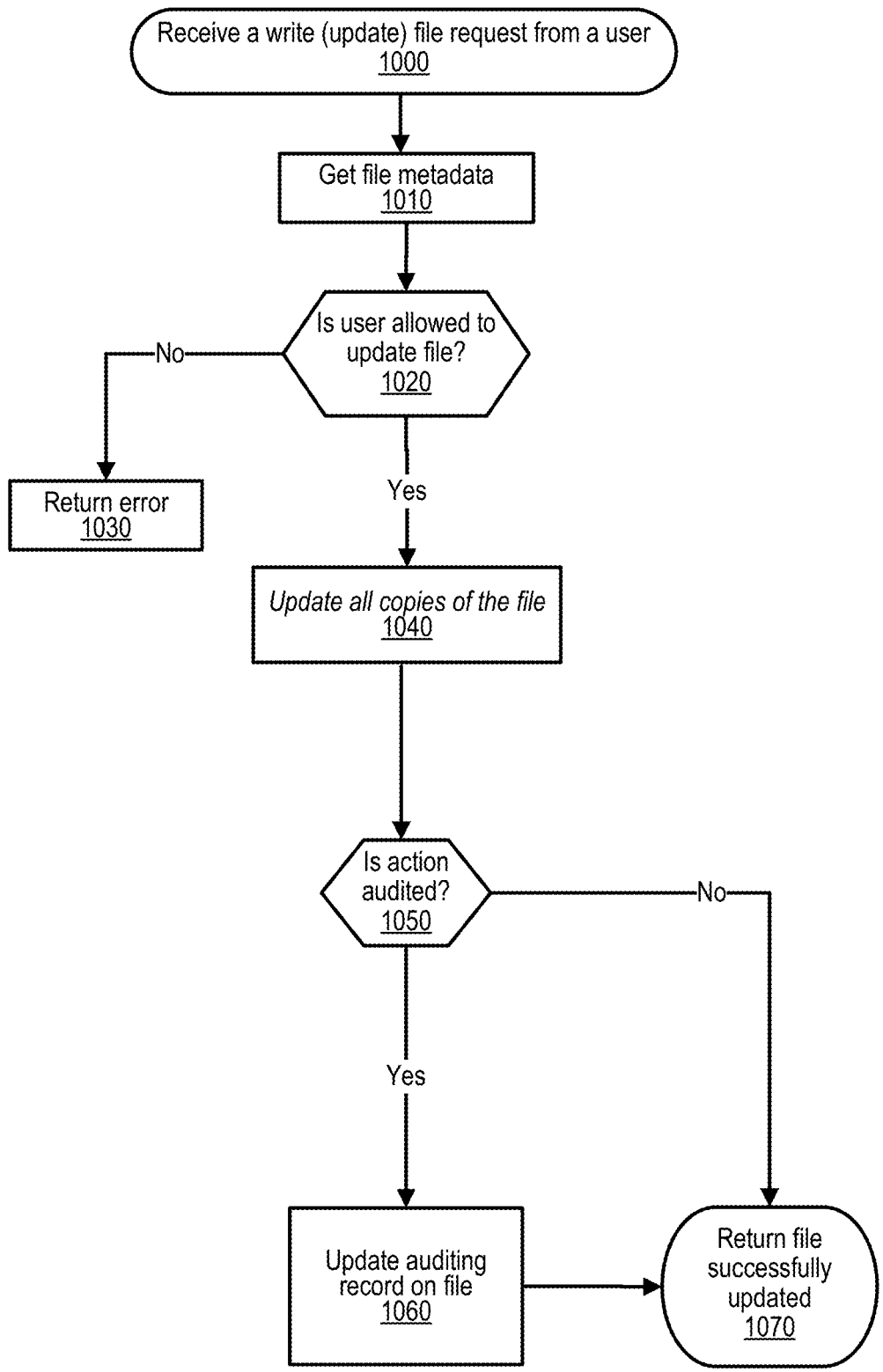
FIG. 10 shows a flowchart depicting steps taken to handle a received write (update) file request from a user.

FIG. 10 processing commences at 1000 and shows the steps taken by a process that receive a write (update) file request from a user. At step 1010, the process gets file metadata. The process determines as to whether is user allowed to update file (decision 1020). If is user allowed to update file, then decision 1020 branches to the 'yes' branch. On the other hand, if not is user allowed to update file, then decision 1020 branches to the 'no' branch. FIG. 10 processing thereafter returns an error to the calling routine (see FIG. 7) at 1030. At step 1040, the process updates all copies of the file. The process determines as to whether is action audited (decision 1050). If is action audited, then decision 1050 branches to the 'yes' branch. On the other hand, if not is action audited, then decision 1050 branches to the 'no' branch. At step 1060, the process updates auditing record on file. FIG. 10 processing thereafter ends by returning file successfully updated at 1070.

Figure 11:
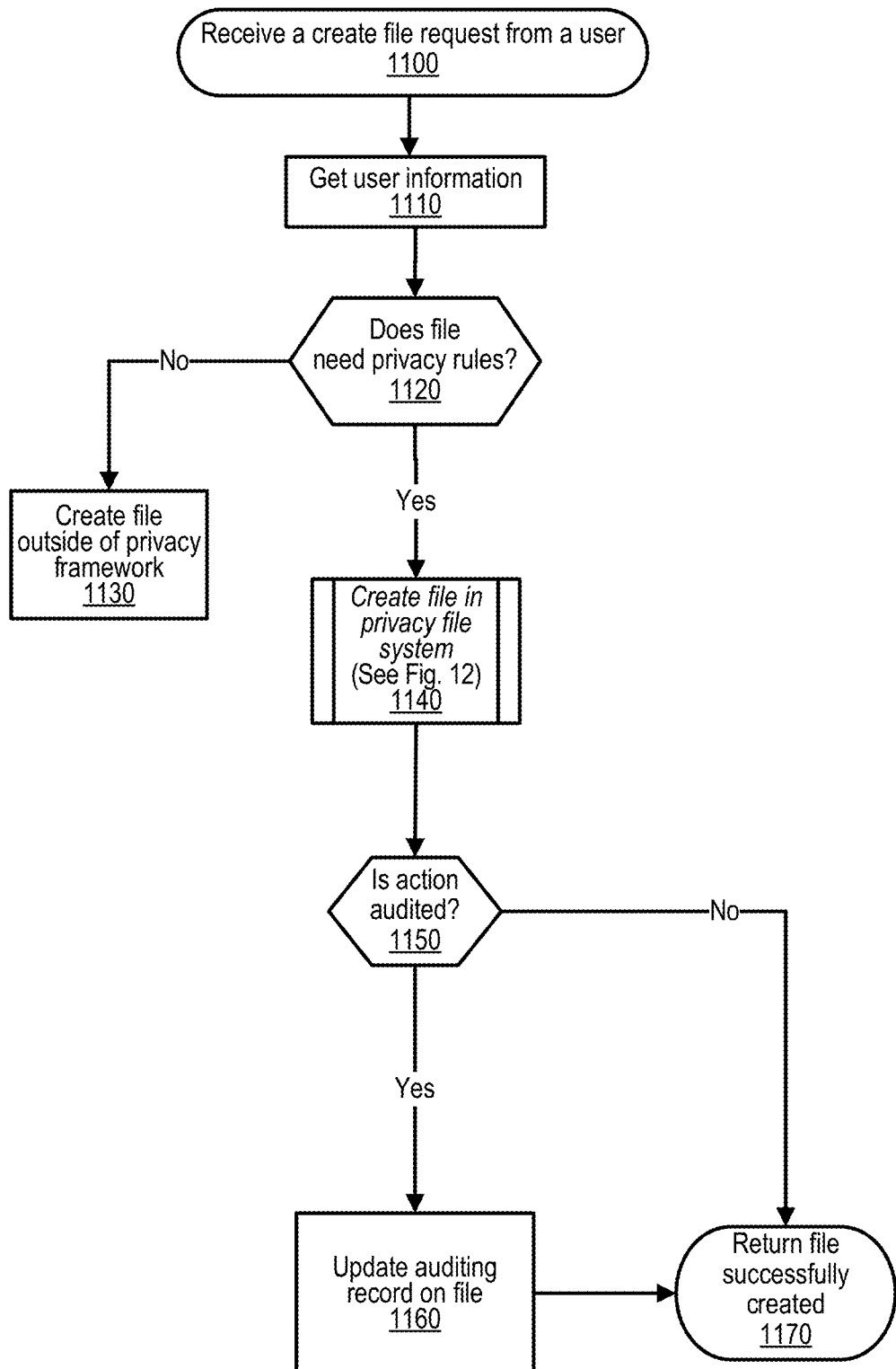
FIG. 11 shows a flowchart depicting steps taken to handle a create file request from a user.

FIG. 11 processing commences at 1100 and shows the steps taken by a process that receive a create file request from a user. At step 1110, the process gets user information. The process determines as to whether does file need privacy rules (decision 1120). If does file need privacy rules, then decision 1120 branches to the 'yes' branch. On the other hand, if not does file need privacy rules, then decision 1120 branches to the 'no' branch. At step 1130, the process creates file outside of privacy framework. At step 1140, the process creates file in privacy file system (See FIG. 12 and corresponding text). The process determines as to whether is action audited (decision 1150). If is action audited, then decision 1150 branches to the 'yes' branch. On the other hand, if not is action audited, then decision 1150 branches to the 'no' branch. At step 1160, the process updates auditing record on file. FIG. 11 processing thereafter ends by returning file successfully at 1170.

Figure 12:
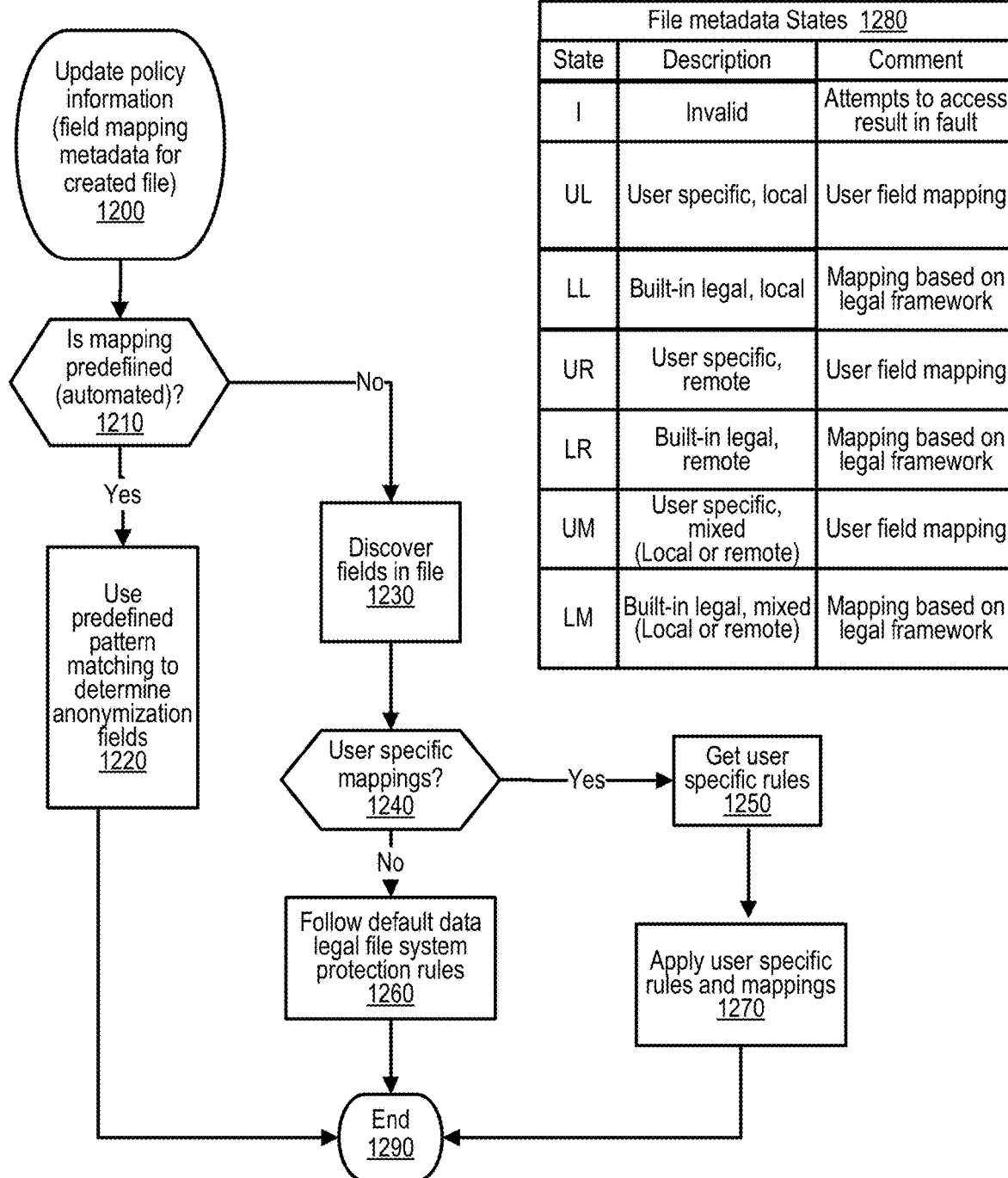
FIG. 12 shows a flowchart depicting steps taken to determine field mapping for file.

FIG. 12 processing commences at 1200 and shows the steps taken by a process that updates policy information (field mapping metadata for created or updated file). The process determines as to whether is mapping predefiined (automated) (decision 1210). If is mapping predefiined (automated), then decision 1210 branches to the 'yes' branch. On the other hand, if not is mapping predefiined (automated), then decision 1210 branches to the 'no' branch. At step 1220, the process may use predefined pattern matching to determine anonymization fields. In some embodiments, locations of entries in the file with sensitive data may be known, such as, in a form. At step 1230, the process discovers fields in file. The process determines as to whether there are user specific mappings (decision 1240). If there are user specific mappings, then decision 1240 branches to the 'yes' branch. On the other hand, if not user specific mappings, then decision 1240 branches to the 'no' branch. At step 1250, the process gets user specific rules. At step 1260, the process follows default data legal file system protection rules. Table 1280 identifies metadata states related to the file where (1) State "I" is invalid and an attempt to access may result in either a fault or initiate a process to define the file metadata, which could be handled by the fault. (2) State "UL" is a user or file specific state where the file is processed locally and there is user specific or file specific mappings. (3) State "LL" is built-in legal state where the file is processed locally, and the mappings are based on the built-in legal framework. (4) State "UR" is a user or file specific state where the file is processed remotely and there is user specific or file specific mappings. (5) State "LR" is built-in legal state where the file is processed remotely, and the mappings are based on the built-in legal framework. (6) State "UM" is a user or file specific state where the file is processed either locally or remotely and there is user specific or file specific mappings. (7) State "LM" is built-in legal state where the file is processed either locally or remotely, and the mappings are based on the built-in legal framework. At step 1270, the process applies user specific rules and mappings. FIG. 12 processing thereafter ends at 1290.

Figure 13:
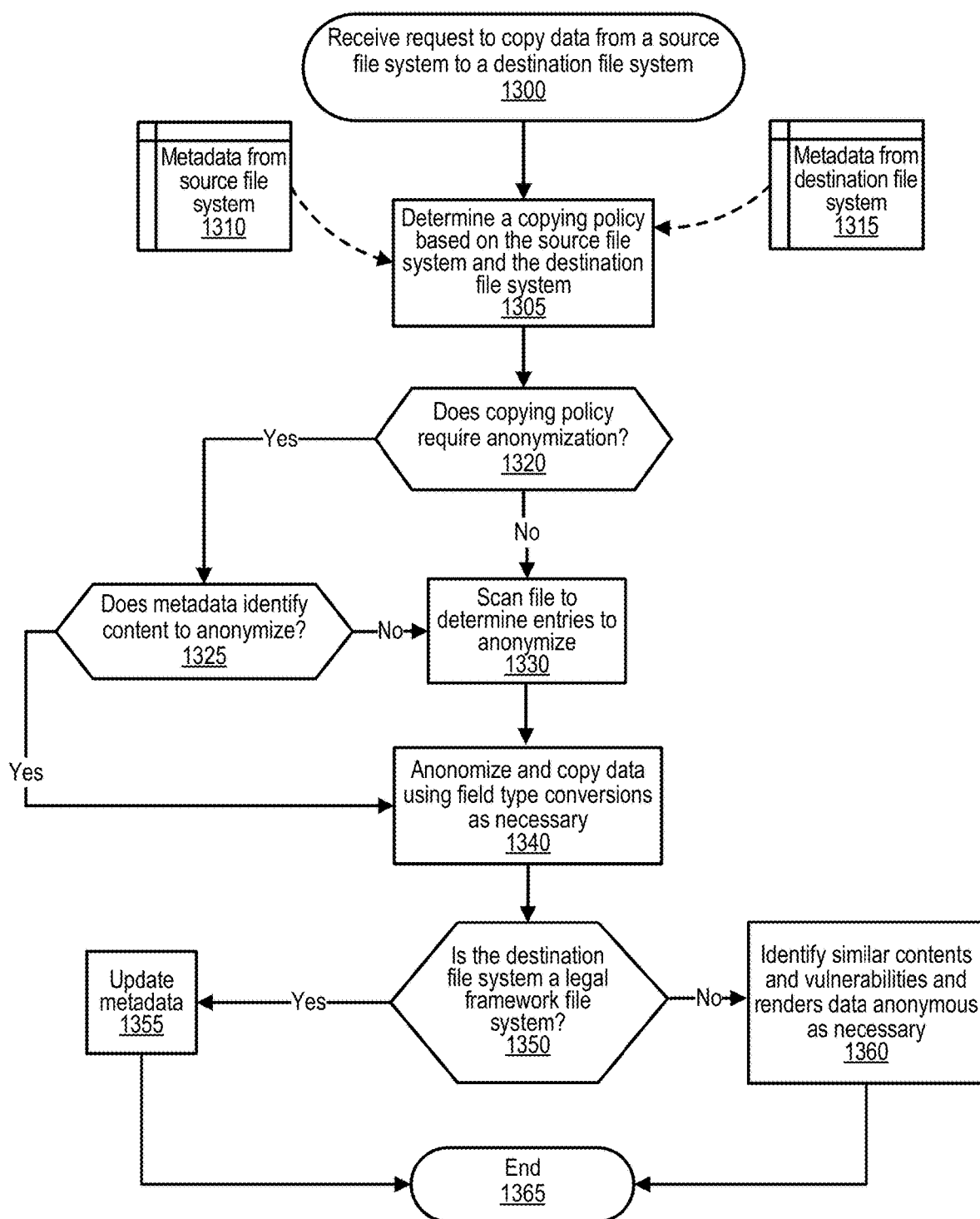
FIG. 13 shows a flowchart depicting steps taken to process a request to copy data from a source file system to a destination file system.

FIG. 13 processing commences at 1300 and shows the steps taken by a process that receives a request to copy data from a source file system to a destination file system. At step 1305, the process determines a copying policy based on metadata from the source file system 1310 and metadata from destination file system 1315. The copying policy may require one or more "policy tasks", such as, some form of conversion of the information being copied. The process determines whether does copying policy require anonymization (decision 1320). If does copying policy require anonymization, then decision 1320 branches to the 'yes' branch. On the other hand, if not does copying policy require anonymization, then decision 1320 branches to the 'no' branch. The process determines as to whether does metadata identify content to anonymize (decision 1325). If does metadata identify content to anonymize, then decision 1325 branches to the 'yes' branch. On the other hand, if not does metadata identify content to anonymize, then decision 1325 branches to the 'no' branch. At step 1330, the process scans file to determine entries to anonymize. At step 1340, the process anonymizes and copy data using field type conversions as necessary. The conversions may include, pseudonymization, masking, de-identification, abstraction, granularity mapping, and the like. The mapping may depend on the entry type and on the destination file system or on the usage of the copied data, for example, a birthday may be identified by the year for when the destination file system is not a legal file system, but may be left intact when the destination file system is a legal file system. A social security number may be replaced with "XXX-XX-XXXX" when the destination file system is not a legal file system but may be left intact when the destination file system is a legal file system. The mapping may be determined by a file extension. For example, a .doc file may be best processed by using a conversion to a text or ASCII format. The processing of a .pdf file may be processed in one manner if the .pdf file is a form and another manner if the .pdf file is not a form. In some embodiments, the file may be converted to a canonical form such as, an .xml format and processed in the canonical form. The process determines as to whether is the destination file system a legal framework file system (decision 1350). If is the destination file system a legal framework file system, then decision 1350 branches to the 'yes' branch. On the other hand, if not is the destination file system a legal framework file system, then decision 1350 branches to the 'no' branch. At step 1355, the process updates metadata to reflect information about the copied content. At step 1360, the process identifies similar contents and vulnerabilities and renders data anonymous as necessary. FIG. 13 processing thereafter ends at 1365.

Figure 14:
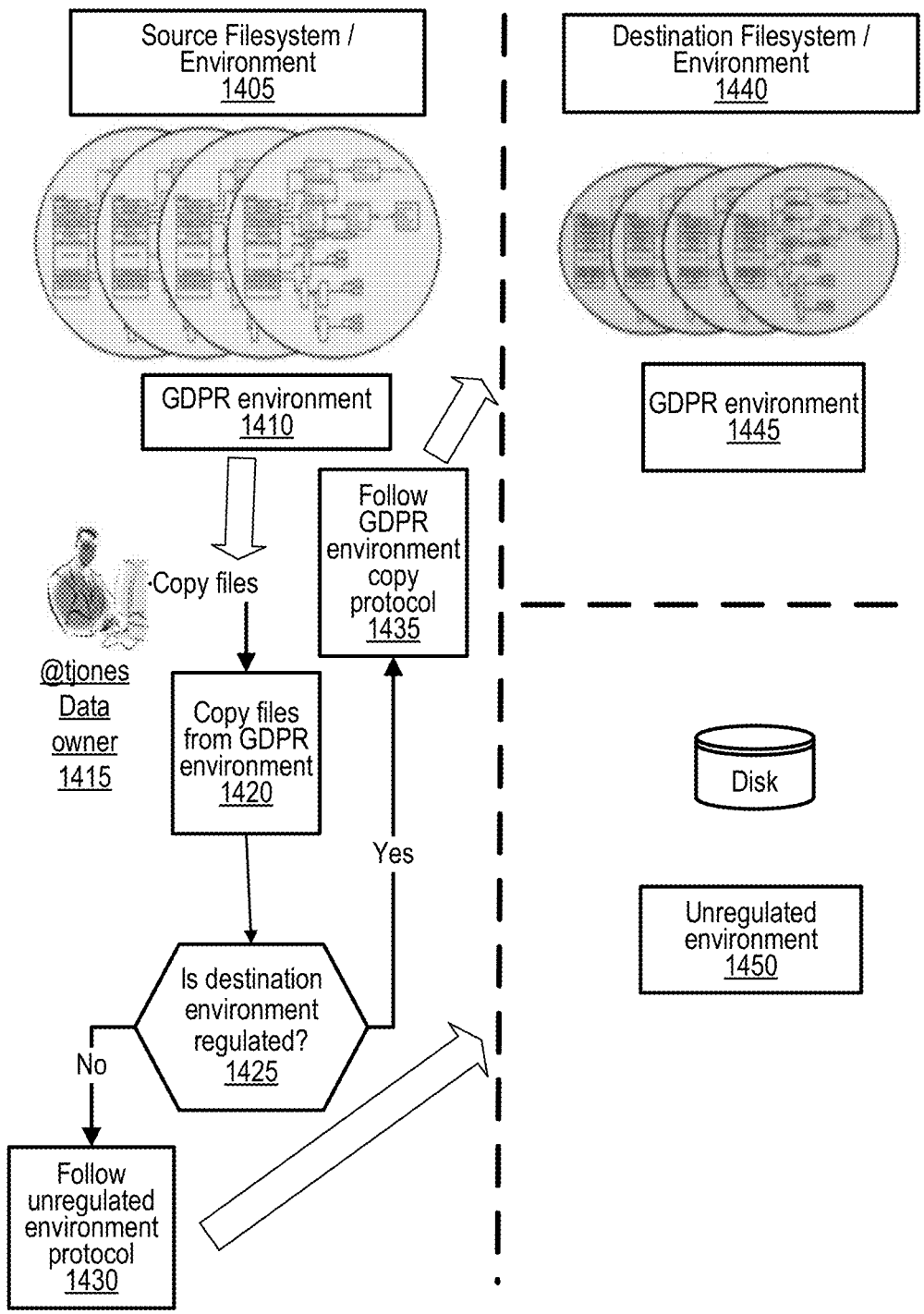
FIG. 14 shows a schematic view of policy enforcement due to data movement from one filesystem to another.

FIG. 14 depicts a schematic diagram for policy enforcement due to data movement from one filesystem to another 1400. A user @tjones, the data owner 1415, initiates a copy request to copy files from a source filesystem environment 1405 being a regulated or legal file system, such as a GDPR environment 1410 to a destination filesystem environment 1440. The process determines as to whether is destination environment regulated (decision 1425). If is destination environment regulated, then decision 1425 branches to the 'yes' branch. On the other hand, if not is destination environment regulated, then decision 1425 branches to the 'no' branch. At step 1430, the process follows unregulated environment 1450 protocol. At step 1435, the process follows the GDPR environment copy protocol. At step 1420, the process copies file utilizing the GDPR environment 1410 protocol.

Figure 15:
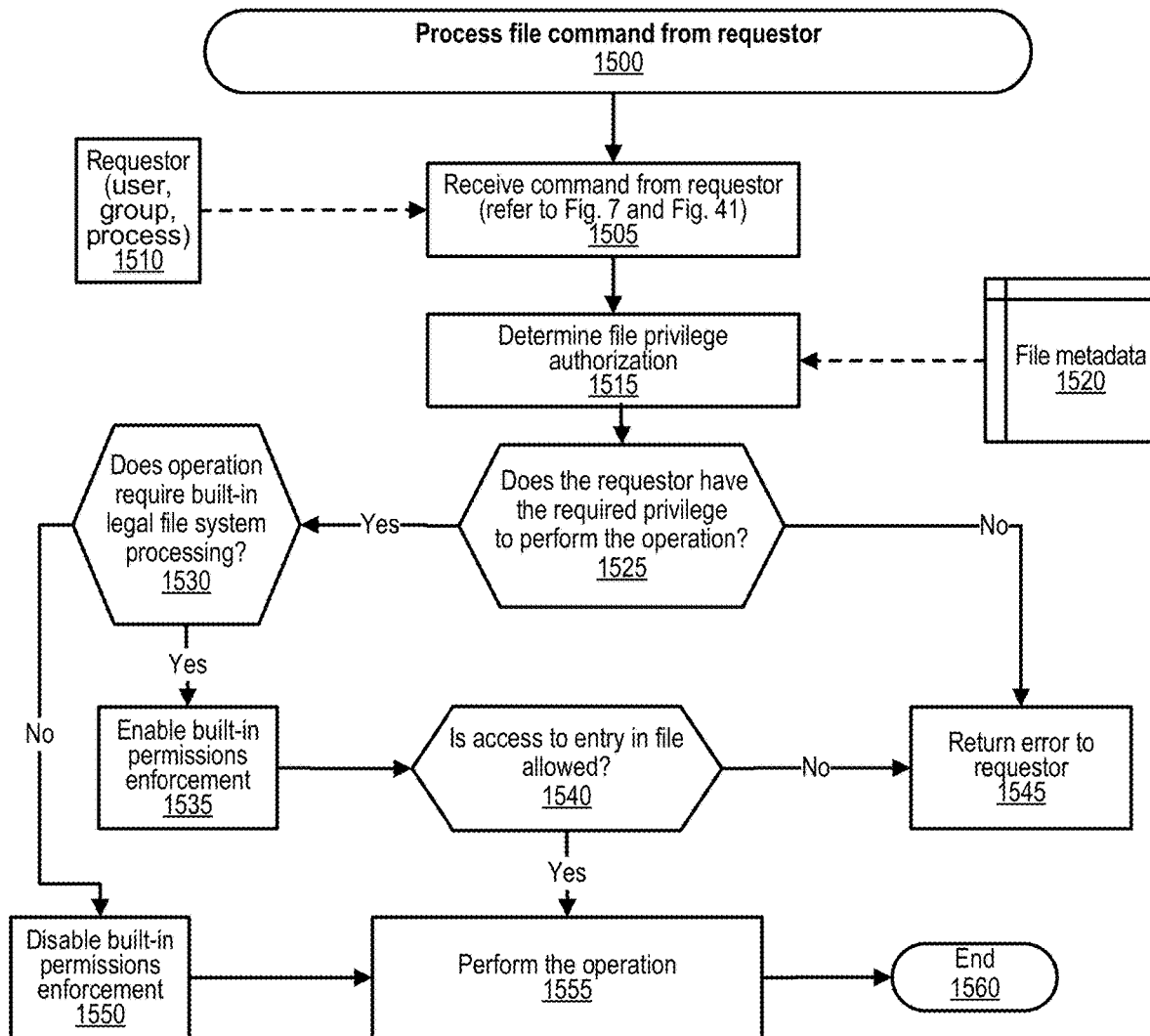
FIG. 15 shows a flowchart depicting steps taken to handle a file command received from requestor.

FIG. 15 processing commences at 1500 and shows the steps taken by a process that processes a command received from requestor. At step 1505, the process receives the command from requestor which may be a user, a group, or a process 1510 (refer to FIG. 7 and FIG. 42). At step 1515, the process determines file privilege authorization from the file metadata 1520. The process determines as to whether does the requestor have the required privilege to perform the operation (decision 1525). If does the requestor have the required privilege to perform the operation, then decision 1525 branches to the 'yes' branch. On the other hand, if not does the requestor have the required privilege to perform the operation, then decision 1525 branches to the 'no' branch. The process determines as to whether does operation require built-in legal file system processing (decision 1530). If does operation require built-in legal file system processing, then decision 1530 branches to the 'yes' branch. On the other hand, if not does operation require built-in legal file system processing, then decision 1530 branches to the 'no' branch. At step 1535, the process enables built-in permissions enforcement. The process determines as to whether is access to entry in file allowed (decision 1540). If is access to entry in file allowed, then decision 1540 branches to the 'yes' branch. On the other hand, if not is access to entry in file allowed, then decision 1540 branches to the 'no' branch. FIG. 15 processing thereafter returns error to the requestor at 1545. At step 1550, the process disables built-in permissions enforcement. At step 1555, the process performs the operation. FIG. 15 processing thereafter ends at 1560. In one embodiment, the application is a backup application and the process disables built-in permissions enforcement. In another embodiment, the request is from a user gathering data to analyze an effectiveness of a drug used to treat a type of acne for people over the age of 10 and under the age of 18. For the analysis of a treatment option based on a demography, the process enables built-in permissions enforcement, and extracts data tailored to consent permission of the user. For a first user pseudonymization is performed and for a second user anonymization is performed and for a third user, access to the required information is prohibited.

Figure 16:
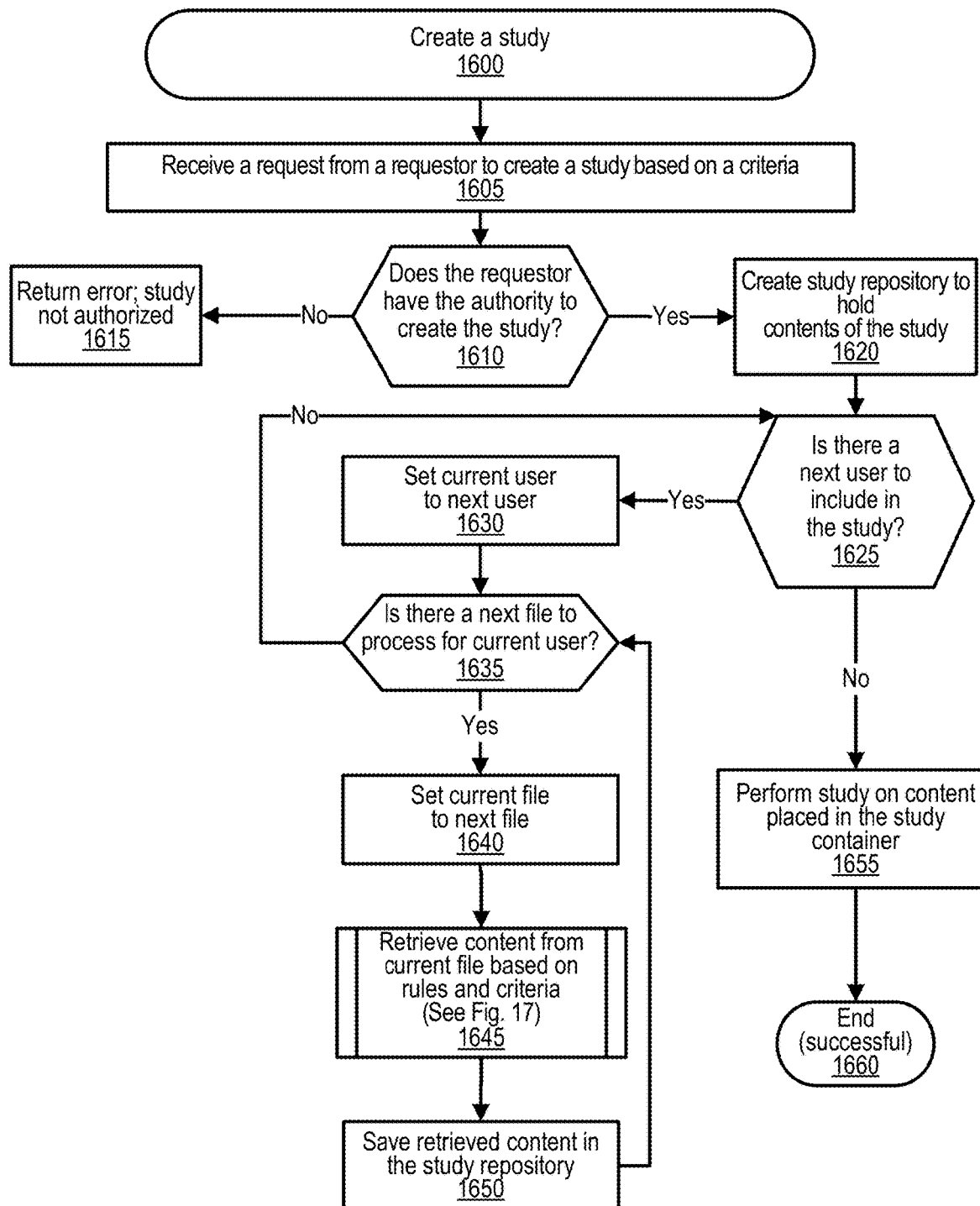
FIG. 16 shows a flowchart depicting steps taken to handle creating a study.

FIG. 16 processing commences at 1600 and shows the steps taken by a process that creates a study. At step 1605, the process receives a request from a requestor to create a study based on a criteria. The process determines as to whether does the requestor have the authority to create the study (decision 1610). If does the requestor have the authority to create the study, then decision 1610 branches to the 'yes' branch. On the other hand, if not does the requestor have the authority to create the study, then decision 1610 branches to the 'no' branch. FIG. 16 processing thereafter returns error indicating study not authorized to the calling routine at 1615. At step 1620, the process creates a study repository to hold contents of the study. The repository could be, for example, a folder, a directory, or a container suitable to hold the contents of the study and the like. The process determines as to whether is there a next user to include in the study (decision 1625). If is there a next user to include in the study, then decision 1625 branches to the 'yes' branch which sets current user to next user at step 1630. The process determines as to whether is there a next file to process for current user (decision 1635). If not is there a next file to process for current user, then decision 1635 branches to the 'no' branch which loops back to 1625. If is there a next file to process for current user, then decision 1635 branches to the 'yes' branch to set current file to next file at step 1640 continuing to step 1645, where the process retrieves content from current file based on rules and criteria (See FIG. 17). At step 1650, the process saves retrieved content in the study repository and loops back to step 1635 until there is no longer a next file to process for the current user at which time 1635 loops back to 1625 and continues looping until there is no next user to include in the study. At step 1655, the process performs study on content placed in the study container. FIG. 16 processing thereafter successfully ends at 1660.

Figure 17:
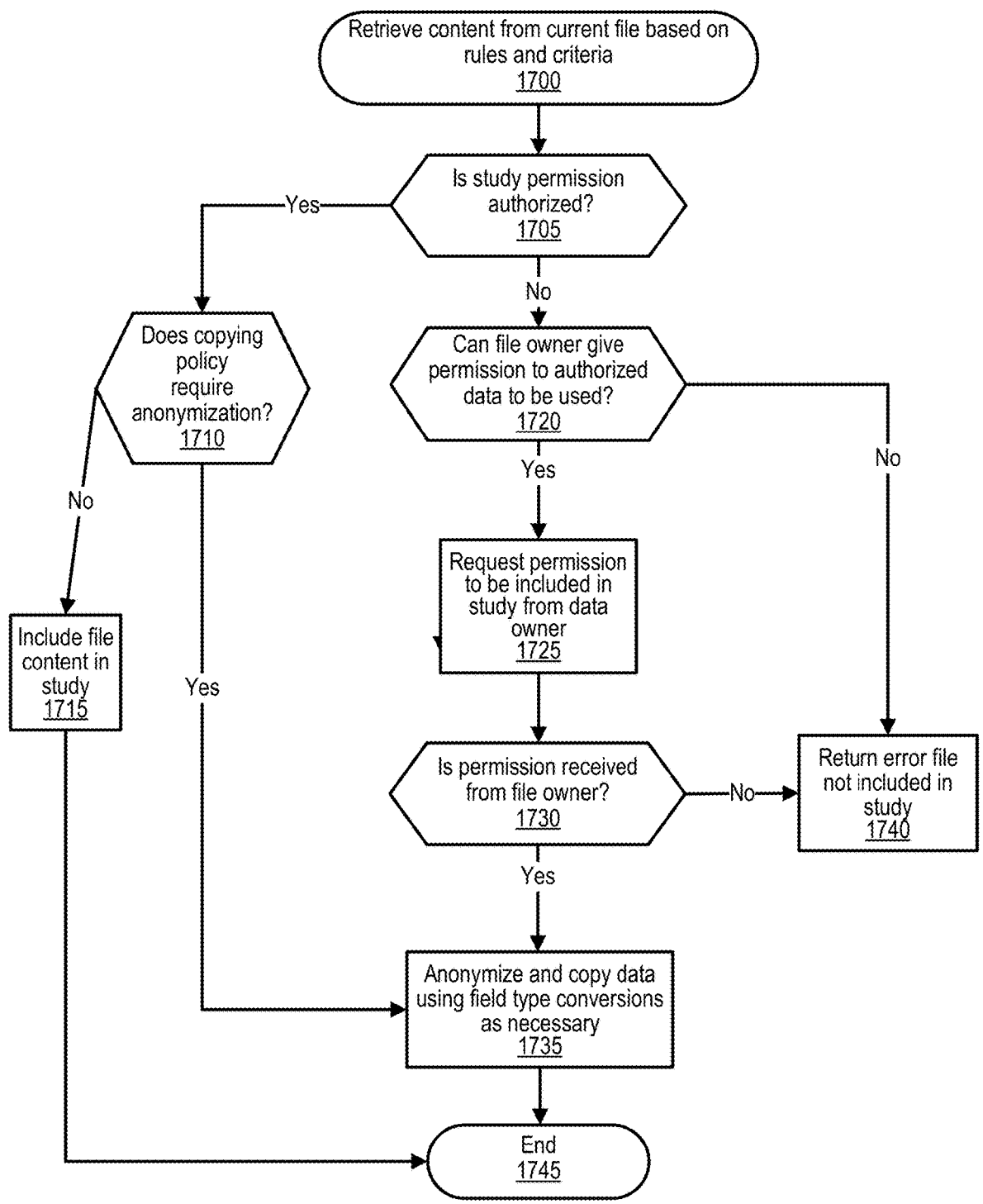
FIG. 17 shows a flowchart depicting steps taken to handle retrieving content from current file based on rules and criteria.

FIG. 17 processing commences at 1700 and shows the steps taken by a process that retrieves content from current file based on rules and criteria. The process determines as to whether is study permission authorized (decision 1705). If is study permission authorized, then decision 1705 branches to the 'yes' branch. On the other hand, if not is study permission authorized, then decision 1705 branches to the 'no' branch. The process determines as to whether does copying policy require anonymization (decision 1710). If does copying policy require anonymization, then decision 1710 branches to the 'yes' branch. On the other hand, if not does copying policy require anonymization, then decision 1710 branches to the 'no' branch. At step 1715, the process includes file content in study. The process determines as to whether can file owner give permission to authorized data to be used (decision 1720). If can file owner give permission to authorized data to be used, then decision 1720 branches to the 'yes' branch. On the other hand, if not can file owner give permission to authorized data to be used, then decision 1720 branches to the 'no' branch. At step 1725, the process requests permission to be included in study from data owner. The process determines as to whether is permission received from file owner (decision 1730). If is permission received from file owner, then decision 1730 branches to the 'yes' branch. On the other hand, if not is permission received from file owner, then decision 1730 branches to the 'no' branch. At step 1735, the process anonymizes and copies data using field type conversions as necessary. FIG. 17 processing thereafter returns error file not included in study to the calling routine (see FIG. 16) at 1740. FIG. 17 processing thereafter ends at 1745.

Various approaches may be used to create, revise, update, and delete (CRUD) metadata structures with metadata entries (MDEs) used to implement the concepts disclosed herein. The implementation would depend on details of the support needed and the base operating system. Although various approaches may be used, conceptually the metadata structures may be considered a link list of structures where individual metadata entries (MDEs) may be added, removed, and updated by allocating and freeing memory areas to hold the structures. In some embodiments, a doubly linked list may be used. In other embodiments entries may be identified by unique ids and be found by using hash tables supporting collisions. The unique ids could be considered a key and may be constructed by various system unique elements, such as, by combining node name or node id with a file name and an i-node id. Since the system requirements may vary considerably some example embodiments are described herein to cover some different ranges of environments. Many of the concepts described herein could be implemented on a single system with a single hard file being subject to a single unrecoverable failure. Other environments could support high availability with, for example, Redundant Array of Independent Disks (RAID) and backup nodes. Recovery could be supported by using write-ahead logging (WAL) protocol. Variations of WAL could be used to ensure consistency for recording auditing information. Content could even be shared between different nodes. Other variations, not described, should be understood to be covered by the claims.

Figure 18:
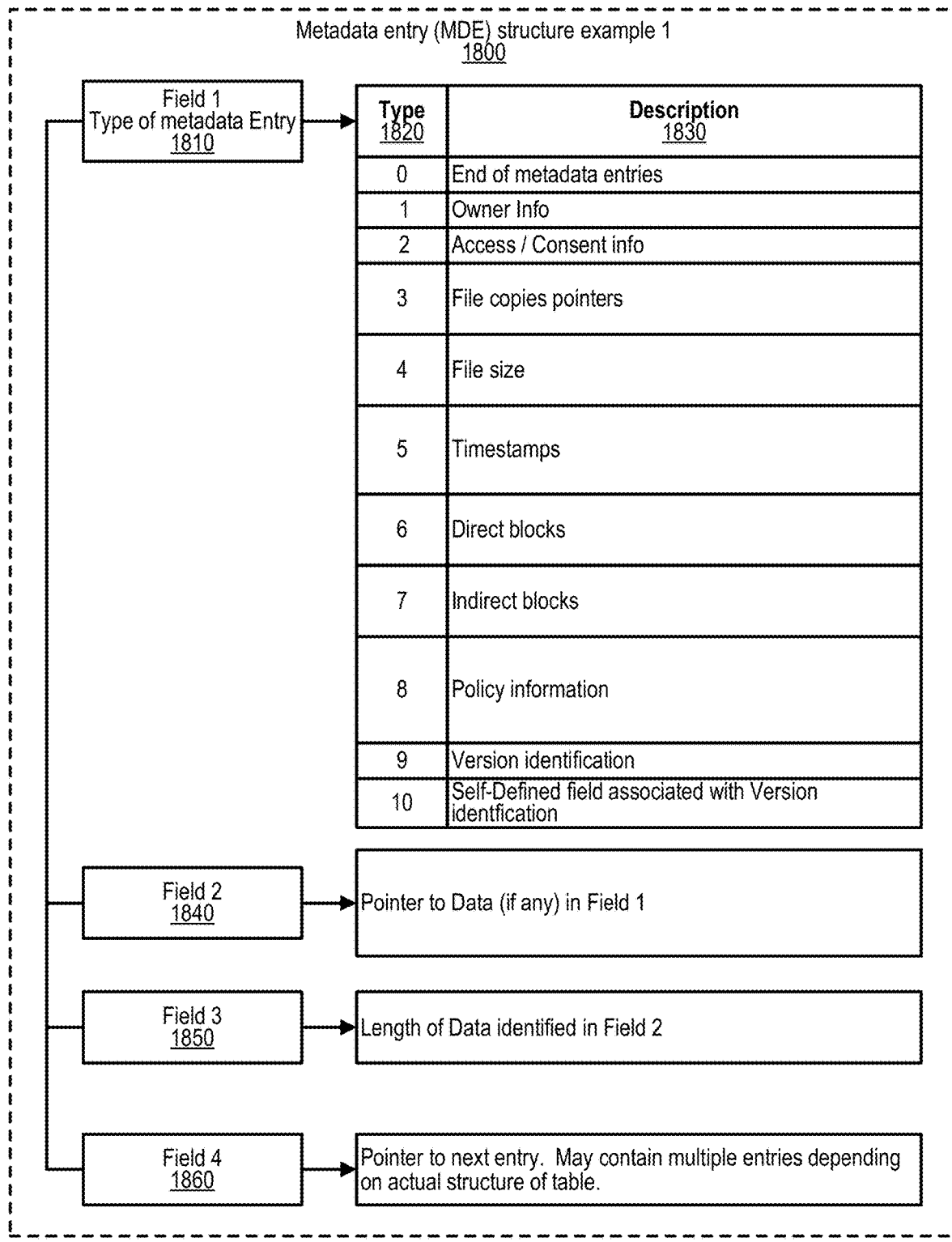
FIG. 18 shows metadata structure example 1.

FIG. 18 depicts a schematic view of an embodiment of a metadata entry (MDE) structure 1800 example 1. The specific type entries are for example only, there are other example definitions with duplicate types. If different example types need to be combined, a separate bit field could be used to distinguish the types or different type numbers chosen. For example 1, Field 1 1810 identifies a Type 1820 of entry. The description 1830 describes the meaning for the Field 1 types: Type=0 indicates the end of metadata entry. Type=1 indicates owner info. Type=2 indicates access/consent info. Type=3 indicates pointers to file copies. Type=4 indicates file size. Type=5 indicates timestamps. Type=6 indicates direct blocks (file content). Type=7 indicates Indirect blocks (pointers to other indirect blocks or to direct blocks). Type=8 indicates policy information. Type=9 indicates version identification. Type=10 indicates a self-defined field associated with the version identification. Field 2 1840 points to the data (if any) in Field 1. Field 3 1850 identifies the length of the data in Field 2. Field 4 1860 points to next entry, which may contain multiple entries depending on the actual metadata structure. Metadata structure 1800 may be considered a link list of structures where entries may be added and removed by allocating and freeing memory areas to hold the structures.

Figure 19:
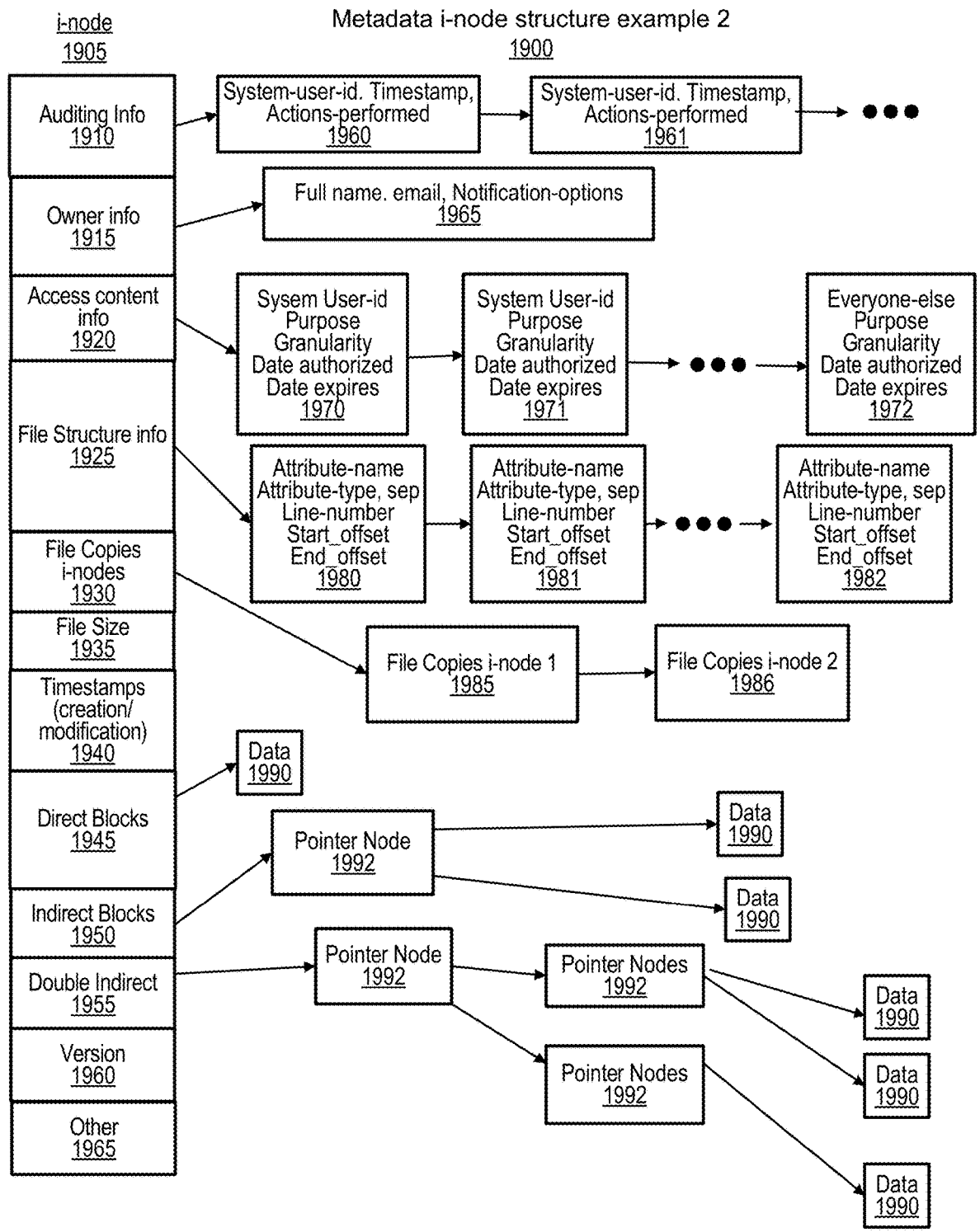
FIG. 19 shows metadata i-node structure example 2.

FIG. 19 depicts a schematic view of an embodiment of a metadata i-node structure 1900 example 2. I-node 1905 depicts various field, many of the fields are logically pointers pointing to a linked list structure like FIG. 18. The auditing info 1910 points to auditing records with the audited data identifying who: system-user-id, when: timestamp, and what was done: action-performed for each set of actions [1960, 1961, . . . ]. The owner info 1915 points to information about the owner, such as, full name, contact information, like email, and notification-options 1965. The access content info 1920 points to information detailing allowable access, such as system user-id, purpose, granularity, data authorized, data expires 1970. Specific authorization, such as, 1971 are chained together with general authorizations, such as 1972. The file structure info 1925 points to specific fields in the file and may include attribute-name, attribute-type, separate locations, such as line-number, start_offset, and end_offset [1980, 1981, . . . 1982]. The file copies i-nodes 1930 points to other i-nodes having copies of the data in the file, such as, file copies i-node 1 1985, file copies i-node 2 1986. The field file size 1935 is the file size. The timestamps (creation/modification) 1940 may identify when the file was created, the last modification, or each modification. The direct blocks field 1945 directly points to file data 1990. The Indirect blocks 1950 points to a pointer node 1992 which may also point to other pointer node 1992 or to data 1990. In an embodiment, a bit field indicates whether the pointers are to data or to other pointer nodes. With that approach, an indirect 1950 and a double indirect 1955 are distinguished by following the pointers. Field 1960 is a version identifier. Field 1965 is for other types of data which may also be tied to a version identifier 1960.

Figure 20:
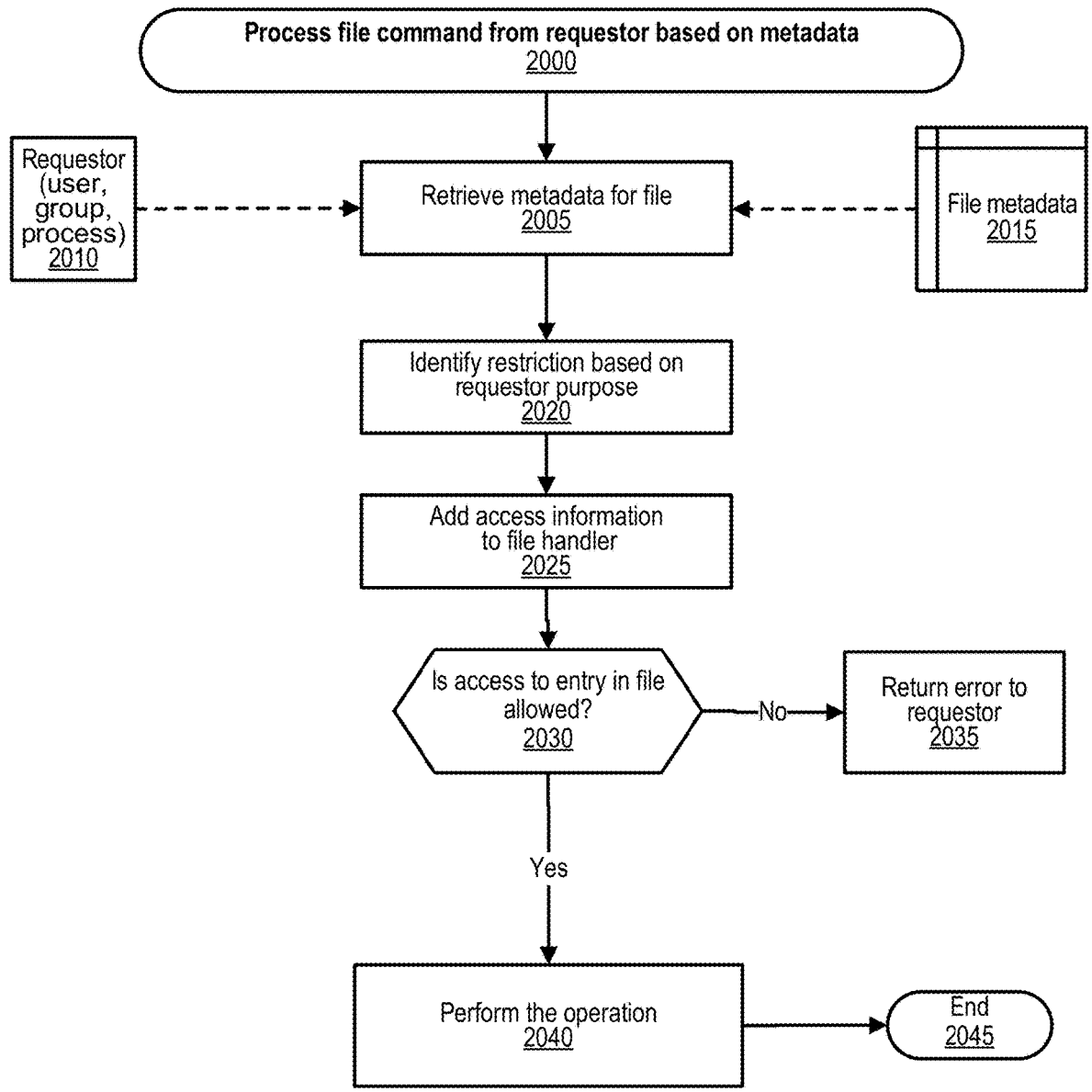
FIG. 20 shows a flowchart depicting steps taken to handle a file command from requestor based on metadata.

FIG. 20 processing commences at 2000 and shows the steps taken by a process that handles a file command from requestor, where the requestor could be a user, a group, or a process 2010 based on metadata. At step 2005, the process retrieves metadata for file from file metadata 2015. The file metadata 2015 include file consent permissions 2080. The consent permissions include: (1) CR which allows for a requestor to read the file as long as the consent conditions are met. (2) CW which allows for a requestor to write the file as long as the consent conditions are met. (3) CX which allows for a requestor to execute the file as long as the consent conditions are met. Any combination of the read, write, and execute permissions may be allowed. The consent conditions may be detailed in the metadata, such as, in 430. At step 2020, the process identifies restriction based on requestor purpose. In some cases, the requestor may be prompted to identify the purpose of the file command. In other cases, the purpose of the file command may be determined from metadata associated with the requestor. At step 2025, the process adds access information to a file handler. The access information may be identified by data pointer fields in the metadata, for example, field 1945. The access might be limited to a specific purpose, user, group, or process. If the requestor does not meet the access limits, then the access would be prohibited. The file handler may create a pinned kernel structure to efficiently evaluate file access requests for the requestor at the time the requestor opens the file. On the other hand, if the requestor does meet the access limits, then the access is allowed. The process determines as to whether is access to entry in file allowed (decision 2030).

If is access to entry in file allowed, then decision 2030 branches to the 'yes' branch. On the other hand, if not is access to entry in file allowed, then decision 2030 branches to the 'no' branch. FIG. 20 processing thereafter returns an error to the requestor at 2035. At step 2040, the process performs the operation. FIG. 20 processing thereafter ends at 2045.

The emerging non-volatile memory (NVM) technologies, such as Phase Change Memory (PCM), Spin-transfer Torque Magnetic Memory (STT-MRAM) and Resistive Random Access Memory (RRAM) greatly improve the reliability, latency, and bandwidth relative to flash memory. These new Non-Volatile Memory (NVM) technologies, referred to as Storage Class Memory (SCM) can potentially improve the performance and reliability of local storage and could eventually replace the flash-based NVM devices. Dynamic Random Access Memory (DRAM) technology on the other hand is facing scaling challenges that will significantly affect the cost and power of a traditional memory sub-system in the future. Advanced DRAM architectures, such as 3D stacks of memory referred to as High Bandwidth Memory (HBM) will continue to increase in density with a lower power than traditional DRAMs. In addition, the use of HBMs in systems continues to grow, which will drive down the cost relative to traditional DRAMs on Dual In-Line Memory Modules (DIMMs). Combining the new NVM technologies with advances in DRAM based memory stacks has a very high probability of significantly changing the traditional DIMM based memory sub-system architecture.

With the ever-increasing demand from applications for addressable memory, there is a desire to make the new NVM technologies (SCM) appear as normal system memory instead of through a file system. In addition, there is a desire to allow memory on remote nodes to also appear as normal system memory to the local node. In traditional approaches, array objects are distributed across threads and are identified by table entries used to map locations such as Universal Parallel C (UPC) array objects. The thread may be characterized as (1) Cyclic—One element per thread in a cyclic manner. (2) Block Cyclic—User defined block size with one block per thread in a cyclic manner. 3) Blocked—Runtime defined block size where each thread contains one continuous block of array, evenly distributed across threads. Once the thread is determined, the thread number is used to determine which node contains the data (since multiple threads can be assigned to a single node). The translation from a virtual address to node may be performed all in software.

FIGS. 1-42 describe various approaches to access user data. FIGS. 22-42 include an approach that allows for access to different SCM via memory mapped files utilizing a Global Virtual Address with common addresses across nodes.

In some embodiments, a system is constructed from Nodes 2190 connected using an Inter-node Network 2180. Logically, the Inter-node Network is an extension of the Intra-Node Network 2103. The networks differ in latency, bandwidth, and other physical characteristics. The latency optimized intra-node network allows for coherent load/store access between units.

Figure 21:
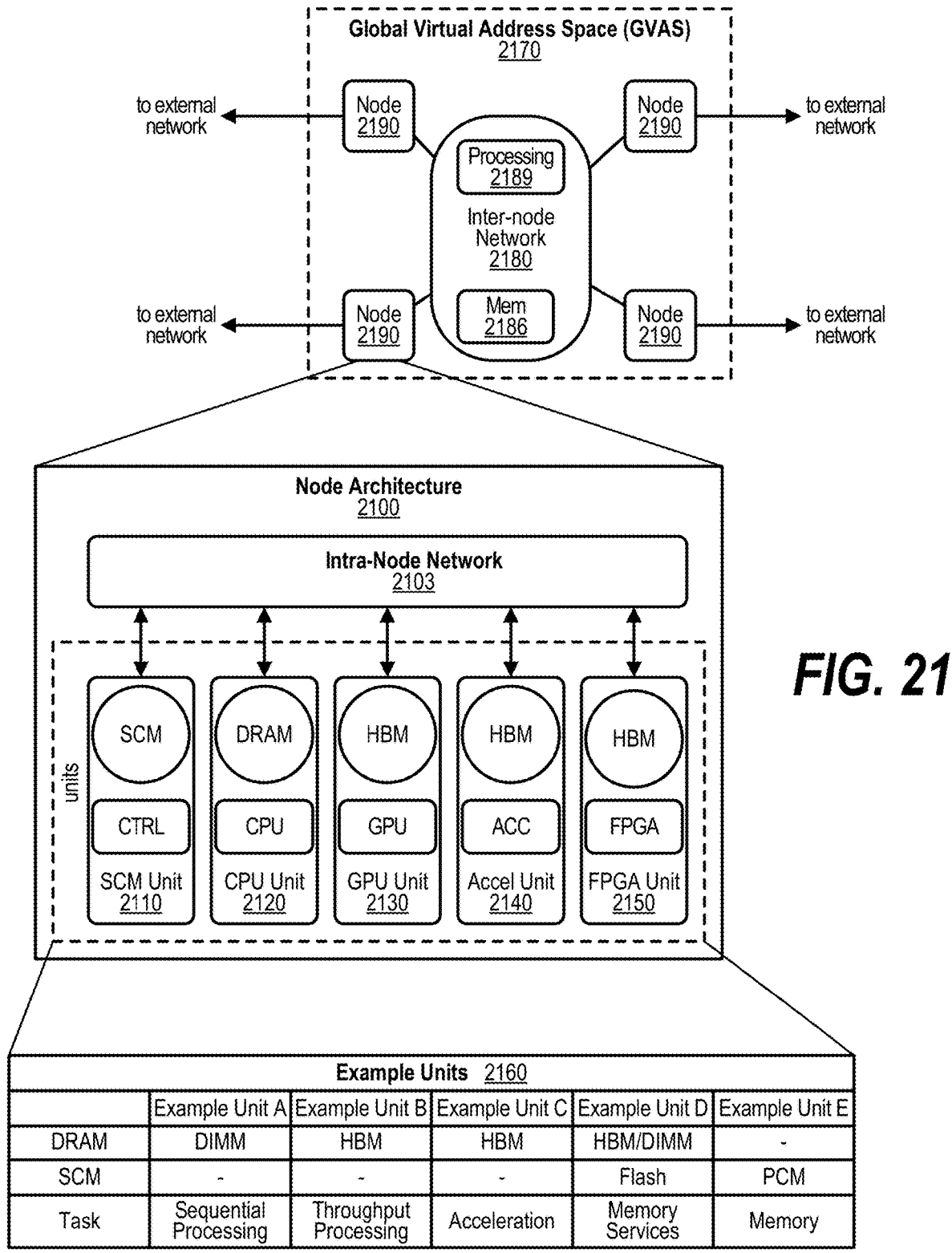
FIG. 21 shows a schematic view of a Node architecture supporting a Global Virtual Address Space (GVAS)

FIG. 21 depicts a schematic diagram illustrative of a Data Centric System (DCS) architecture constructed using a Node Architecture 2100. At the conceptual level, this architecture enables constructing a system from "units" that combine memory pools and processing capability. As shown in FIG. 21, multiple types of units are possible. A node may contain a single unit or multiple units. Examples of units 2160 in a node, may include, but are not limited to a memory service unit (SCM Unit) 2110, a sequential processing unit (DRAM+CPU) 2120, a throughput processing unit (HBM+ Graphic Processing Unit (GPU)) 2130, and acceleration unit 2140 or field-programmable gate array (FPGA) unit 2150. Unlike previous architectures where GPUs and accelerators are dependent on the host processor, units are independent and treated as peers under the DCS architecture. These units may be optimized for specific computational and memory task, such as, encryption, decryption, and other tasks tailored for supporting a built-in privacy filesystem. The architecture depicts a collection of units where intra-node network 2103 provides an efficient coherent interconnect between the units within a single node and Inter-node network 2180 interconnecting the nodes 2190 within the system. Like a unit, the inter-node network 2180 may also contain memory (Mem) 2186 and associated processing 2189. The External networks identifies access beyond the system.

The Data Centric System (DCS) architecture may include an Extended Memory (EM) architecture for accessing memory beyond a node 2190. The Extended Memory (EM) architecture may include a method for accessing memory, a Global Virtual Address Space (GVAS) 2170 distributed over the full system. Nodes within the DCS architecture have three major characteristics: (1) Capable of being managed by a single operating system. (2) Efficient coherent load/store access to all memory pools within the node. (3) Global Virtual Address Space for referencing memory pools inside and outside the node.

In prior systems, each node typically has a fixed topology and limited number of configurations. For example, a node may have two (2) general-purpose processors, 256 GB of DRAM, zero (0) to six (6) Graphical Processing Units (GPUs), and one (1) or two (2) network devices. When constructing large systems, this fixed topology may cause an imbalance in resources. For example, if the targeted application requires a GPU to CPU ratio of 12 to 1, the system would end up with 50% of the general-purpose processors not being used. If the ratio was equal to or lower than 6 to 1, a heterogeneous combination of nodes (some with fewer than 6 GPUs) could meet the ratio, but the node would be over designed and GPU resources are not used. For optimal flexibility in large system design, there needs to be a set of units individually connected to a network and the means for dynamically configuring these units into a node. Therefore, there is a need to dynamically create a logical grouping of units to perform the functions of the targeted application.

The DCS architecture views the system as a collection of memory pools with attached processing rather than a collection of computational engines and associated memory. The subtle reordering places focus on memory allowing programmers to define the data organization, layout, and distribution across the various memory pools in the system. The approaches described herein simplifies managing the multiple memory pools and the extended memory architecture provides a consistent view of memory across all units in the system or a subset of units in the system. From a conceptual point-of-view, the plurality of Nodes 2190, may be viewed as a single flat network connecting all units together as peers with equal access to all memory pools and compute resources in a consistent manner. The independent nature of the units enables constructing a system with the proper balance of Sequential Processing units and Throughput Processing units at the system level to meet the needs of a variety of applications and workflows. The approach is to present each memory pool and associated computational capability as independent units to software. With this architecture, support may be provided for dynamically creating a logical grouping of units from one or more Nodes 2190 to perform tasks tailored for supporting a Built-in Legal Framework File System (LFFS), wherein at least one of these units can run an operating system. The units may be, for example, a combination of processors, programmable logic, controllers, or memory. Example Units 2160 contains a list of example units and does not imply any specific limitations on the types of units within a system with many other types possible, the units and devices are, but not limited to, general-purpose processors, special purpose processors, programmable logic devices, controllers, memory, and the like. To dynamically configure a logical group, these units need to appear to software, especially the operating system and device drivers, as if these are all part of a physically connected system within the shared memory space. To support the connected view, a system manager or management software may assign each unit within a Node 2190 to an application and its corresponding Global Virtual Address Space. The system manager may schedule jobs that run over the full set of nodes in the system, start jobs (applications or workflows), and assign the resources at job launch when the required resources are available.

This is how the cores and GPUs of a traditional node are assigned by the OS, but at a system wide level. The extended memory architecture extends the shared memory space (a Global Virtual Address Space) to other nodes 2190 and provides an efficient means for storing data, communications, and coordination within applications and workflows. Units are the fundamental building blocks for a system. In an embodiment, these units may run a specialized kernel for supporting a Built-in Legal Framework File System (LFFS) in addition to an operating system. This structure allows for combining both traditional and specialized units in various ratios to create a system tailored to the needs of the LFFS, a specific application or workflow. The intra-node network connects units within a node while an inter-node network connects a plurality of nodes. The intra-node network may be optimized for coherently connecting units which are physically close. The inter-node network may be a network such as, but not limited to, Ethernet or InfiniBand with optimizations for enabling a Global Virtual Address Space across the connected Nodes. As depicted in FIG. 21, the node architecture may include external network connections providing access outside of the system. These external network connections are networks, such as, but not limited to, Ethernet or InfiniBand attached to each node. One or more units within each node acts as a bridge from the intra-node network to the industry standard networks.

From a physical point of view, the term memory traditionally refers to the DRAM associated with a system. Thus, an operating system in such a system associates real addresses with DRAM locations. A virtual address translation mechanism converts virtual addresses in a user application to these real addresses. During application execution, the operating system may relocate the physical contents pointed to by a virtual address to some other medium like non-volatile memory or disk. In this case, the application's operation stalls when accessing the associated virtual address until the physical contents are moved back into DRAM and address translation is re-established by the operating system. The extended memory architecture extends this concept of memory in two directions. First, the term memory refers both to DRAM and to SCM associated with the node and to DRAM and SCM on remote nodes. This provides the operating system with a larger range of physical memory to which a virtual address can be associated. The extended memory architecture defines the memory models and provides example access methods for extending memory beyond a single unit within the system. Using the base facilities provided by the extended memory architecture, many different memory abstractions are possible through software libraries.

In an example embodiment, two example access methods are provided by the extended memory architecture: (1) Direct load/store access to memory located within a node. (2) An asynchronous copy method. The load/store method provides direct access to memory distributed across the nodes (extended memory). In this case, data moves directly between a memory location and the registers of processor or device. Since most processors and devices are sensitive to access latencies, in an exemplary embodiment, this method would be limited to storage with acceptable latencies or cached to mitigate the latency effects. The asynchronous copy method provides a set of get and put commands for efficiently copying memory blocks between units and nodes. These commands use the same addressing mechanism as loads and stores but move larger blocks of data and can scatter or gather multiple blocks during the copy operation. In addition, with specialized support, a direct load/store may access memory located in a different node. This may be especially useful when user data is spread across multiple volumes being accessed from different nodes or when data is locally attached, but resides in a more distant storage.

In an example embodiment, each unit contains a pool of memory. Each unit divides its memory into one or more regions each having one of two designations: (1) Globally accessible. (2) Local. An embodiment of the extended memory architecture may aggregate memory regions designated as globally accessible into a Global Virtual Address Space. Memory regions designated as local are only accessible by components within the unit and are not visible to other units within the system using a Global Virtual Address. In an embodiment, each node contains an extended memory network controller that provides the network interface for accessing the Global Virtual Address Space. For the direct load/store and asynchronous copy methods, the extended memory network controller uses a virtual address to locate the remote data and perform the data movement.

Figure 22:
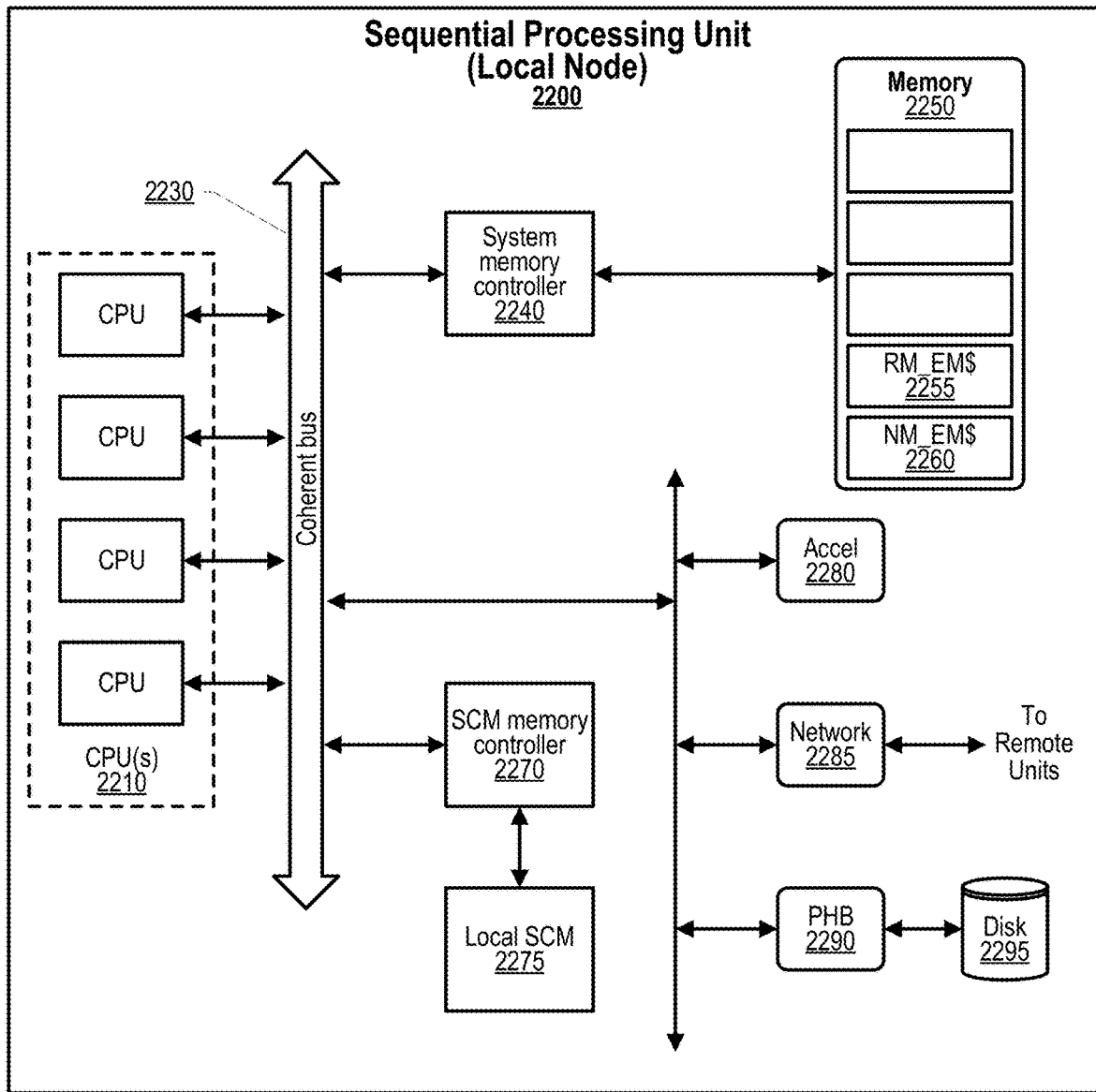
FIG. 22 shows a schematic view of a Sequential Processing Unit (Local Node)

FIG. 22 depicts an example embodiment of a sequential processing unit (SPU) a local node 2200. In an embodiment, the node may supporting caching remote memories within a local system's storage. The local system has one or more central processing units (CPUs) 2210 accessing memory 2250 via a coherent bus 2230. A PCI-Host Bridge (PHB) 2290 connects to a disk 2295 which may be used for supporting a Built-in Legal Framework File System (LFFS), paging or for other purposes, such as, loading programs. A local node need not cache remote memories within its local system storage in order to support the LFFS. By way of example, and not limitation, other architectures may be used to perform I/O, such as, the Industry Standard Architecture (ISA) bus, the Micro Channel Architecture (MCA) bus, and the Peripheral Component Interface (PCI). System memory controller 2240 enables regions of local memory 2250 to be used as a cache. The local memory may be, for example, DRAM, HBM, or the like, and function as both system memory and a cache for remote memory or locally attached SCM 2275 (more distant than the local memory 2250). A large physical address window (equal to or larger than the memory regions allocated for the cache) may be used for mapping remote and local SCM. Smaller blocks of the physical address space are then mapped, using a cache directory, to a smaller physical memory area allocated to the extended memory caches (RM_EM$ 2255 or NM_EM$ 2260). In an embodiment, the system memory controller 2240 may support multiple independent cache regions dedicated to caching a memory. For example, the "near-memory" cache (NM_EM$) 2260 serves for data stored in the locally attached SCM 2275 and the "Remote-memory" cache (RM_EM$) 2255 is used for data located in remote memories attached to a remote node. In addition, there can be a plurality of each type of cache. When a referenced datum is not available in the NM_EM$ 2255, the reference is forwarded directly to the associated "near-memory" SCM Memory Controller 2270, which may complete the access without any CPU involvement. When a referenced datum is not available in the RM_EM$ 2255, the memory controller sends an Extended Memory (EM) Cache Miss exception to one of the CPU(s) 2210. A selected CPU may utilize an interrupt vector for handling the EM Cache Miss exception. In an embodiment, a firmware interrupt handler forwards the virtual address causing the exception to an architected network interface to bring a replica of the remote memory into the RM_EM$ 2255. When data is returned from the Network 2285 and written into the RM_EM$ 2255, the exception handler is notified, and the CPU load operation is re-issued and is serviced from the RM_EM$ 2255. The exception is used to: 1) Prevent stalling the CPU load for the entire duration of the network operation. 2) Determine the virtual address associated with the miss. The network controller may be configured to allow the firmware exception handler to fetch remote memory without needing a full-fledged device driver. In an embodiment, an architected, low latency interface for performing remote direct memory accesses (RDMA) is configured to route the RDMA request to the correct unit or node based on a virtual address.

Referring to FIG. 22, a schematic diagram of a sequential processing unit 2200 representing an example Node is shown wherein the methods disclosed herein may be implemented. The Node is only one example of a suitable system node and is not intended to suggest any limitation as to the scope of use or functionality of embodiments of the invention described herein. The Node could be constructed from a single CPU, a single coherent bus, a single system memory controlling accessing a single memory unit, that is, a Node consisting of a single Unit. Examples of well-known computing systems, environments, and/or configurations that may be suitable for use with the Node include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. The CPUs 2210 may be described in the general context of computer system-executable instructions, such as program modules, being executed by a computer system. Generally, program modules may include routines, programs, objects, components, abstract data types, data structures, and so on that perform tasks or logic. The CPUs 2210 may be practiced in distributed cloud computing environments where tasks are performed by remote processing devices that are linked through a communications network 2285. In a distributed cloud computing environment, program modules may be in both local and remote computer system storage media including memory storage devices.

The Node may also contain other devices such as, but not limited to, accelerators 2280, networks 2285, and SCM memory controller 2270 connected to the CPUs 2210. By way of example, and not limitation, these devices can be directly connected to the coherent bus 2230 or through interface architectures such as Open Coherent Accelerator Process Interconnect (OpenCAPI), or Peripheral Component Interconnects Express (PCIe) bus.

The coherent bus 2230 represents one or more of any of several types of bus structures, including a memory bus or memory controller, a peripheral bus, an accelerated graphics port, and a processor or local bus using any of a variety of bus architectures.

The Node typically includes a variety of computer system readable media, such as, disk 2295. Such media may be any available media that is accessible by the Node, and it includes both volatile and non-volatile media, removable and non-removable media. The memory 2250 may be any system memory that can include computer system readable media in the form of volatile memory, such as, DRAM and/or a cache memory. The Node may further include other removable/non-removable, volatile/non-volatile computer system storage media. By way of example only, a storage system can be provided for reading from and writing to a non-removable, non-volatile magnetic media (not shown and typically called a "hard drive"). Although not shown, a magnetic disk drive for reading from and writing to a removable, non-volatile magnetic disk (e.g. a "floppy disk"), and an optical disk drive for reading from or writing to a removable, non-volatile optical disk such as a CD-ROM, DVD-ROM or other optical media can be provided. In such instances, each can be connected to the bus by one or more data media interfaces. As will be further depicted and described below, the local SCM may include at least one program product having a set (e.g. at least one) of program modules that are configured to carry out the functions of embodiments of the methods disclosed herein. A program/utility, having the set (at least one) of program modules, may be stored in the SCM by way of example, and not limitation, as well as an operating system, one or more application programs, other program modules, and program data.

Each of the operating systems may have one or more application programs, other program modules, and program data or some combination thereof, and may include an implementation of a networking environment. The program modules generally carry out the functions and/or methodologies of embodiments of the methods as described herein. The Node may also communicate with a set of one or more external devices such as a keyboard, a pointing device, a display, a tablet, a digital pen, etc. wherein these one or more devices enable a user to interact with the Node and/or any devices (e.g. network card, modem, etc.) that enable the Node to communicate with one or more other computing devices. Such communication can occur via Input/Output (I/O) interfaces. These include wireless devices and other devices that may be connected to the Node, such as, a USB port, which may be used by a tablet device (not shown). Still yet, the Node can communicate with one or more networks such as a local area network (LAN), a general wide area network (WAN), and/or a public network (e.g. the Internet) via a network adapter. As depicted, a network 2285 communicates with the other components of the Node via the coherent bus 2230.

Figure 23:
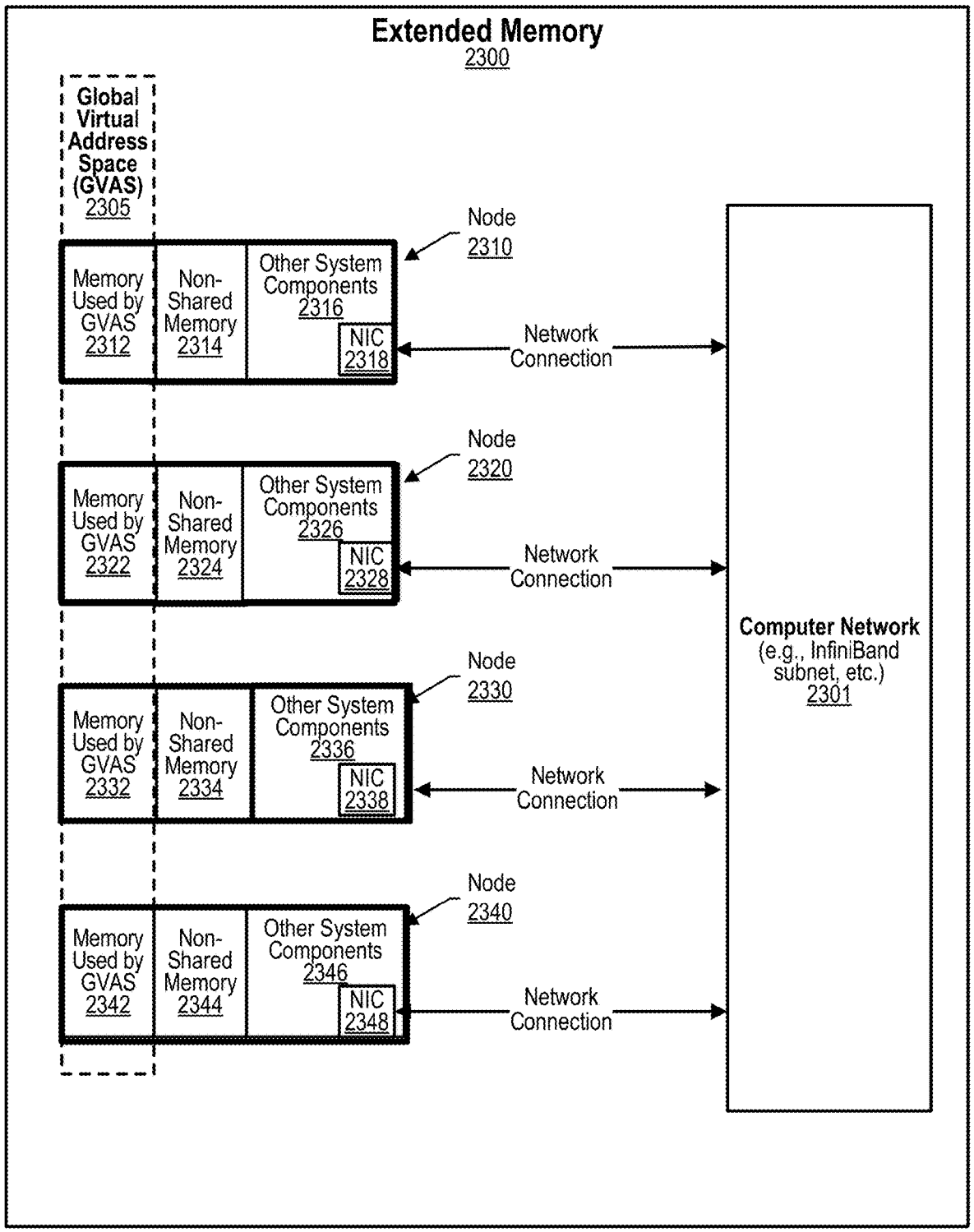
FIG. 23 shows a schematic view of extended memory.

FIG. 23 depicts schematic view of Extended Memory 2300 shown in a computer system with multiple nodes. Each node may be running several application processes under its own operating system. A virtual address translation mechanism converts virtual addresses in a user application to these real addresses. During application execution, the operating system may relocate the physical contents pointed to by a virtual address to some other medium like non-volatile memory or disk. In this case, the application's operation stalls until the physical contents are moved back into DRAM and address translation is re-established by the operating system. The Global Virtual Address Space (GVAS) 2305 targets the need for increased memory as seen by a single node by providing the programmer and runtime environments with shared memory that spans across all or a subset of the nodes in the system, thus allowing for dereferencing of pointers by any process in the system. The Global Virtual Address Space (GVAS) may remain even after a process terminates allowing data to remain in memory and other processes to reference the memory in the future. The Global Virtual Address Space (GVAS) model provides applications with a common virtual address space for all threads and processes running in a system. This model provides byte addressability of any shared virtual address mapped into the processes' virtual address. Each process uses the same virtual address mapping which allows for pointer de-reference to work independent of where the physical memory resides or where the thread is running. Each Node [2310, 2320, 2330, 2340] may dedicate a portion of its virtual address space to be used only locally, identified as Non-Shared Memory [2314, 2324, 2334, 2344]. Another portion of the virtual address space may be dedicated for addressing memory in the Global Virtual Address Space (GVAS) [2312, 2322, 2332, 2342] which may also be referenced as "shared virtual memory." The GVAS memory may contain content homed on a remote node retrieved via a network interface controller (NIC) [2318, 2328, 2338, 2348] utilizing a network connection to a computer Network (e.g. Infiniband, subnet, etc.) 2301. Other system components [2316, 2326, 2336, 2346] may directly access the memory in the GVAS [2312, 2322, 2332, 2342]. The memory referenced by a global virtual address may be a replica of slower memory or memory on a remote node that is stored in the memory local to the node reducing the access latency. This replica is stored one of the extended memory caches (RM_EM$ 2255 or NM_EM$ 2260) in the local memory. Each of the Nodes in FIG. 23 may have a similar infrastructure or vary.

Figure 24:
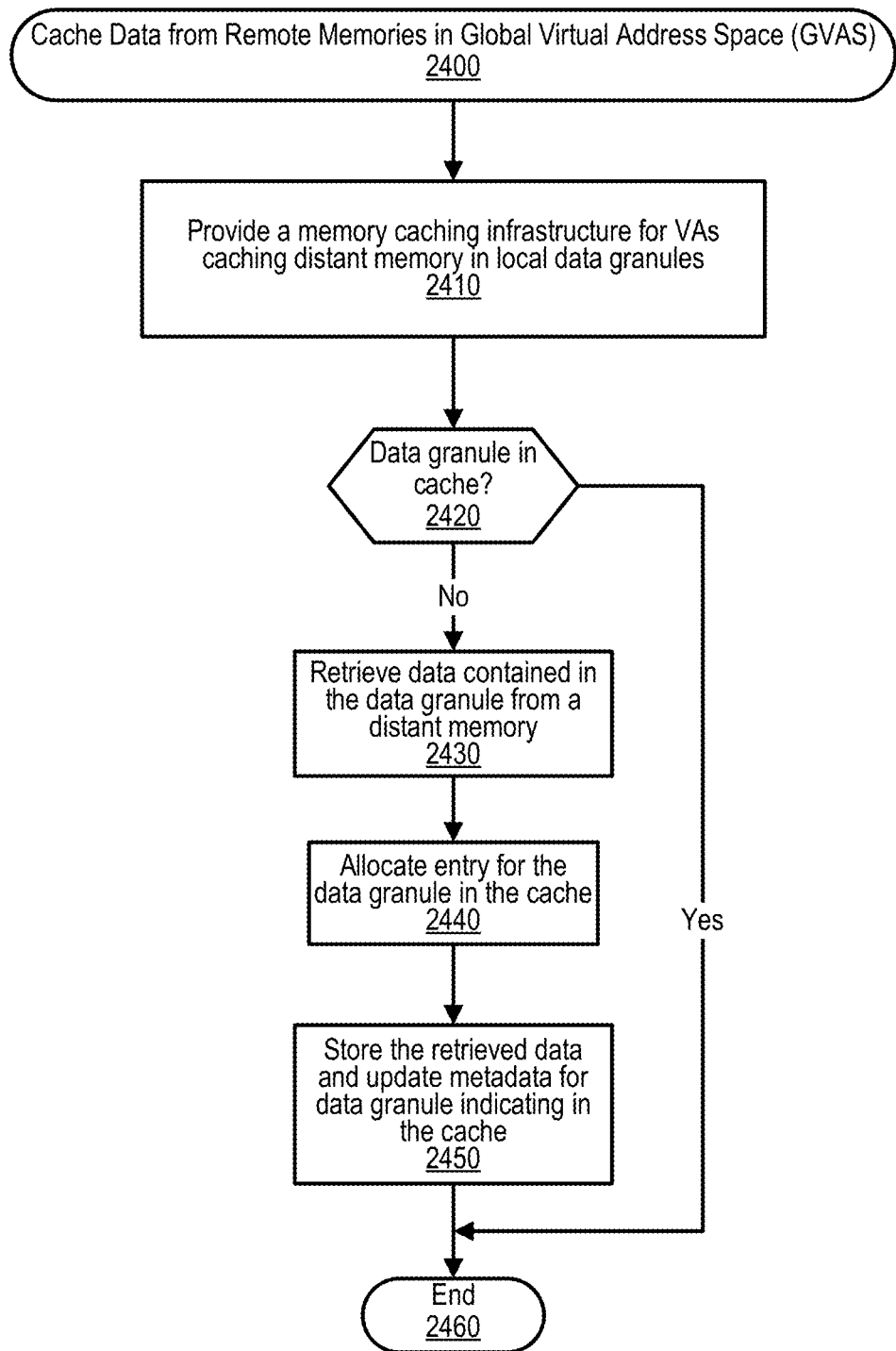
FIG. 24 shows a flowchart depicting steps taken to handle caching data from remote memories in a Global Virtual Address Space.

FIG. 24 processing commences at 2400 and shows the steps taken by a process that caches data from remote memories in Global Virtual Address Space (GVAS). At step 2410, the process provides a memory caching infrastructure for virtual addresses (VAs) caching distant memory in local data granules. In an embodiment, a data granule is a size of processor atomic read, typically a word or a cache line. The process determines as to whether the data granule is in the cache (decision 2420). If the data granule is in the cache, then decision 2420 branches to the 'yes' branch and continues with step 2430. On the other hand, if the data granule is not in the cache, then decision 2420 branches to the 'no' branch. At step 2430, the process retrieves data contained in the data granule from a distant memory. At step 2440, the process allocates entry for the data granule in the cache. At step 2450, the process stores the retrieved data and updates metadata for data granule indicating in the cache. FIG. 24 processing thereafter ends at 2460.

Figure 25:
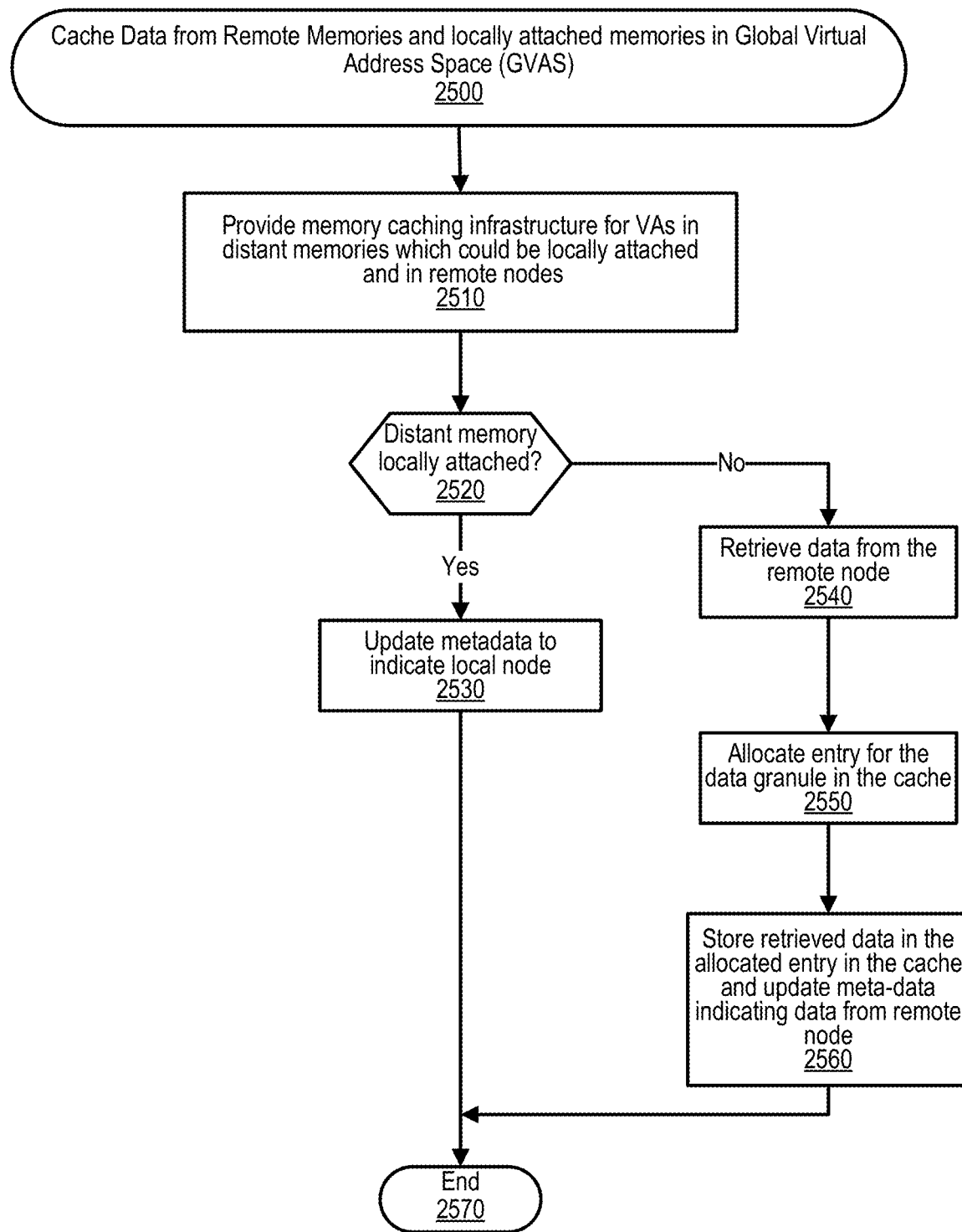
FIG. 25 shows a flowchart depicting steps taken to handle caching data from remote and locally attached memories in a Global Virtual Address Space.

FIG. 25 processing commences at 2500 and shows the steps taken by a process that caches data from remote memories in Global Virtual Address Space (GVAS). At step 2510, the process provides a memory caching infrastructure for VAs in distant memories which could be locally attached or in remote nodes. The process determines as to whether distant memory is locally attached (decision 2520). If distant memory is locally attached, then decision 2520 branches to the 'yes' branch and continues with step 2530. On the other hand, if distant memory is not locally attached, then decision 2520 branches to the 'no' branch. At step 2540, the process retrieves data from the remote node. At step 2550, the process allocates entry for the data granule in the cache. At step 2560, the process stores retrieved data in the allocated entry in the cache and updates the metadata indicating remote node and continues with step 2570. At step 2530, the process updates metadata to indicate local node. FIG. 25 processing thereafter ends at 2570.

Figure 26:
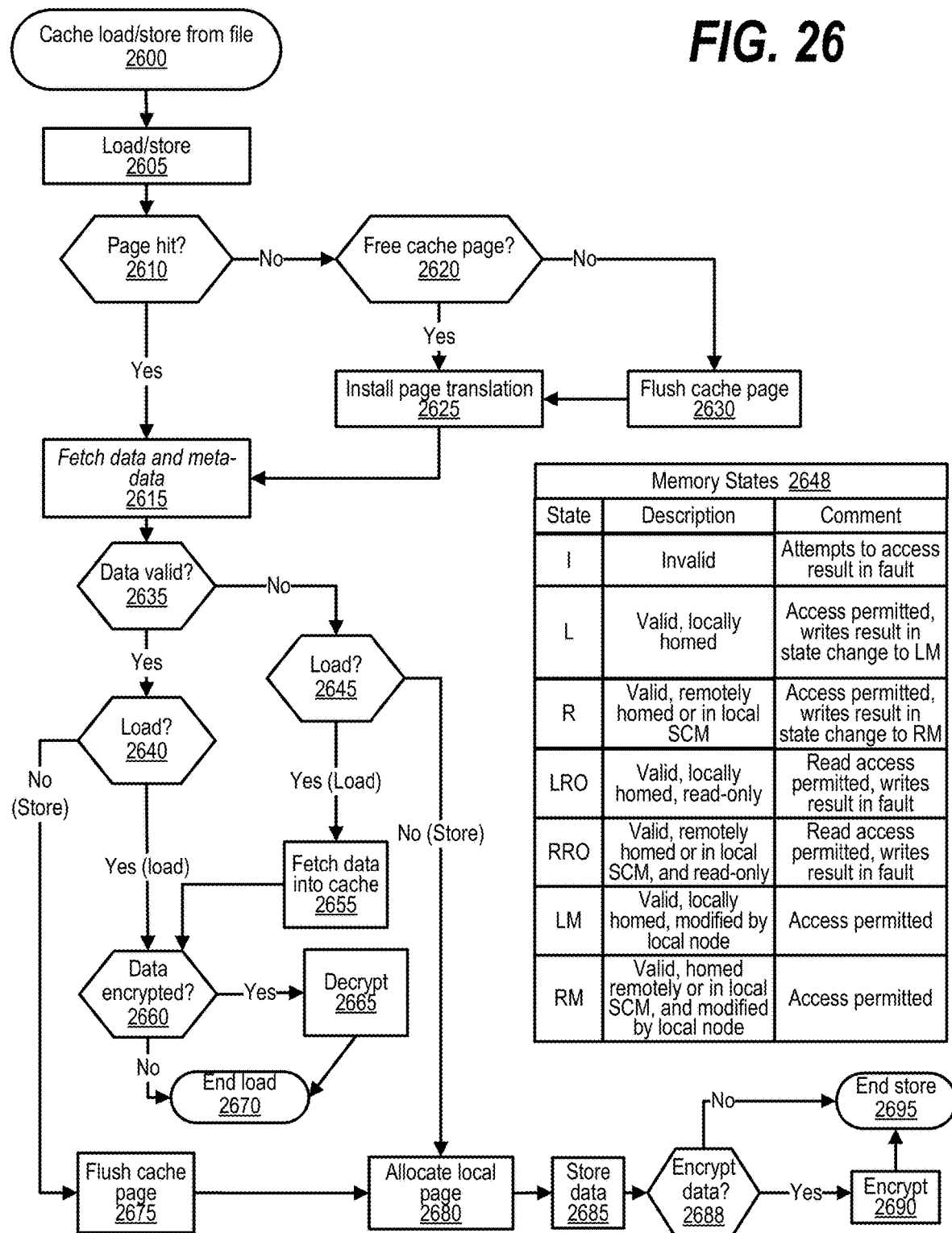
FIG. 26 shows a flowchart depicting steps taken to cache load/store from file.

FIG. 26 processing commences at 2600 and shows the steps taken by a process that caches load/store from file. At step 2605, the process receives a load or a store. The process determines as to whether page hit (decision 2610). If page hit, then decision 2610 branches to the 'yes' branch. On the other hand, if not page hit, then decision 2610 branches to the 'no' branch. The process determines as to whether free cache page (decision 2620). If free cache page, then decision 2620 branches to the 'yes' branch. On the other hand, if not free cache page, then decision 2620 branches to the 'no' branch. At step 2615, the process fetches data and meta-data. At step 2625, the process installs page translation. At step 2630, the process flushes cache page. The process determines as to whether data valid (decision 2635). If data valid, then decision 2635 branches to the 'yes' branch. On the other hand, if not data valid, then decision 2635 branches to the 'no' branch. The process determines as to whether load (decision 2640). If load, then decision 2640 branches to the 'yes' branch. On the other hand, if not load, then decision 2640 branches to the 'no' branch. The process determines as to whether load (decision 2645). If load, then decision 2645 branches to the 'yes (load)' branch. On the other hand, if not load, then decision 2645 branches to the 'no (store)' branch. At step 2655, the process fetches data into cache. The process determines as to whether data encrypted (decision 2660). If data encrypted, then decision 2660 branches to the 'yes' branch. On the other hand, if not data encrypted, then decision 2660 branches to the 'no' branch. At step 2665, the process decrypts. In some embodiments, an indication of the encryption state may be included in the memory states 2648. Data may be left encrypted while being obtained from a different node so that the data is kept encrypted while being transferred. Similarly, different types of anonymization may be performed, and the type of anonymization may be included in the memory states 2648. FIG. 26 processing thereafter ends by returning the load data at 2670. At step 2675, the process flushes cache page. At step 2680, the process allocates local page. At step 2685, the process stores data. The process determines as to whether encrypt data (decision 2688). If encrypt data, then decision 2688 branches to the 'yes' branch. On the other hand, if not encrypt data, then decision 2688 branches to the 'no' branch. At step 2690, the process encrypts. FIG. 26 processing thereafter ends at 2695 by retuning the stored data.

Figure 27:
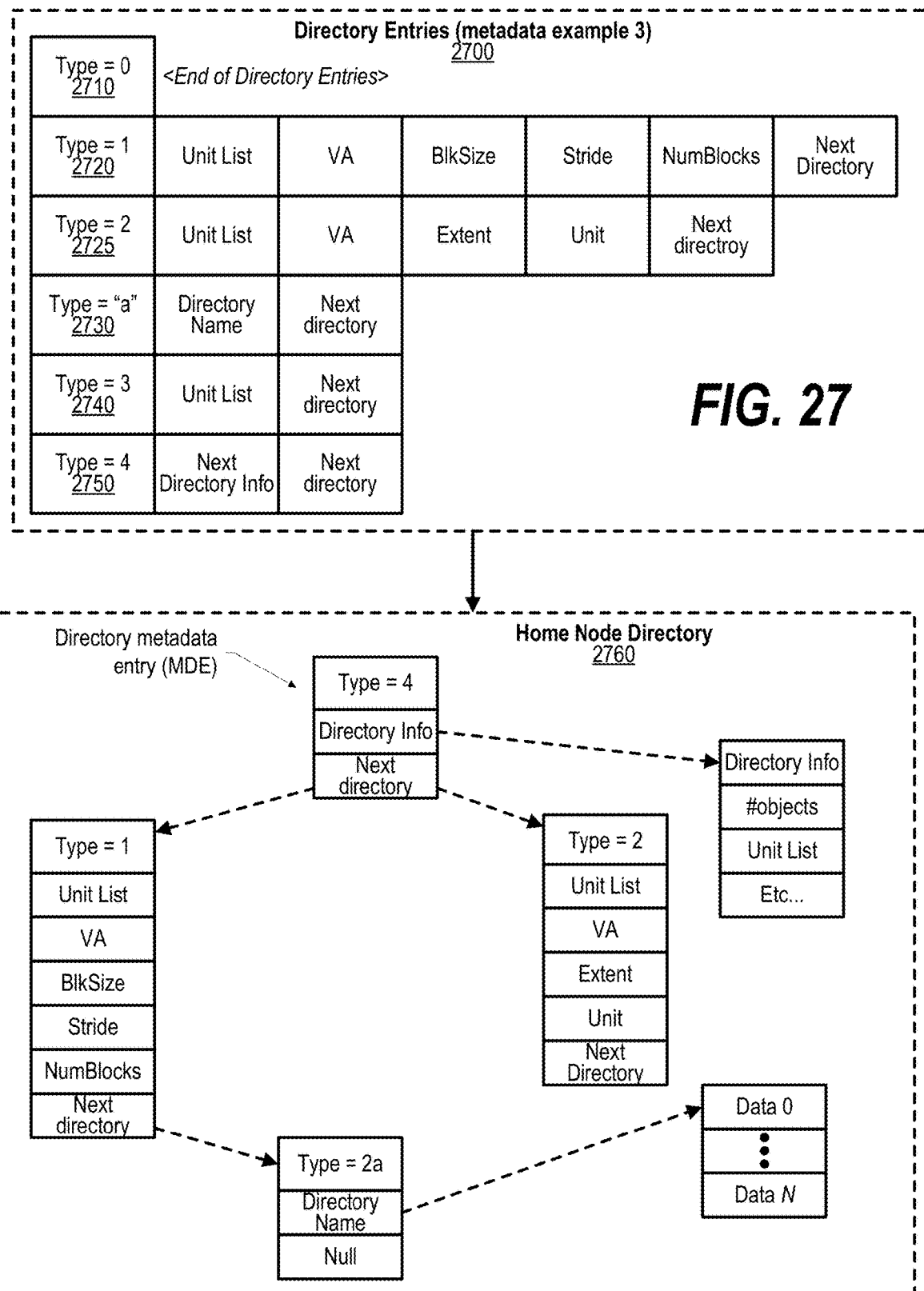
FIG. 27 shows a diagram of using metadata entries (MDEs) for a home node directory example 3.

FIG. 27 depicts a third example of a metadata format where a metadata entry (MDE) is used as a directory for persistent virtual address space with a schematic view of directory entries 2700 being used as record entries for a home node directory 2760. Again, the actual type numbers could be different to allow a combination of metadata formats. Each directory entry (one for each virtual memory area or range of virtual addresses) has a type field that identifies the type of directory entry. In an embodiment, Type=0 2710 indicates the end of directory entries. Type=1 2720 indicates a fixed stride of blocks across participating units. Type 1 includes fields such as a preferred virtual address (VA)/striding of data across participating units. Type=2 2725 indicates a defined location for each VA granule. Type=1 a 2730 indicates the metadata entry data is not in physical memory of any process space. Type=2 2725 identifies units and preferred VA locations for data across the participating units. Type=3 2740 identifies participating units. Type=4 2750 identifies a head of Global Address Space Directory (GASD). Depending on the type different field are included. Fields may include entries, such as, but not limited to a pointer to list of participating units (Types 1, 2, and 3), a plurality of metadata entry names containing global virtual address information or archive information. More details of the individual filed are described in FIG. 28.

Figure 28:
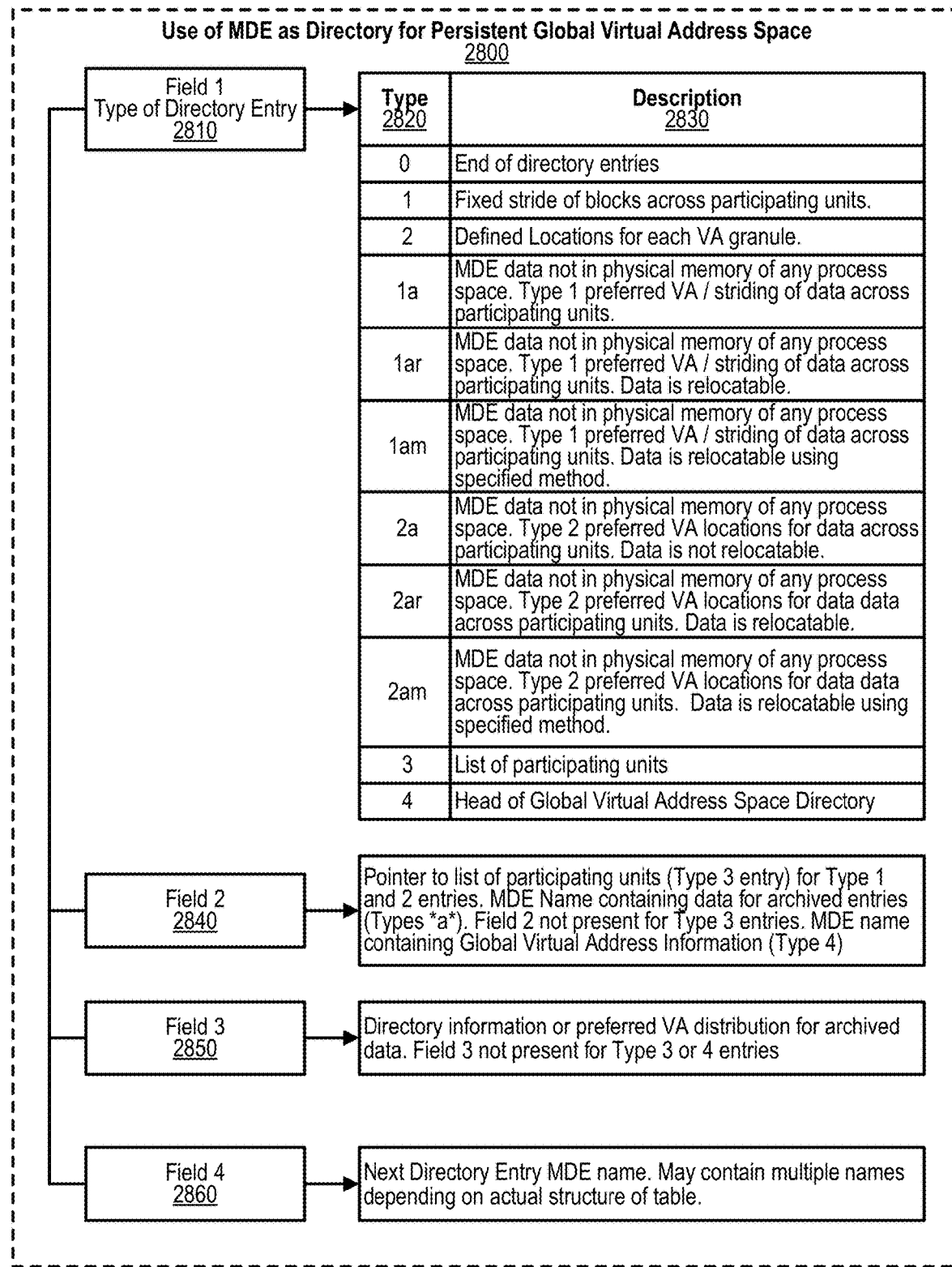
FIG. 28 shows a diagram of using metadata entries (MDEs) as a directory for persistent global virtual address space.

FIG. 28 depicts more details of the third example of metadata format in an embodiment using metadata entry (MDE) as directory for persistent virtual address space 2800. Field 1 depicts the type of directory entry wherein the Type 2820 includes the individual type entries in FIG. 27 and some additional entries as follows: Type=1ar indicates metadata entry data not in physical memory of any process space. Type=1am indicates metadata entry data not in physical memory of any process space. Type=2a indicates metadata entry data not in physical memory of any process space. Type=2ar indicates metadata entry data not in physical memory of any process space. Type=2am indicates metadata entry data not in physical memory of any process space. The metadata entry refers to data for archived entries (Types *a*). Field 2 2840 points to list of participating units for type 1, 2, and 3. Field 2 is not present for Type 3 entries. Metadata entry containing Global Virtual Address information (Type 4). Field 3 2850 contains directory information or a preferred VA distribution for archived data. Field 3 is not present for Type 3 or 4 entries. Field 4 2860 contain next directory entry metadata and may contain multiple entries depending on the actual structure of Directory.

FIG. 29 depicts a fourth example of possible entries in the multi-level directory for describing where Global Virtual Address are physically located at a home node 2900 that might be used with a page table implementation. The first field of the table is the type 2920 which identifies the type of entry which is documented under description 2940. Auxiliary information 2960 provides more information about the GVA range associated with the entry. Notes 2980 also provides additional description material related to the auxiliary information. Information like the auxiliary information 2960 and corresponding notes 2980 for types 0x2 thru 0x9. Support may be provided for named data objects utilizing the hash table/key store. (See FIG. 37 and corresponding text.)

Figure 30:
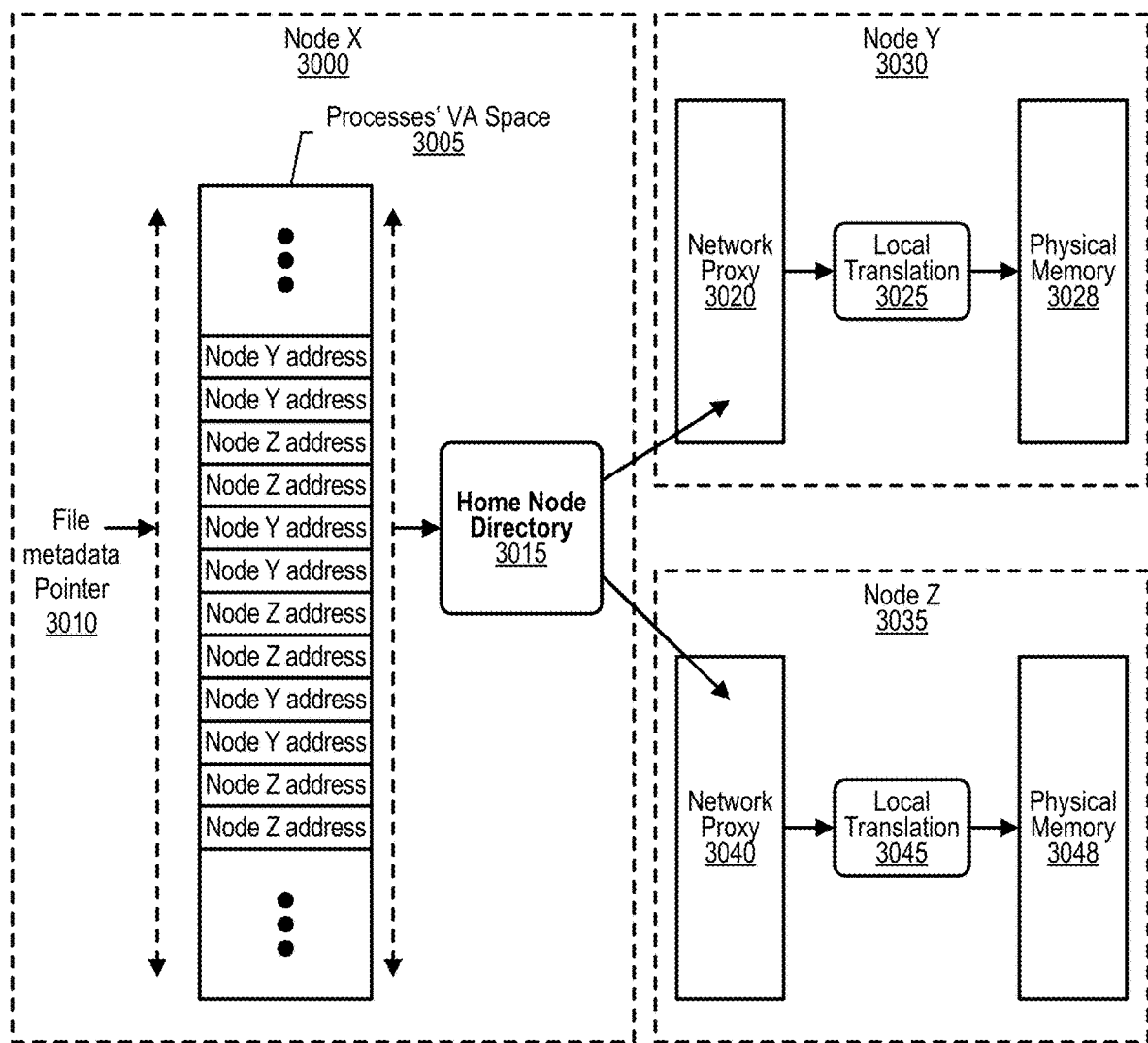
FIG. 30 shows a schematic view of a file metadata directory (FMDD)
Figure 33:
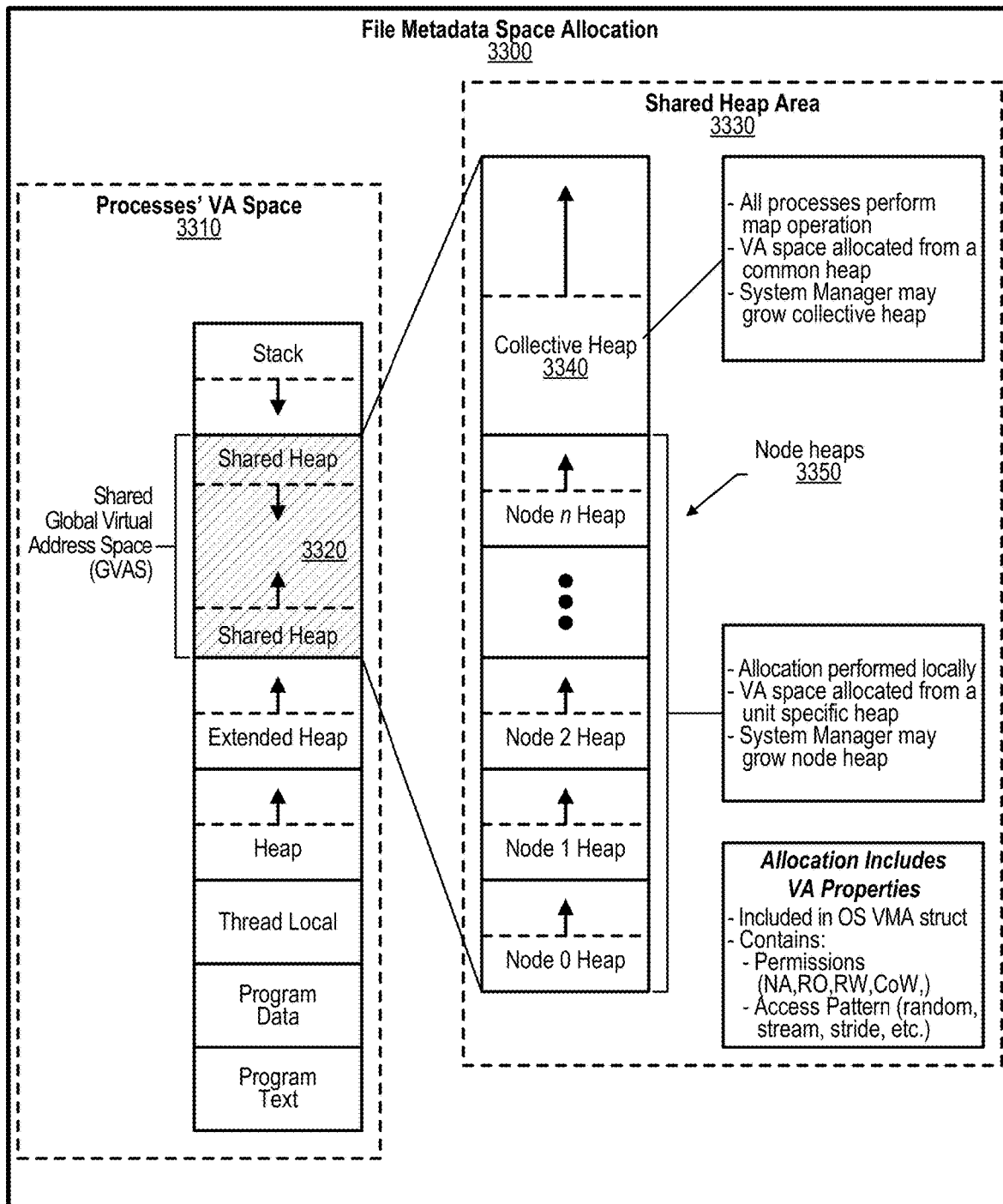
FIG. 33 shows a schematic view of a file metadata space allocation.

FIG. 30 is an illustration to locate the "Home Node" or backing memory for a given Global Virtual Address Space (GVAS) pointer. The Processes' VA Space 3005 represents the virtual address space of a process running on node X 3000 of which a portion of the Processes' VA Space 3005 is the GVAS. (Note: The memory allocation handler for globally shared data ensures that all processes have the same virtual addresses for all processes that share the GVAS.) Each node contains a home node directory 3015 that maps a block of global virtual addresses to the node containing the backing memory for the corresponding global virtual address range. The Node Y 3030 and Node Z 3035 contain the backing memory for the corresponding blocks mapped in the processes' VA space 3005 on Node X 3000. Not shown in FIG. 30 is a first VA translation of the virtual address into a local physical address and a first search of a local extended memory cache located in the node's physical memory. Assuming the remote data is not locally available in the extended memory cache, a search of the home node directory 3015 is performed to find the "Home Node" and a network packet is created containing a request for the global virtual address and sent to the node identified by the home node directory. A network proxy on the target node receives the packet, performs a second VA translation to locate the global virtual address within the physical memory of that node, and then performs the requested operation. In FIG. 30, the home node directory 3015 has address ranges homed on Node Y where network proxy 3020 performs the local translation 3025 into the physical memory 3028 on Node Y 3030. Similarly, the home node directory 3015 has address ranges homed on Node Z where network proxy 3040 performs the local translation 3045 into the physical memory 3048 on Node Z 3035. Within each node, a NIC may contain the home node directory shown in FIGS. 27 and 28. Furthermore, the NIC within each node may perform the network proxy function. As depicted in FIG. 33, a GVAS has a GASD tracking the memory areas allocated in the GVAS and the operating system references the GASD to initialize both the local VA translations and the home node directory. Processes attached to the same GVAS will therefore have the same home node directory information for a given global virtual address enabling sharing of pointers across physical units or nodes. The directory information is kept up to date by the operating systems which would use an internal set of GVAS APIs.

Figure 32:
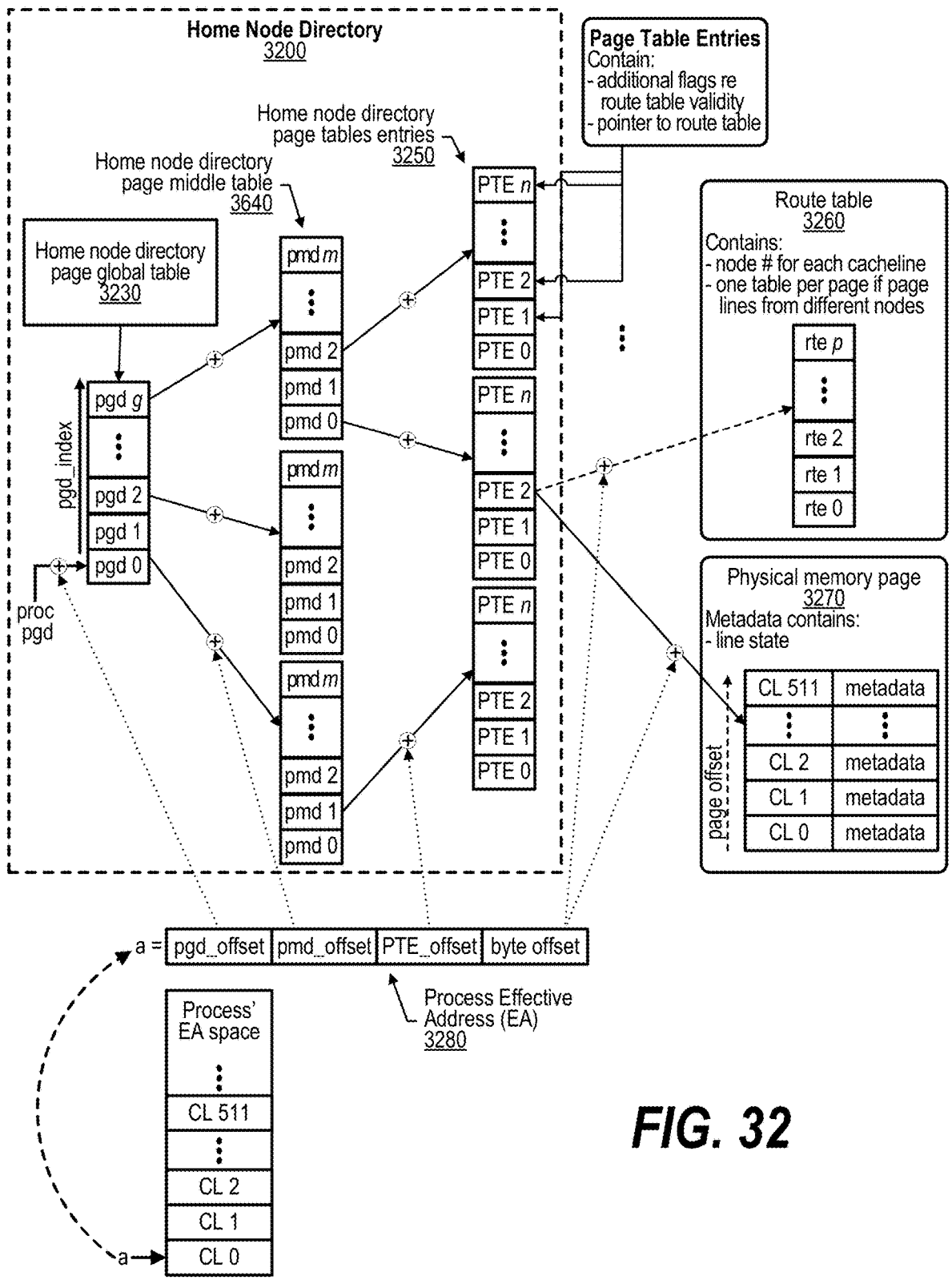
FIG. 32 shows a diagram of a home node directory with page table entries.

Not shown in FIG. 30 is the local VA translation and the local extended memory cache that allows units to cache remote memory within its local memory pool. The local VA translation is standard in most modern CPUs and maps a VA to a physical memory address, in this case the address of a physical extended memory cache page (FIG. 32). If the remote data is available in the extended memory cache, the unit performs a local memory access of the cache. If not available, the unit sends the global virtual address request to the NIC, which performs the global virtual address to home unit translation and sends a request across the network to the home node. A network proxy on the home unit receives the global virtual address request, performs a local virtual address translation to locate the requested global virtual address within its memory pool, and then performs the requested operation. Since the home node contains the backing memory, the translation will resolve to normal physical memory and not memory associated with the extended memory cache of that node. To make the VA request operation efficient, the NIC may support a special command initiated by the host processor that carries the VA and request all within a single bus operation. In addition, the NIC may support performing VA request from remote units with little or no host processor support.

Figure 31:
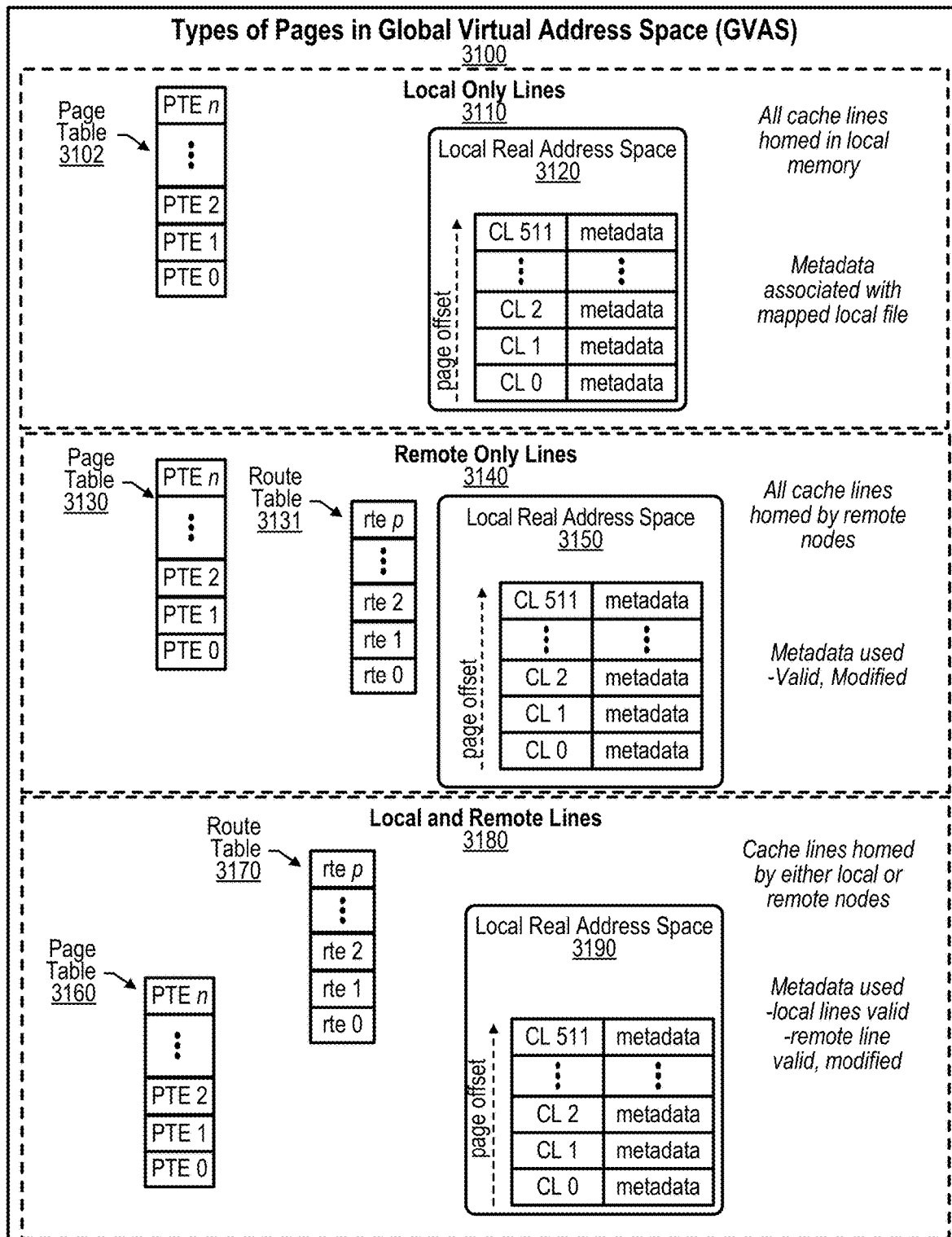
FIG. 31 shows a diagram of types of pages.

FIG. 31 depicts examples of three types of pages in the Global Virtual Address Space (GVAS) 3100. Local only lines 3110 contains a page table 3102 where entry page table entry (PTE) 2 points to a page in the local real address space 3120 that contains cache lines (CL) homed only by the local node. In the case of local only lines 3110, all cache lines of the page are locally home and considered a normal page. The metadata may optionally be used to identify memory that has not been initialized by setting the metadata to not valid. When a cache line (CL) that is locally homed is not valid, an interrupt may be generated signaling an access to uninitialized memory.

In the case of remote only lines 3140, all the cache lines of the page are homed by remote nodes and considered an extended memory cache page. The metadata for an extended memory cache page is used to indicate if the cache line (CL) is valid or has been modified. When a cache line (CL) that is remotely homed is not valid for the referenced real address, the route table 3131 may be used to locate the home node when the page table 3130 cannot represent the home nodes for each cache line (CL). Also, the metadata may indicate whether or not the data is encrypted.

Local and remote lines 3180 contains a page table 3160 where entry PTE 2 points to a page in the local real address space 3190 that contains cache lines (CL) homed by both the local and remote nodes. In the case of local and remote lines 3180, the referenced page contains a mixture of lines homed by the local and remote nodes. When a cache line (CL) that is remotely homed is not valid for the referenced real address, the route table 3170 may be used to locate the home node when the PTE cannot represent the home nodes for each cache line (CL). The metadata for a mixed page is used to indicate if the cache line (CL) is valid or has been modified. The metadata for Cache lines homed by the local node may be marked not valid if the data are not initialized. When a cache line (CL) that is locally homed is not valid, an interrupt may be generated signaling an access to uninitialized memory. When a cache line (CL) that is remotely homed is not valid for the referenced real address, the route table 3170 may be used to locate the home node when the PTE cannot represent the home nodes for each cache line (CL).

FIG. 32 shows an embodiment of a home node directory 3200 using a standard page table construction with extended memory extensions supporting fine grain relocation of data between a plurality of nodes. The home node directory page global directory 3230 has entries pointing to home node directory page middle directories 3240 which point to home node directory page tables 3250 having Page Table Entries (PTE) which may point to route table 3260 allowing for a separate node for each cache line. In this case, the hierarchical page table construction is augmented with a "Home" node location for the data. This example shows the insertion of another last level containing the routing information for each cache line (128-bytes) within the page, the route table 3260. If the nodes that own or "Homes" the data represented by an entry in a layer of the home node directory [3230, 3240, 3250] can be described, then the entry will be of type 0x2-0x9 (see FIG. 29) and the hierarchy stop with this entry. If on the other hand, the nodes that own or "Homes" the data represented by an entry in a layer of the Home Node Directory [3130, 3240, 3250] cannot be described, then the entry is of type 0x1 (see FIG. 29), and the hierarchy continues to the next level. The route table 3260 level is only necessary if the cache lines within the page are "Homed" or owned by more nodes than can be described by the entries at each level (see FIG. 29). In another embodiment, home node directory entries in levels 3230 and 3240 may point to a route table 3260. In a third embodiment, the home node directory may also serve as the page table. In the third embodiment, the last level page table 3250 contains additional flags describing the type of page. If all the granules of data within the page are locally homed, then the flags indicate a normal page. If all the granules of data within the page are owned by remote nodes, the flags indicate an extended memory cache page. If one or more granules are locally owned, the flags indicate a mixed page (local/extended memory cache page). If the flags indicate an extended memory cache page or mixed page, physical address points to a physical memory page that contains meta-data 3270. For locally homed data granules, the metadata may indicate "valid" or if the memory is not initialized "invalid." If the granule is homed on a remote node, the metadata indicates if the granule contains a valid replica of the remote data associated with the global virtual address. The reference to process effective address (EA) 3280 may identify individual cache line (CL) referencing a physical address 3270 each of which has corresponding metadata or an indication of the home node where the data is located.

FIG. 33 depicts a schematic diagram of Global Virtual Address Space Allocation 3300. In an embodiment, a common virtual address range in each processes' VA space 3310 is reserved for the Global Virtual Address Space (GVAS) 3320 and shown in more detail in shared heap area 3330. Blocks within the GVAS range are assigned to nodes as shown by Node heaps 3350. Assigning unique blocks to individual nodes allow the operating system running on a node to perform memory allocations in response to the appropriate API call independently and be guaranteed the global virtual address assigned will not conflict with any allocations performed by other nodes. In addition, one block is assigned as a collective heap 3340. This heap is used when every node is running the same application and the same allocations are performed on each node. If additional global virtual memory is needed, a system manager may grow the heap regions. Applications may also set properties for the allocated global virtual addresses. These properties may include, but are not limited to, permissions (no access, read-only, read-write, execute, copy-on-write, encrypt, etc.), and access pattern (random, streaming, striding, etc.). The properties may be included in the operating systems virtual memory area structure (VMA struct). After allocating a virtual address range, backing memory may be assigned to units or nodes. APIs are used to establish the mapping and initializes the global virtual address directory. APIs supports collective processing where all processes perform map operation—VA space allocated from a common heap. Central service managers grow collective heap and API supports non-collective allocation performed locally where VA space is allocated from a unit specific heap. A central service manager supports a growing collective heap, where allocation includes VA Properties that may be included in OS VMA struct including permissions (NA, RO, RW, X, CoW) and Access Pattern (random, stream, stride, etc.)

In order to ensure that the built-in legal framework file system (LFFS) performs efficiently. The system may adjust the placement of file and/or data entries in the files to better meet processing needs including reliability and performance. In an embodiment, data may be placed based on the type of data and a rate of access to the data. In an embodiment, the LFFS augments a Storage Area Network (SAN) volume controller to determining an auto tiering of LFFS related data to shard data based on sensitivity and tiered access mapping to "hot" or "cold" volumes and caches to ensure protection and efficiency. The sharding encryption policies are allocated based on sensitivity at each volume and ensures that simple, sensitive, and personal sensitive have separate encryption methods and strengths based on the type of data and efficiency required for access across the system.

Figure 34:
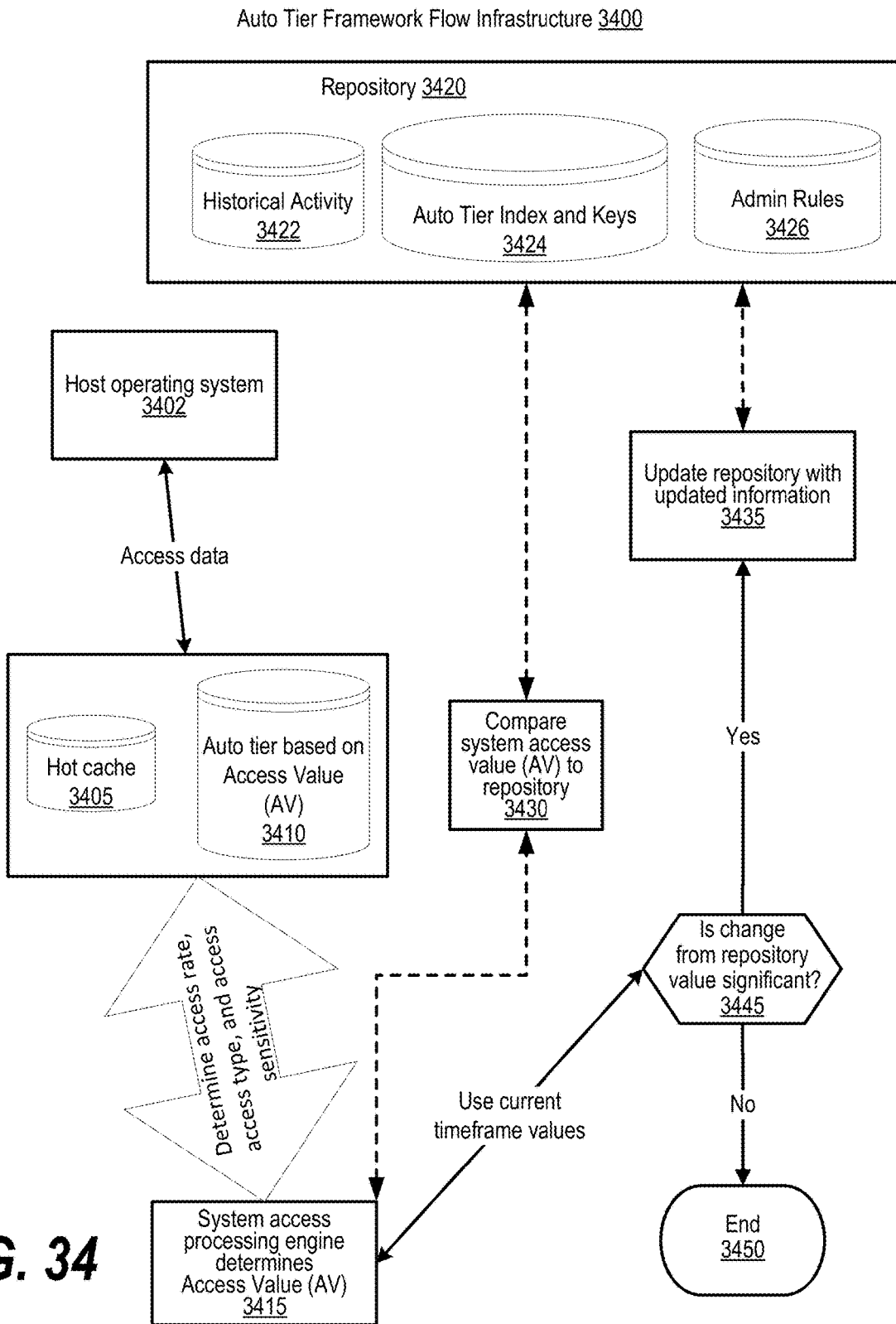
FIG. 34 shows a schematic view of a process that has an auto Tier Framework Flow Infrastructure.

FIG. 34 shows a schematic view of a process that has an auto tier framework flow infrastructure 3400. The system maintains a repository 3420 by recording historical activity 3422 reflecting a history of autos tier index and keys 3424 based on admin rules 3426. The admin rules 3426 may set thresholds for movement of data, encryption policies due to sensitivity of data, and other variables based on the system requirements. The process host operating system 3402 monitors or enables monitoring of data access utilizing a system access processing engine 3415 to determine a file or data access rate, an access type, and a sensitivity of the data being accessed. The system processing engine 3415 determines an Access Value (AV) for the files or data being monitored. At step 3430, the process compares the current AV to the historical activity 3422. The process determines as to whether is change from repository value significant (decision 3445). If is change from repository value significant, then decision 3445 branches to the 'yes' branch. On the other hand, if not is change from repository value significant, then decision 3445 branches to the 'no' branch. At step 3435, the process updates repository with updated information and performs the steps to automatically auto tier based on the Access Value (AV) 3410. The steps may involve moving data to the hot cache 3405 which could include updating the auto tier index and keys 3424 and updating the historical activity 3422. FIG. 34 processing thereafter ends at 3450.

Figure 35:
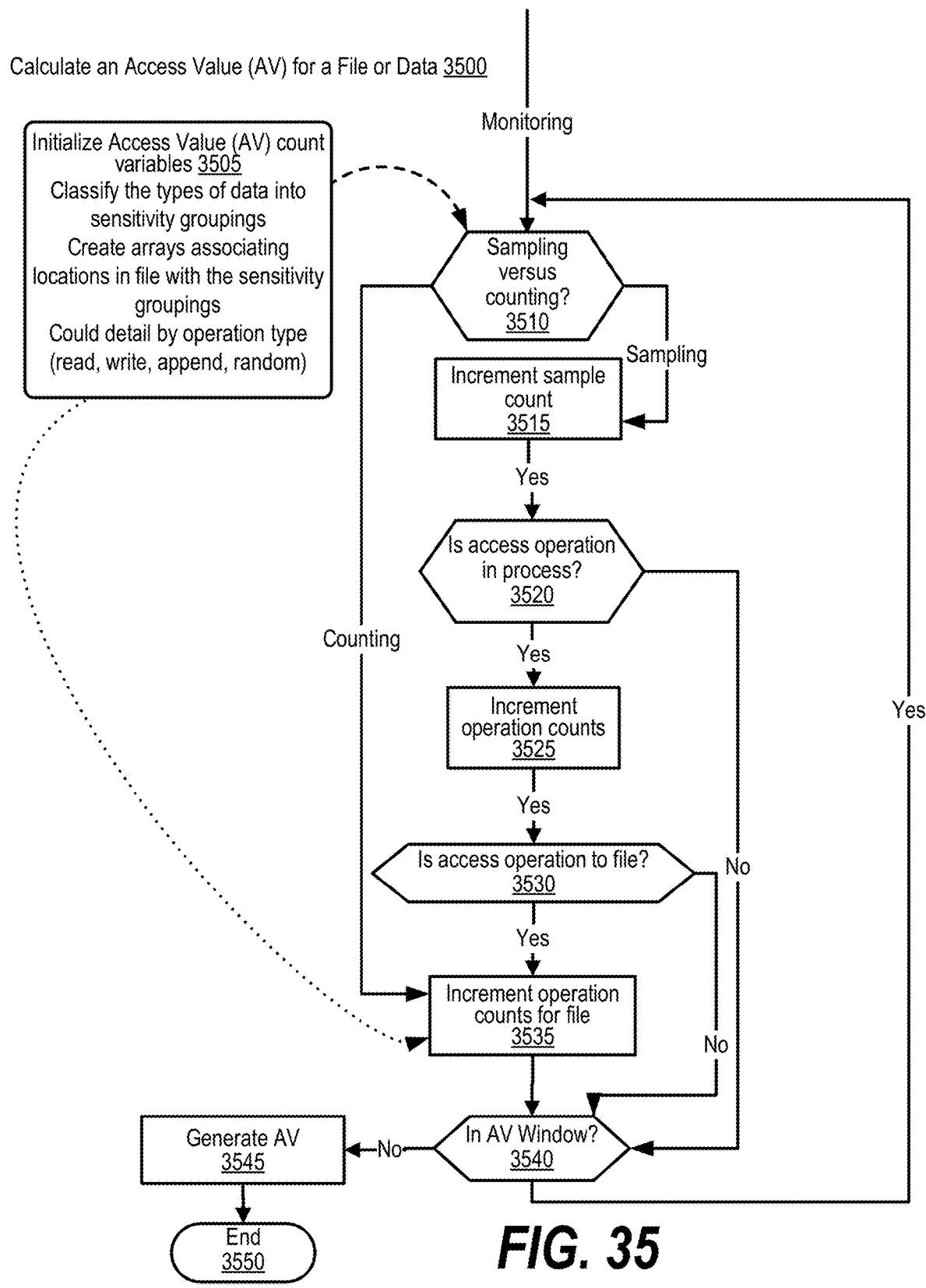
FIG. 35 shows a flowchart depicting steps taken to calculate an access value (AV) rate for a file or data.

FIG. 35 processing commences at 3500 and shows the steps taken by a process that calculate an Access Value (AV) for a file or data. A set of files related to a user may be monitored or access to a set of sensitive data may be monitored. In some embodiments, various windows of time will be chosen for monitoring to collect selected information. In some embodiments, very detailed information may be accumulated and in other embodiments, less detailed information may be accumulated. In an example embodiment, different types of data are classified into separate sensitivity groups based on a mapping from a type of data to a sensitivity classification. For example, a social security number may be classified as more sensitive than a driver's license number or an address. In addition, in some embodiments, a type of access could also be included with a different weighting assigned to the type of access. The weighting could be different based on a sensitivity of the content and the type of access. In an embodiment, sampling may be used to accumulate counts. With a sampling embodiment, a timer may be scheduled to periodically interrupt on each processor to take a snapshot of the current state at the time of the interrupt. In other embodiments, a performance monitor counter interrupt may be used to take a sample. With sampling, the system determines the current state on the current processor and increments counts based on the determined current state. The values counted in the different states give a representation of where time is spent doing which activity. Alternatively, in an embodiment where LFFS support goes through a file handler 2025 the access counts may be exactly counted. At step 3505, the process initializes variables that are used to calculate an Access Value (AV). The specific variable used to calculate the AV may be different in different embodiments. Variation in accumulating access counts may occur in different embodiments. In some embodiments, the variables may be associated with a mapping of the types of data into sensitivity groupings. In embodiments that separate counts by sensitivity groupings, the system may create arrays associating locations in the file with the sensitivity groupings. In addition, variables could be associated with different operation types. Examples of different operation types include, but are not limited, to read sequentially, read random, write append, write update, and the like. The process determines as to whether processing is sampling versus counting (decision 3510). If sampling, then decision 3510 branches to the sampling' branch to increment sample count at step 3515. The process determines as to whether is access operation in process (decision 3520). If not is access operation in process, then decision 3520 branches to the 'no' branch. If is access operation in process, then decision 3520 branches to the 'yes' branch to increment operation counts at step 3525 which continues to determine as to whether is access operation to file (decision 3530). If is access operation to file, then decision 3530 branches to the 'yes' branch. On the other hand, if not is access operation to file, then decision 3530 branches to the 'no' branch. The process determines as to whether in AV Window (decision 3540). If in AV Window, then decision 3540 branches to the 'yes' branch which loops back to 3510. This looping continues until no longer in the AV Window, at which point decision 3540 branches to the 'no' branch exiting the loop. If not sampling, then decision 3510 branches to the counting' branch. At step 3535, the process increments operation counts for file. At step 3545, the process generates AV. FIG. 35 processing thereafter ends at 3550.

The system access value may be determined by the number of programs that access the file or file type, sensitivity of the data, read or write type of activity by the programs, and length of time used by a program once loaded. An alternate method of calculating the system access value for data can be defined at larger scale than the granular level, where it's based on the file type and file metadata (data dictionary). Where the data dictionary specifies which fields are sensitive and their location in the file, the system access value=Percent Field Sensitivity per file type*access type (read/write)*Average file handle time/Number of access to file type. In one embodiment, "File Handle Time" equals how long the file handler has a cursor opened on the file. "Percent Field Sensitivity" per file type equals the number of sensitive fields in the file type based on the data dictionary.

An alternate approach could be to utilize a time slice period over this value to determine the access value over a period of time, so divide by the number of accesses per hour, or a particular hour, based on healthcare based processes that may be batched against a file type. So, divide by number of accesses to the file type over a period of time. The access rate differs by the type of storage class of the device. A Flash Drive storage class supports an ultra-high frequency rate, a solid state drive supports a high frequency rate, a hard drive supports a moderate frequency rate, a cloud storage supports a low frequency rate. Access rate may be adjusted based on the type of storage being accessed.

Figure 36:
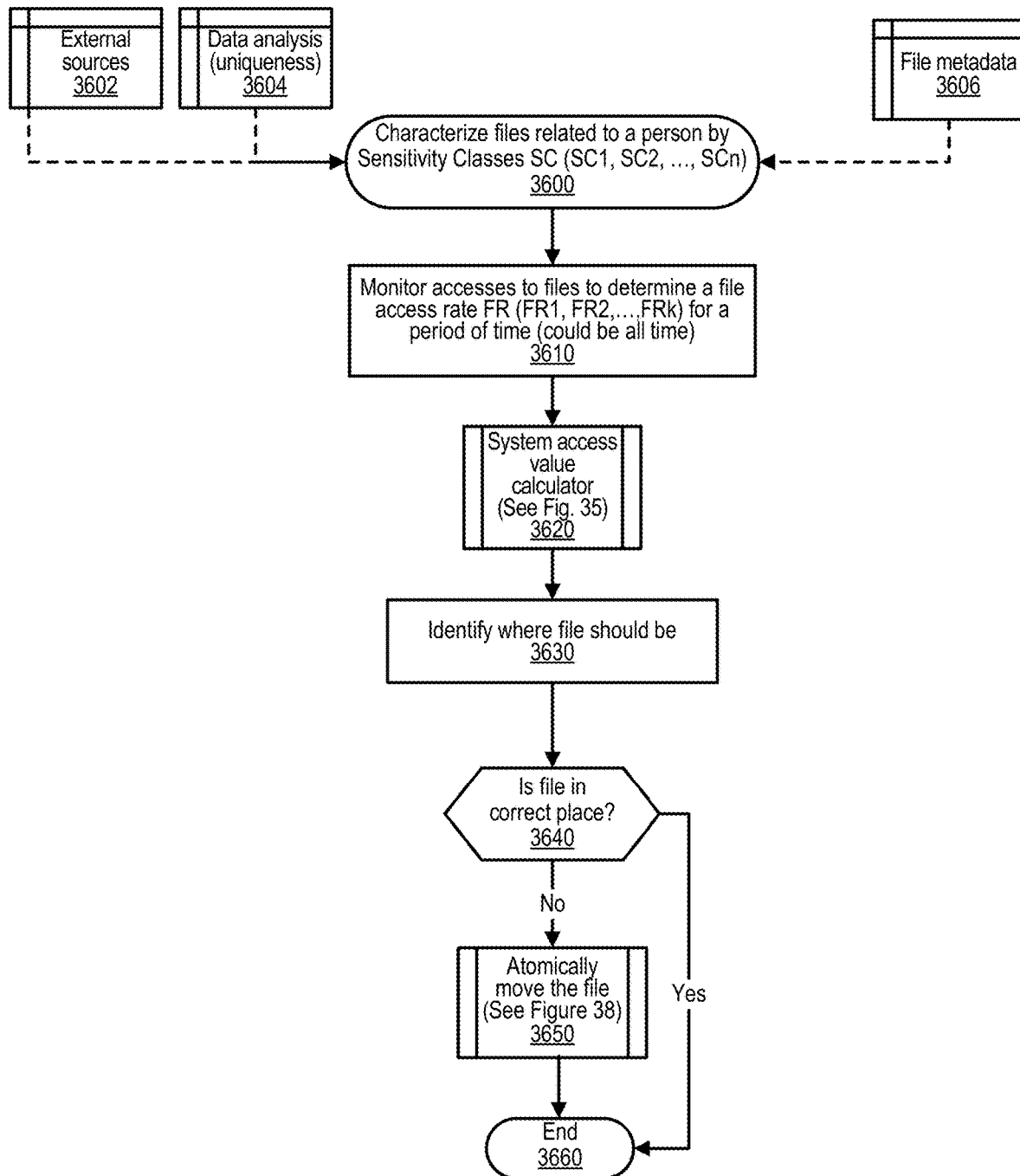
FIG. 36 shows a flowchart depicting steps taken to characterize files related to a person by Sensitivity Classes SC (SC1, SC2, . . . , SCn) and move files if needed.

FIG. 36 processing commences at 3600 and shows the steps taken by a process that characterize files related to a person by Sensitivity Classes SC (SC1, SC2, ..., SCn) and moves the file if needed. The characterization is based on external sources 3602, an analysis of data uniqueness 3604 and an analysis of file metadata 3606. At step 3610, the process monitors accesses to files to determine a file access rate FR (FR1, FR2, ..., FRk) for a period of time (could be all time). At predefined process 3620, the process performs the System access value calculator routine (see FIG. 35 and corresponding text for processing details). At step 3630, the process identifies where file should be. The process determines as to whether is file in correct place (decision 3640). If is file in correct place, then decision 3640 branches to the 'yes' branch. On the other hand, if not is file in correct place, then decision 3640 branches to the 'no' branch. At step 3650, the process atomically moves the file (see FIG. 38 and corresponding text for processing details). FIG. 36 processing thereafter ends at 3660.

Figure 37:
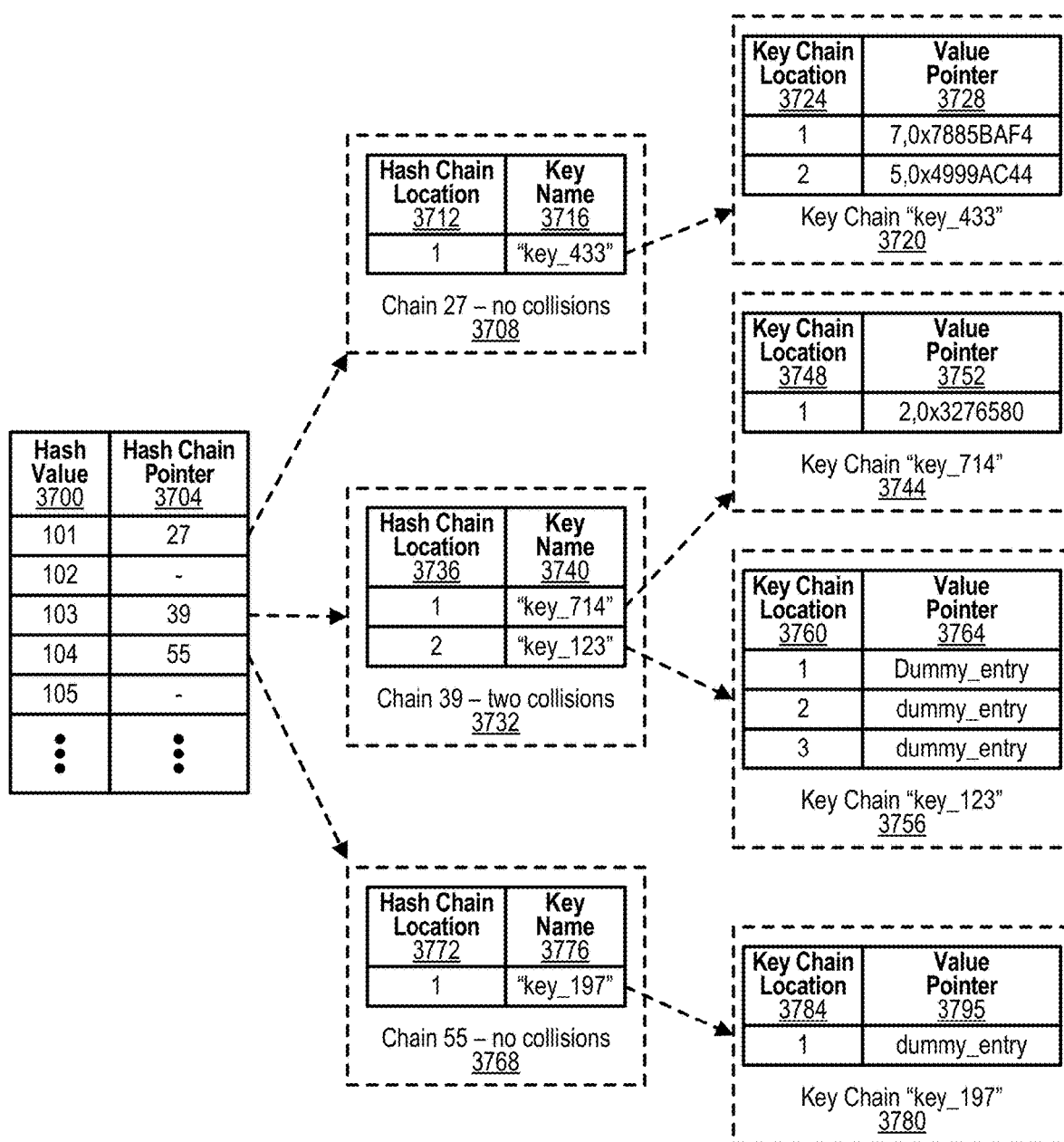
FIG. 37 shows a schematic view of a hash table.

FIG. 37 depicts a schematic diagram of an example embodiment of a structure for a hash table. A distributed key-value store uses the hash table structure that may be distributed across several nodes for MDEs stored in the GVAS. One or more hash tables may be in each node. The hash value (or hash index) 3700 is used to select a hash chain pointer 3704 that points to a hash chain listing all the keys associated with the hash index. Each hash chain location (3712, 3724, 3736, 3748, 3760, 3772, 3784) contains the key name (3716, 3740, 3776) and a pointer to the key chain location (3724, 3748, 3760, 3784) that contains a list of value pointers (3752, 3764, 3795) for the value (or data) associated with the key. The "key" can be the first field of the name, other meta-data, and the like. It is also possible to store the value associated with a key directly inside the hash chain instead of indirectly accessing the value using pointers. The latter method is more efficient when the value field is small. Hash Value 3700 and Hash Chain Pointer 3704 depicts an example of a section of a hash table. For purposes of illustration, FIG. 37 depicts a case where the keys are in a unique location, that is, a specific entry in a specific hash table on a specific node. Thus, the sets of keys located in various hash tables are disjoint. However, in general, for reliability or performance reasons, it may be desirable to locate a key in multiple locations in a consistent manner. FIG. 37 depicts the set of MDEs that are identified by hash table. In the example, the hash value (or index) 3700 starting from 101 to 105 shows pointers to the hash chains corresponding to each hash value. The hash chain pointer 3704 at hash index location 101 indicates chain pointer 27 3708. Hash chain 27 3708 has a single entry with a key name 3716 of "key_433" 3720 indicating no collisions as does Hash chain 55 3768. The hash chain pointer 3704 at hash index location 103 indicates chain pointer 39. Hash chain 39 3732 has two entries with a key name 3740 of "key_714" 3744 and "key_123" 3756 indicating two collisions or keys with the same hash value. Each entry in the hash chains contain the key name and a pointer to the associated key chain that reference the data associated with the key name. For example, entry 1 in hash chain 27 points to key chain describing the data associated with "key_433" 3720. Key chain has two entries indicating the data associated with "key_433" have two blocks. Key Chain Location entry 1 describes a block containing 7 bytes located at address 0x7885BAF4 and entry 2 describes a block containing 5 bytes located at address 0x4999AC44. Summing the sizes of the two block indicates there are 12 bytes of data associated with "key_433."

The infrastructure may contain flags indicating the type of entries for example, value versus pointer and structured as a linked list or fields indicating counts of items, back up references, as various embodiments may be used. The values in the infrastructure may be entries in other tables or could be virtual addresses subject to being homed in different nodes or even metadata. Associated with each key is a hash value that is a mathematical function performed on the key which may be a number, a set of numbers, text, or a mixture of text and numbers. A hash function on a key may return, a node number, a table identification (ID) within that node, and an index into that table.

In an embodiment, it would be possible for a hash function to return the same (node, table, index) triple for two different keys, even though the function could be designed to minimize the probability of this type of collision. When a collision occurs, a typical key-value store will resolve the collision by placing the new key in some other available slot using one of several mechanisms, e.g. use a secondary hash function, or scan down the table from the indexed location to look for the next available location, or, chain together all keys hashing to the same location. In the latter embodiment, when a key is to be searched, the hash function will point to a (node, table, index) triple, at which location a linked list is searched for the presence of the key. If a key is not found, a new key may be created, a dummy value pointer is inserted, and a null indicator is returned. This is a significant difference from standard key-value stores which typically return only a null indicator and does not create a new key. This type of support may be provided to allow a reference to a virtual memory address before the address has been homed.

Figure 38:
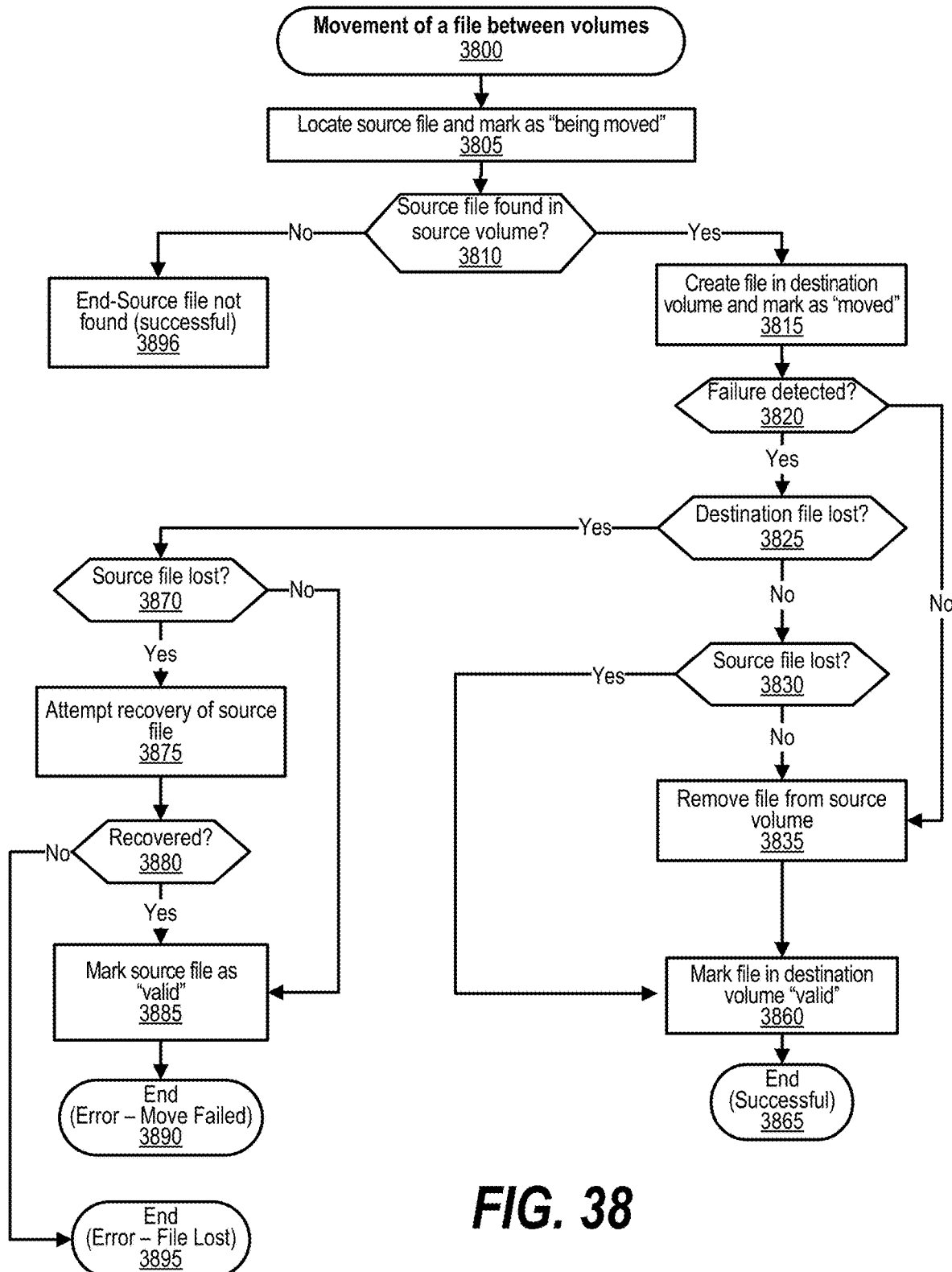
FIG. 38 shows a flowchart depicting steps taken to move a file between volumes.

FIG. 38 depicts a method to manage the movement of files. The method provides a means for atomically moving files between storage classes or volumes with differing level of persistent storage while also maintaining the durability of the file. In a preferred embodiment of a storage classes or volume, the distributed memory storing the files is determined by the attributes of the storage classes or volume. In another embodiment, the selection of storage could be on a file by file basis. For the preferred embodiment, all files are stored within a single class of memory defined by the persistence level attribute of the storage classes or volume. For example, a storage classes or volume with a persistence level of "1" may be associated with DRAM distributed across the nodes in the system, a persistence level of "2" may be associated with Storage Class Memory (SCM) distributed across the nodes in the system, and a persistence level of "3" may be associated with a global file system. If a node is powered off, the files within a storage classes or volume with a persistence level of "1" are lost if no other means are provided to manage the persistence of the files. Level 2 on the other hand would survive a power cycle, but not a hardware failure of a node. A storage classes or volume stored on the global file system would provide the most protection from power and hardware failures. To manage the persistent level of any given file, software must have a means for atomically moving a file between storage classes or volumes with different persistent level attributes, without the potential loss of the said file.

The high-level view of an embodiment of moving a file may include the following steps: The first step is to locate the file to move and mark the file as in the processes of "being moved" without removing the file. The second step is to create a file in the destination memory and mark the file as a "moved" file, meaning the file is not yet valid at the destination. If a failure occurs between steps 1 and 2, a check is performed to determine if the source file was lost. If so, a recovery of the file is attempted. If source file is successfully recovered or the failure was some other error where the destination file was not created, the process continues to where the source file is marked as "valid" and an error is signaled that the file was not moved. If the recovery is not successful, the process continues where an error is signaled indicating the file has been lost. If an error did not occur between steps 1 and 2, the process continues to step 3 where the file source file is removed. If a failure occurs between steps 2 and 3, a check is performed to determine if the designation file is lost. If destination file is lost, the process continues to where the source file is marked as "valid" and an error is signaled that the file was not moved. If the destination file was not lost, a check is performed to determine if the source file was lost (step 3 the step 4). If source file was not lost the process continues as if no failure occurred. If the source file was lost, the process continues with step 4 where the destination file is marked valid completing the move. If a failure occurs between steps 3 and 4, a check is performed to determine if the destination file was lost. If so, a recovery of the file is attempted. If destination file is successfully recovered or the failure was some other error the process continues as if no failure occurred and the file is marked valid completing the move. If the recovery is not successful, the process continues where an error is signaled indicating the file has been lost. If an action directed by a requestor at the file in the first storage area subsequent to the creating and the deleting, a response that identifies the second storage area may be sent to the requestor. In this case, the action may be re-performed by requesting the action to the file in the second storage area.

FIG. 38 depicts a method to move files within the storage classes or volumes. The source and destination storage classes or volume can be the same or different. FIG. 38 processing commences at 3800 and shows the steps taken by a process that moves files in storage classes or volume. At step 3805, the process locates file in source distributed memory and marks the file as "being moved." At step 3810, a determination as to whether the source file was found is made. If source file was not found, then decision 3810 branches to the 'no' branch and the process completes successfully indicating no file was found to be moved at step 3896. On the other hand, if a file was found, then decision 3810 branches to the 'yes' branch. At step 3815, the process creates file in destination memory and marks the file as "moved." At step 3820, a determination as to whether a failure was detected is made. If a failure was not detected, then decision 3820 branches to the 'no' branch and continues with step 3835. On the other hand, if a failure was detected, then decision 3820 branches to the 'yes' branch. At step 3825, a determination as to whether the destination file was lost is made. If destination file was lost, then decision 3825 branches to the 'yes' branch and continues with step 3870. On the other hand, if the destination file was not lost, then decision 3825 branches to the 'no' branch. At step 3830, a determination as to whether the source file was lost is made. If source file was lost, then decision 3830 branches to the 'yes' branch and continues with step 3860. On the other hand, if the source file was not lost, then decision 3830 branches to the 'no' branch. At step 3835, the process removes file from source distributed memory. At step 3860, the process marks file in the destination distributed memory "valid" and continues with step 3865. At step 3865, the process ends (Successful). If the destination file was lost (yes branch of decision 3825) a determination as to whether source file was lost is made at step 3870. If the source file was not lost, then decision 3870 branches to the 'no' branch and continues with step 3885. On the other hand, if the source file was lost, then decision 3870 branches to the 'yes' branch. At step 3875, the process attempts recovery of source file. At step 3880, a determination as to whether the source file was recovered. If source file was not recovered, then decision 3880 branches to the 'no' branch and the process completes with an "(Error—file lost)" at step 3895. On the other hand, if source file was recovered, then decision 3880 branches to the 'yes' branch. At step 3885, the process marks file in source distributed memory as "valid" and the process completes with an "(Error—Move Failed)" at step 3890.

Figure 39:
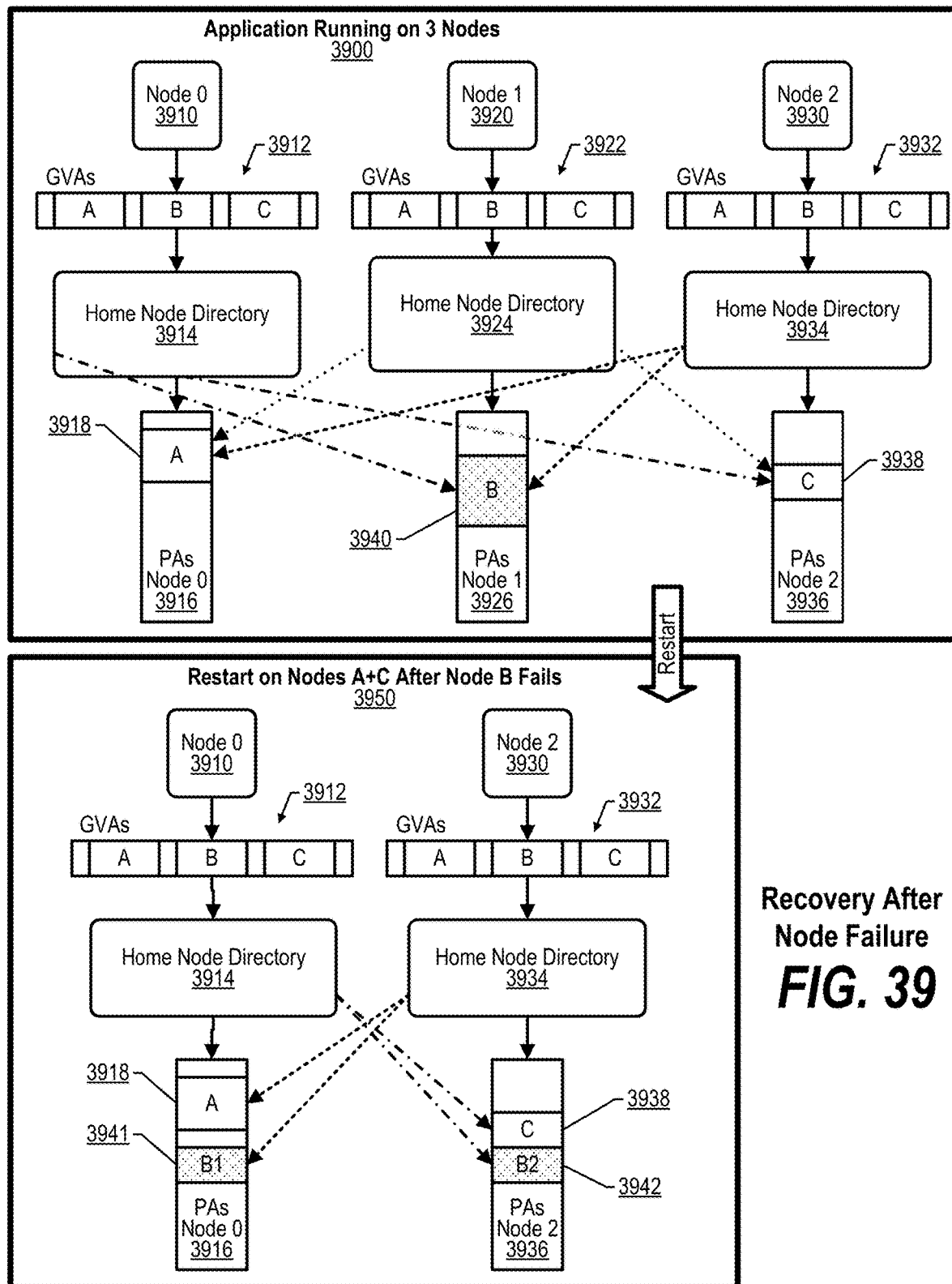
FIG. 39 shows a diagram depicting schematic view of recovery after a node failure.

FIG. 39 depicts a schematic view of Applications Running on three Nodes 3900 and a restarting on two nodes, Node A+C after Node B Fails 3950. Under the extended memory architecture, each node contains a portion of the global virtual address space. Diagram 3900 shows an application running on three nodes where virtual memory region A 3918, B 3940, and C 3938 are in the physical memory on Node 0 3910, Node 1 3920, and Node 2 3930 respectively. As shown in 3900, Home Node Directory 3914 on Node 0 maps A VAs to Physical Addresses (PAs) Node 0 3916. Home Node Directory 3924 on Node 1 maps B VAs to PAs Node 1 3926. Home Node Directory 3934 on Node 2 maps C VAs to PAs Node 2 3936. If node B fails as indicated in 3950, the extended memory architecture allows for dynamically re-constructing the physical memory backing the global virtual address space (GVAS) without requiring a reboot of all nodes by updating the Global Address Space Directory (GASD), restoring the physical memory and updating the Home Node Directories [3914, 3934] in Node 0 3910 and Node 2 3930 based on the new GASD information. In FIG. 39, the GVAs B 3940 are shown mapped to B1 3941 as PAs Node 0 3916 and B2 3942 as PAs Node 2 3936. Various approaches may be used to support the restoring the physical memory. For example, in one embodiment, the memory on B may be accessible by Nodes A and C. In another embodiment, the restart may involve restoring the state of the machines, including the memory, from a previous check pointed state. In a third embodiment, the memory may be shadowed and retrieved from a duplicated source. In a fourth embodiment, page tables are utilized to support remapping (See FIGS. 29-31 and corresponding description.) This fundamental difference between the extended memory architecture and previous distributed memory systems enables a more resilient Global Virtual Address Space in a system that allows applications to be restarted using a different number of nodes and resources. Application may restart on the same, fewer, or more nodes than used prior to the failure.

Figure 40:
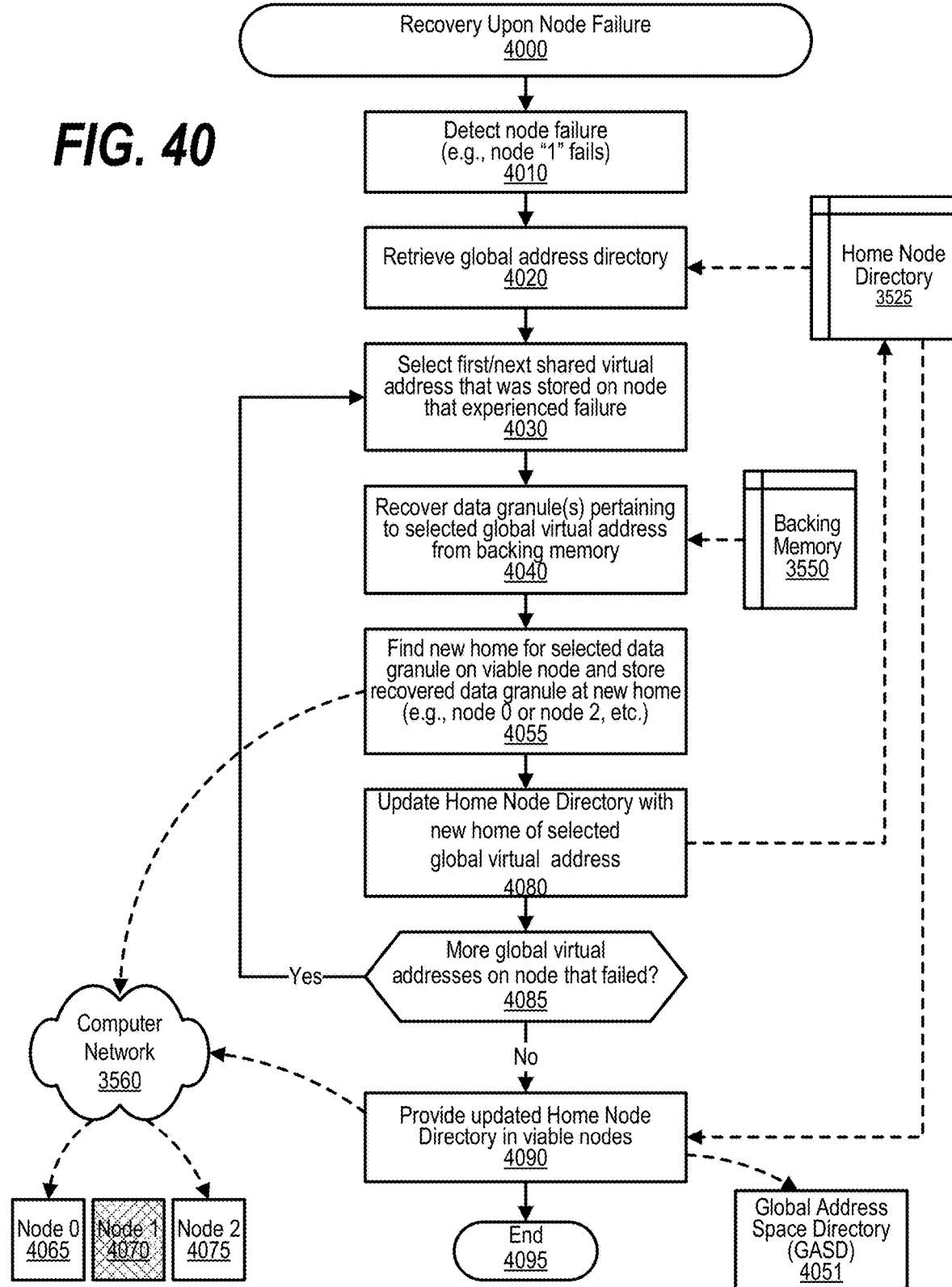
FIG. 40 shows a flowchart depicting steps taken to recover after a node failure.

FIG. 40 processing commences at 4000 and shows the steps taken by a process that recovers Upon Node Failure where the process is performed by the system manager. At step 4010, the process detects a node failure (e.g. node "1" 4070 fails). At step 4020, the process retrieves Home Node Directory 4025. At step 4030, the process selects the first global virtual address that was stored on node that experienced failure. At step 4040, the process recovers data granule(s) pertaining to selected global virtual address from backing memory 4050. At step 4055, the process finds new home for selected data granule on the available nodes and stores the recovered data granule via Computer Network 4060 at new home (e.g. node 0 4065 or node 2 4075, etc.). At step 4080, the process updates Home Node Directory with new home of selected shared virtual address. The process determines as to whether there are more global virtual addresses on node that failed (decision 4085). If more there are more global virtual addresses on node that failed, then decision 4085 branches to the 'yes' branch and continues with step 4030. On the other hand, if there are no global virtual addresses on node that failed, then decision 4085 branches to the 'no' branch. At step 4090, the process updates the Home Node Directories in the new set of viable node(s) and updates the Global Address Space Directory (GASD) 4051 to reflect the new homes for the relocated virtual addresses. FIG. 40 processing thereafter ends at 4095.

A list of example metadata APIs 4100 are included in FIG. 41. Examples of file metadata infrastructure (FMDI) management APIs 4100 include: fmOpen( ) Open a File Metadata Infrastructure (FMDI); fmClose( ) Close a File Metadata Infrastructure (FMDI); fmQuery( ) Query information about a File Metadata Infrastructure (FMDI); fmMap( ) Allocate VA space to a File Metadata Infrastructure (FMDI); fmMapAll( ) Allocate VA space to a File Metadata Infrastructure (FMDI); fmFree( ) Free VA space from a File Metadata Infrastructure (FMDI); fmChngVA( ) Change properties of a File Metadata Infrastructure (FMDI)' VA space; and FmSetHome( ) Set backing store for a File Metadata Infrastructure (FMDI)' VA space. Examples of file metadata Infrastructure (FMDI) Mapping APIs 4120 include: fmExpose( ) Make VA range remotely accessible and fmPrivate( ) Make VA range private to node. Examples of File Metadata Infrastructure (FMDI) Access APIs 4130 include: fmGet( ) Read from an MDE; fmPut( ) Write to an MDE; fmAtomic( ) Perform atomic op on an MDE; fmTouch( ) Touch an MDE into cache; fmTouchForStore( ) Touch an MDE into cache for modification; fmFlush( ) Flush an MDE from cache; and fmSync( ) Set order of remote operations.

FIG. 42 depicts examples of file data operation APIs 4200. The file masking APIs 4210 include: fdMask( ) Data masking; fdPseudo( ) Data pseudonymization; fdAnon( ) data anonymization; fdEncr( ) Encrypt a file or folder; fmMapAll( ) Allocate VA space to a File Metadata Infrastructure (FMDI; fmFree( ) Free VA space from a File Metadata Infrastructure (FMDI; fmChngVA( ) Change properties of a File Metadata Infrastructure (FMDI)' VA space; and fmSetHome( ) Set backing store for a File Metadata Infrastructure (FMDI) VA space. The privacy vulnerabilities APIs 4220 include: fdVulndisc( ) Identify privacy vulnerabilities; fdRisk( ) Calculate privacy risk exposure assessment; and fdReport( ) Identify and report privacy vulnerabilities. The file data manipulations APIs 4230 include fdStudy( ) Collect data for a research study; fdCopy( ) Copy files according to consent criteria; fdView( ) View data based on query and consent; fdAnalyze( ) Perform analytic analysis on data in a file; and fdCreate_study( ) Create a study.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While particular embodiments have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method for providing built-in consent permissions for users, groups, processes, and programs accessing a part of a filesystem within a storage of an information handling system (a local node) that includes a processor and a memory accessible by the processor, the method comprising:
    integrating a consent access control into a plurality of files in a filesystem;
    receiving a first request from a first requestor to access information from a first file in the filesystem;
    determining a first access policy for the first requestor wherein the first access policy includes a first selective data conversion;
    receiving a second request from a second requestor to access information from the first file in the filesystem; and
    determining a second access policy for the second requestor different from the first access policy for the first requestor; and
    providing an access control mode wherein the access control mode is one of an access control mode on and an access control mode off and wherein the access control mode on enforces usage of the built-in consent permissions to the part of the filesystem and the access control mode off inhibits enforcing usage of the built-in consent permissions and wherein the second access policy includes a second selective data conversion.

2. The method of claim 1, wherein the second requestor is a backup executable and the access control mode is off.

3. The method of claim 1, wherein the consent access control is determined dynamically based on metadata, a sensitivity of content to be accessed, and ownership of the content.

4. The method of claim 1, wherein the consent access control is based on an identified purpose for receiving the access information.

5. The method of claim 4, wherein the identified purpose is an analysis of a treatment option based on a demography.

6. The method of claim 4, wherein content read from the filesystem is automatically processed utilizing a technique selected from a group consisting of pseudonymization and anonymization according to the built-in consent permissions of the filesystem.

7. The method of claim 4, wherein content read from the filesystem is automatically processed utilizing a technique selected from a group consisting of pseudonymization and anonymization based on a restriction determined by an owner of a file in the filesystem.

8. An information handling system (a local node) for providing built-in consent permissions for users, groups, processes, and programs accessing a part of a filesystem comprising:
    one or more processors;
    a memory coupled to at least one of the processors;
    a network interface that connects the local node to one or more remote nodes; and
    a set of computer program instructions stored in the memory and executed by at least one of the processors in order to perform actions comprising:
    integrating a consent access control into a plurality of files in a filesystem;
    receiving a first request from a first requestor to access information from a first file in the filesystem;
    determining a first access policy for the first requestor wherein the first access policy includes a first selective data conversion;
    receiving a second request from a second requestor to access information from the first file in the filesystem; and
    determining a second access policy for the second requestor different from the first access policy for the first requestor; and
    providing an access control mode wherein the access control mode is one of an access control mode on and an access control mode off and wherein the access control mode on enforces usage of the built-in consent permissions to the part of the filesystem and the access control mode off inhibits enforcing usage of the built-in consent permissions and wherein the second access policy includes a second selective data conversion.

9. The information handling system of claim 8, wherein the consent access control is determined dynamically based on metadata, a sensitivity of content to be accessed, and ownership of the content.

10. The information handling system of claim 9, wherein the second requestor is a backup executable and the access control mode is off.

11. The information handling system of claim 8, wherein the consent access control is based on an identified purpose for receiving the access information.

12. The information handling system of claim 11, wherein the identified purpose is an analysis of treatment option based on a demography.

13. A computer program product for providing built-in consent permissions for users, groups, processes, and programs accessing a part of a filesystem stored in a computer readable storage medium, comprising computer program code that, when executed by an information handling system (a local node), performs actions comprising:
- integrating a consent access control into a plurality of files in a filesystem;
- receiving a first request from a first requestor to access information from a first file in the filesystem;
- determining a first access policy for the first requestor wherein the first access policy includes a first selective data conversion;
- receiving a second request from a second requestor to access information from the first file in the filesystem;
- determining a second access policy for the second requestor different from the first access policy for the first requestor; and
- providing an access control mode wherein the access control mode is one of an access control mode on and an access control mode off and wherein the access control mode on enforces usage of the built-in consent permissions to the part of the filesystem and the access control mode off inhibits enforcing usage of the built-in consent permissions and wherein the second access policy includes a second selective data conversion.

14. The computer program product of claim 13, wherein the second requestor is a backup executable and the access control mode is off.

15. The computer program product of claim 13, wherein the wherein the consent access control is determined dynamically based on metadata, a sensitivity of content to be accessed, and ownership of the content.

16. The computer program product of claim 13, wherein the consent access control is based on an identified purpose for receiving the access information.

17. The computer program product of claim 16, wherein the identified purpose is an analysis of a treatment option based on a demography.

\* \* \* \* \*